US008844658B2

(12) United States Patent
Wyatt et al.

(10) Patent No.: US 8,844,658 B2
(45) Date of Patent: Sep. 30, 2014

(54) ELECTRONIC STEERING APPARATUS

(75) Inventors: Christopher K. Wyatt, Windsor, IL (US); Alan D. Goetzelmann, Wheeling, IL (US); Ivan E. Fox, Mattoon, IL (US); Andy Vogel, Beach Park, IL (US); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 1068 days.

(21) Appl. No.: 11/771,559

(22) Filed: Jun. 29, 2007

(65) Prior Publication Data

US 2008/0018269 A1    Jan. 24, 2008

Related U.S. Application Data

(60) Provisional application No. 60/819,192, filed on Jul. 7, 2006.

(51) Int. Cl.
| | | |
|---|---|---|
| *B62D 5/02* | (2006.01) | |
| *B62D 11/02* | (2006.01) | |
| *B62D 5/04* | (2006.01) | |
| *A01D 34/64* | (2006.01) | |
| *B62D 11/00* | (2006.01) | |
| *A01D 34/00* | (2006.01) | |
| *B62D 7/12* | (2006.01) | |
| *B62D 3/02* | (2006.01) | |

(52) U.S. Cl.
CPC .............. *A01D 34/006* (2013.01); *A01D 34/64* (2013.01); *B62B 11/04* (2013.01); *B62D 11/003* (2013.01); *B62D 7/12* (2013.01); *B62D 5/0418* (2013.01); *B62D 3/02* (2013.01)
USPC .............................. 180/6.48; 701/41; 180/443

(58) Field of Classification Search
USPC .......... 701/41; 180/443, 6.2, 6.24, 6.26, 6.28, 180/6.32, 6.48
See application file for complete search history.

(56) References Cited

U.S. PATENT DOCUMENTS

| | | | |
|---|---|---|---|
| 935,610 | A | 9/1909 | Mauksch et al. |
| 2,628,848 | A | 2/1953 | Isaac |
| 2,915,319 | A | 12/1959 | Kumler et al. |
| 3,297,930 | A | 1/1967 | Payne |

(Continued)

FOREIGN PATENT DOCUMENTS

| | | |
|---|---|---|
| DE | 4224359 | 5/1993 |
| EP | 0151208 A | 8/1985 |

(Continued)

OTHER PUBLICATIONS

International Preliminary Report on Patentability and Written Opinion of the International Searching Authority dated Jan. 13, 2009 issed with regard to PCT Application No. PCT/US2007/072567.

(Continued)

*Primary Examiner* — Joseph M Rocca
*Assistant Examiner* — Daniel Yeagley
(74) *Attorney, Agent, or Firm* — Neal, Gerber & Eisenberg LLP

(57) ABSTRACT

An electronic steering and control apparatus and related control methods for a pair of variable drive units. The variable drive units may be hydrostatic, continuously variable transmissions (CVTs), or other similar devices. The apparatus is shown in use with a vehicle that may include a mowing deck.

10 Claims, 45 Drawing Sheets

(56) References Cited

U.S. PATENT DOCUMENTS

| | | | |
|---|---|---|---|
| 3,559,020 | A | 1/1971 | Imaizumi et al. |
| 3,613,482 | A | 10/1971 | Benson, Jr. et al. |
| 3,669,466 | A | 6/1972 | Spence |
| 3,732,671 | A | 5/1973 | Allen et al. |
| 3,789,940 | A | 2/1974 | Burton |
| 3,809,975 | A | 5/1974 | Bartels |
| 3,914,938 | A | 10/1975 | Cornell et al. |
| 3,970,160 | A | 7/1976 | Nowick |
| 4,008,783 | A | 2/1977 | Herrmann et al. |
| 4,023,637 | A | 5/1977 | Jackovich |
| 4,140,031 | A | 2/1979 | Sibeud et al. |
| 4,175,728 | A | 11/1979 | Ferguson |
| 4,186,816 | A | 2/1980 | Pfundstein |
| 4,196,785 | A | 4/1980 | Downing, Jr. |
| 4,271,728 | A | 6/1981 | Wakamatsu |
| 4,446,941 | A | 5/1984 | Laurich-Trost |
| 4,449,598 | A | 5/1984 | Hones et al. |
| 4,493,228 | A | 1/1985 | Vukovich et al. |
| 4,557,343 | A | 12/1985 | Pickering |
| 4,567,969 | A | 2/1986 | Makita |
| 4,587,808 | A | 5/1986 | Watanake et al. |
| 4,691,148 | A | 9/1987 | Nicholls et al. |
| 4,802,546 | A | 2/1989 | Sakikawa et al. |
| 4,817,471 | A | 4/1989 | Tury |
| 4,827,721 | A | 5/1989 | Hayashi et al. |
| 4,841,793 | A | 6/1989 | Leigh-Monstevens et al. |
| 4,875,390 | A | 10/1989 | Hayashi et al. |
| 4,881,612 | A | 11/1989 | Yano et al. |
| 4,914,592 | A | 4/1990 | Callahan et al. |
| 4,922,769 | A | 5/1990 | Tury |
| 4,953,654 | A * | 9/1990 | Imaseki et al. ............... 180/197 |
| 4,957,183 | A | 9/1990 | Mullett et al. |
| 4,998,450 | A | 3/1991 | Nogle |
| 5,014,038 | A | 5/1991 | Leigh-Monstevens et al. |
| 5,024,285 | A * | 6/1991 | Fujita ............................ 180/197 |
| 5,033,763 | A | 7/1991 | Daenens et al. |
| 5,064,010 | A | 11/1991 | Masbruch et al. |
| 5,078,222 | A | 1/1992 | Hauser et al. |
| 5,090,512 | A | 2/1992 | Mullett et al. |
| RE34,057 | E | 9/1992 | Middlesworth |
| RE34,064 | E | 9/1992 | Tury et al. |
| 5,147,010 | A | 9/1992 | Olson et al. |
| 5,154,437 | A | 10/1992 | Inagaki et al. |
| 5,249,422 | A | 10/1993 | Smith et al. |
| 5,294,871 | A * | 3/1994 | Imaseki ........................ 318/139 |
| 5,314,387 | A | 5/1994 | Hauser et al. |
| 5,335,750 | A | 8/1994 | Geringer et al. |
| 5,376,868 | A * | 12/1994 | Toyoda et al. ................ 318/587 |
| 5,450,054 | A | 9/1995 | Schmersal |
| 5,481,460 | A | 1/1996 | Madaki et al. |
| 5,487,437 | A * | 1/1996 | Avitan .......................... 180/6.5 |
| 5,489,828 | A | 2/1996 | Palleggi |
| 5,502,957 | A | 4/1996 | Robertson |
| 5,529,135 | A | 6/1996 | Wenzel et al. |
| 5,542,251 | A * | 8/1996 | Leibing et al. ................ 60/426 |
| 5,606,892 | A | 3/1997 | Hedderly |
| 5,741,202 | A | 4/1998 | Huber |
| 5,743,347 | A | 4/1998 | Gingerich |
| 5,931,244 | A | 8/1999 | Renfroe et al. |
| 5,957,497 | A | 9/1999 | Johansson et al. |
| 5,994,857 | A * | 11/1999 | Peterson et al. .............. 318/282 |
| 6,012,540 | A | 1/2000 | Bohner et al. |
| 6,082,084 | A | 7/2000 | Reimers et al. |
| 6,089,341 | A | 7/2000 | Gingerich |
| 6,109,010 | A * | 8/2000 | Heal et al. .................... 56/10.8 |
| 6,138,069 | A | 10/2000 | Ellertson et al. |
| 6,152,255 | A | 11/2000 | Noro et al. |
| 6,184,637 | B1 | 2/2001 | Yamawaki et al. |
| 6,213,249 | B1 | 4/2001 | Noro et al. |
| 6,223,852 | B1 | 5/2001 | Mukai et al. |
| 6,226,580 | B1 | 5/2001 | Noro et al. |
| 6,257,357 | B1 | 7/2001 | Teal et al. |
| 6,260,655 | B1 | 7/2001 | Mukai et al. |
| 6,286,621 | B1 | 9/2001 | Mukai et al. |
| 6,295,887 | B1 | 10/2001 | DeJonge et al. |
| 6,298,941 | B1 | 10/2001 | Spadafora |
| 6,370,460 | B1 | 4/2002 | Kaufmann et al. |
| 6,408,972 | B1 | 6/2002 | Rodgers et al. |
| 6,484,838 | B1 | 11/2002 | Borsting et al. |
| 6,501,023 | B2 | 12/2002 | Tsunoda et al. |
| 6,520,274 | B1 | 2/2003 | McElmeel, Jr. et al. |
| 6,591,593 | B1 * | 7/2003 | Brandon et al. .............. 56/10.6 |
| 6,591,927 | B1 | 7/2003 | Honekamp et al. |
| 6,609,357 | B1 | 8/2003 | Davis et al. |
| 6,659,218 | B2 | 12/2003 | Thomas et al. |
| 6,717,281 | B1 | 4/2004 | Brandon et al. |
| 6,755,461 | B2 | 6/2004 | Seksaria et al. |
| 6,775,976 | B1 | 8/2004 | Phanco et al. |
| 6,817,437 | B2 | 11/2004 | Magnus et al. |
| 6,874,305 | B2 | 4/2005 | Ishimori |
| 6,955,046 | B1 | 10/2005 | Holder et al. |
| 6,962,219 | B2 | 11/2005 | Hauser |
| 6,988,570 | B2 * | 1/2006 | Takeuchi ...................... 180/6.48 |
| 7,003,950 | B1 | 2/2006 | Holder et al. |
| 7,017,327 | B2 | 3/2006 | Hunt et al. |
| 7,024,853 | B1 | 4/2006 | Holder et al. |
| 7,073,330 | B1 | 7/2006 | Hauser |
| RE39,255 | E | 9/2006 | Ishii et al. |
| 7,134,276 | B1 | 11/2006 | Langenfeld et al. |
| 7,140,640 | B2 | 11/2006 | Tronville et al. |
| 7,165,398 | B1 | 1/2007 | Holder et al. |
| 7,172,041 | B2 | 2/2007 | Wuertz et al. |
| 7,195,087 | B2 * | 3/2007 | Hatsuda et al. .......... 180/65.285 |
| 7,237,629 | B1 | 7/2007 | Bland et al. |
| 7,357,215 | B2 * | 4/2008 | Nakashima .................... 180/403 |
| 7,578,361 | B2 * | 8/2009 | Thacher ......................... 180/6.3 |
| 2002/0026268 | A1 | 2/2002 | Millsap et al. |
| 2004/0054459 | A1 * | 3/2004 | Brooks et al. .................... 701/82 |
| 2004/0103659 | A1 | 6/2004 | Johnson et al. |
| 2005/0274560 | A1 * | 12/2005 | Wakao et al. .................. 180/197 |
| 2006/0015236 | A1 * | 1/2006 | Yamaguchi et al. ............ 701/69 |
| 2008/0100238 | A1 | 5/2008 | Shaw |
| 2008/0121443 | A1 | 5/2008 | Clark et al. |
| 2008/0135313 | A1 | 6/2008 | Onderko et al. |
| 2008/0234096 | A1 | 9/2008 | Joshi et al. |
| 2008/0277188 | A1 * | 11/2008 | Hauser et al. ................. 180/422 |
| 2009/0000839 | A1 * | 1/2009 | Ishii et al. .................... 180/65.5 |
| 2009/0069964 | A1 * | 3/2009 | Wyatt et al. ..................... 701/22 |
| 2009/0108671 | A1 * | 4/2009 | Maeda et al. .................. 303/146 |

FOREIGN PATENT DOCUMENTS

| | | |
|---|---|---|
| WO | WO 2007/014030 A2 | 2/2007 |
| WO | WO 2008/005886 A2 | 1/2008 |
| WO | WO 2008/049025 A2 | 4/2008 |
| WO | WO 2010/011625 A2 | 1/2010 |
| WO | WO 2010/011625 A3 | 1/2010 |

OTHER PUBLICATIONS

International Search Report and Wirtten Opinion of the International Search Authority dated Feb. 12, 2008 for PCT Application PCT/US2007/072567.

Communication pursuant to Article 94(3) EPC dated Jun. 29, 2009 with regard to European App. No. 07 799 218.8.

International Search Report completed on Mar. 24, 2010 with respect to International Publication No. WO 2010/011625 A3.

International Preliminary Report on Patentability and the Written Opinion of the International Searching Authority issued with respect to International Application No. PCT/US2009/015210.

Office Action issued on Mar. 5, 2010 with respect to U.S. Appl. No. 11/771,559.

The International Search Report and Written Opinion of The International Searching Authority mailed on Mar. 25, 2010 with respect to International Patent Application No. PCT/US2009/051210.

\* cited by examiner

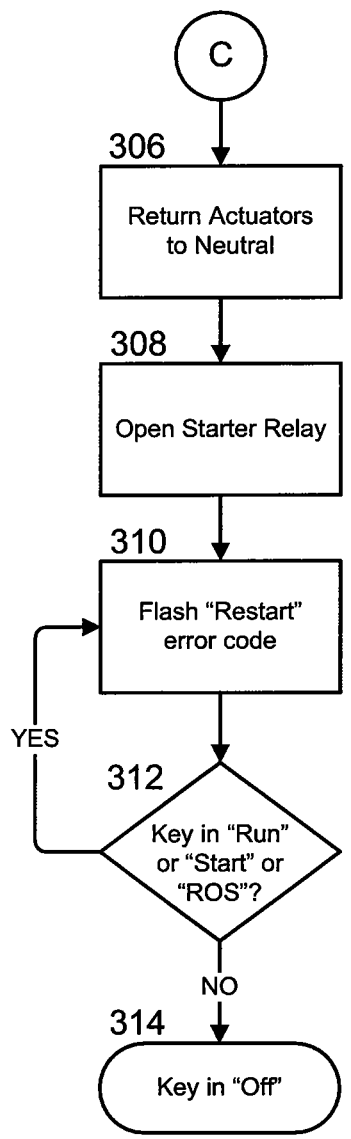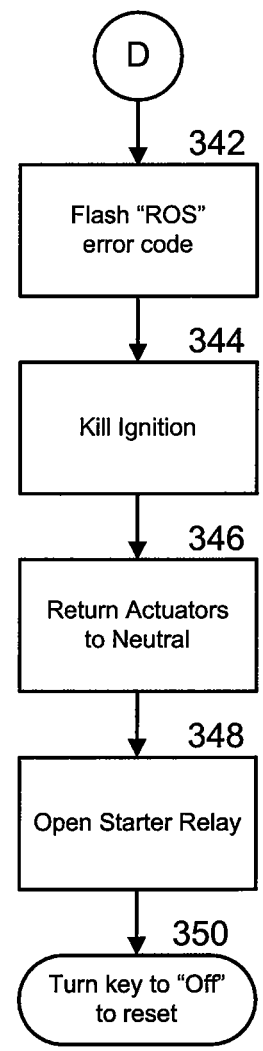
FIG. 23                    FIG. 24

ELECTRONIC STEERING APPARATUS

CROSS-REFERENCE TO RELATED APPLICATIONS

This application claims priority to U.S. provisional patent application Ser. No. 60/819,192, filed on Jul. 7, 2006, which is hereby incorporated by reference as if fully set forth herein.

BACKGROUND OF THE INVENTION

This application is related to steering mechanisms for zero turn vehicles. Such mechanisms have generally relied upon a pair of individual controls to control two individual transmissions or transaxles for steering. Steering has also been accomplished with a steering mechanism and mechanical linkages. However, these mechanisms are complex and present challenges, especially in the area of control.

SUMMARY OF THE INVENTION

The present invention comprises an electronic steering apparatus using electronics and control processes to operate a pair of continuously variable transmissions, such as hydrostatic transmissions. Electric actuators receive signals from the electronics in accordance with the control processes to operate each transmission.

A better understanding of the objects, advantages, features, properties and relationships of the invention will be obtained from the following detailed description and accompanying drawings which set forth illustrative embodiments and are indicative of the various ways in which the principles of the invention may be employed.

BRIEF DESCRIPTION OF THE DRAWINGS

FIG. 23 is a flow chart of a control process of the drive control system, showing shutdown of the vehicle.

FIG. 24 is a flow chart of a control process of the drive control system, showing shutdown of the vehicle due to a malfunctioning reverse operating system.

DETAILED DESCRIPTION OF THE DRAWINGS

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents. Some system components are identified by manufacturers' part numbers in order to improve teaching and understanding, but this is not to be construed as limiting any embodiment described herein to any specific manufacturer's product.

Figure 1:
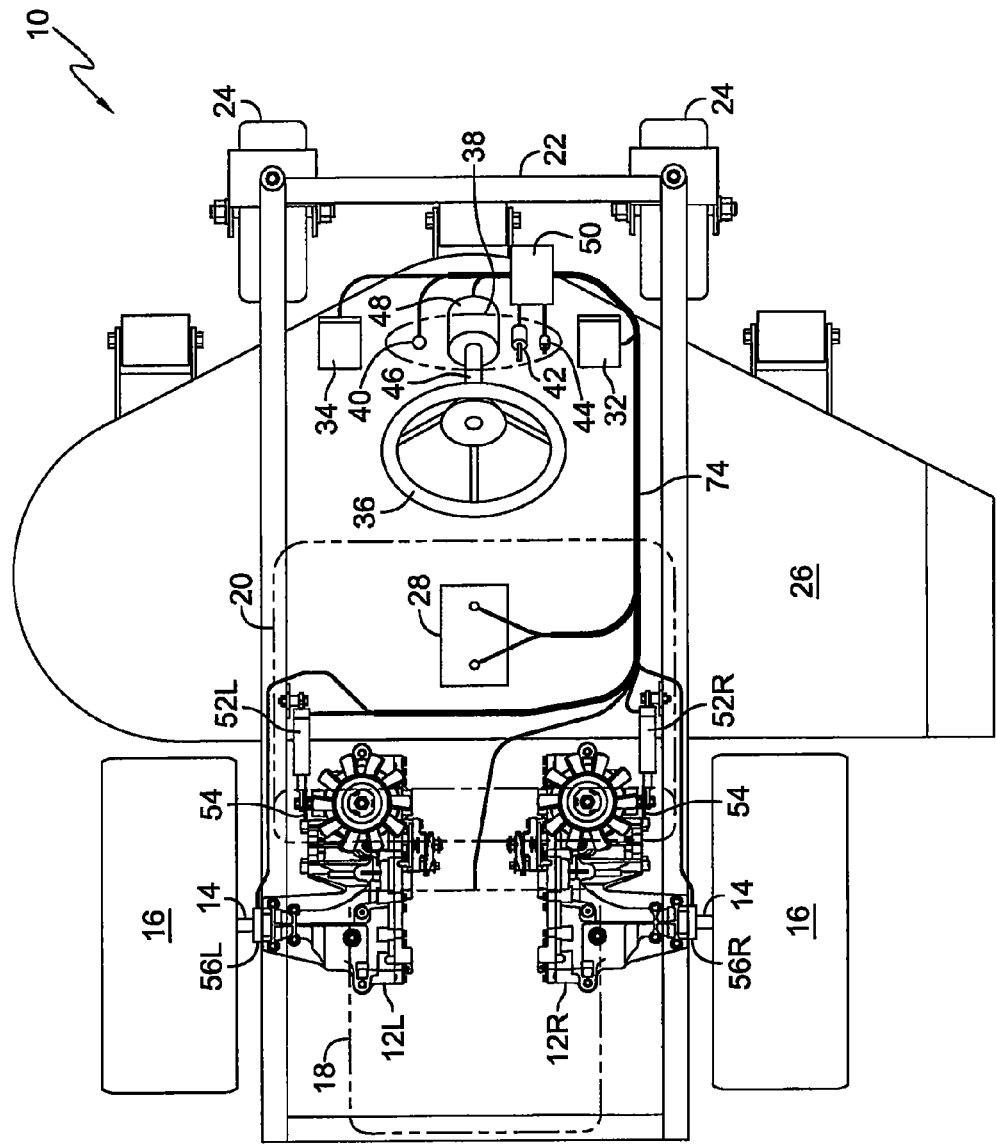
FIG. 1 is a top plan view of a vehicle incorporating an embodiment of a drive control system in accordance with the principles of the present invention.

FIGS. 1 through 11 illustrate a first embodiment of a drive control system 30 in accordance with the principles of the present invention. FIG. 1 shows a vehicle 10, which includes a prime mover 18, a seat 20, a frame 22, a set of pivotable front casters 24 and a mower deck 26. Vehicle 10 also includes a pair of transaxles or transmissions 12L and 12R that independently drive a pair of output shafts 14, which in turn, each drive one of a pair of wheels 16 that provide motion to vehicle 10. While the embodiments shown and described herein utilize hydrostatic transmissions, this invention is also applicable to other types of drive systems, such as, for example, continuously variable drive systems, continuously variable transmissions (CVTs) and hydraulic drive systems with a variable pump and/or motor. Accordingly, the terms "transmission" and "transaxle" are used herein for convenience and are not used to limit the present invention. Furthermore, although a mowing vehicle is shown in FIG. 1, the present invention can be applied to other vehicle types as well.

Figure 2:
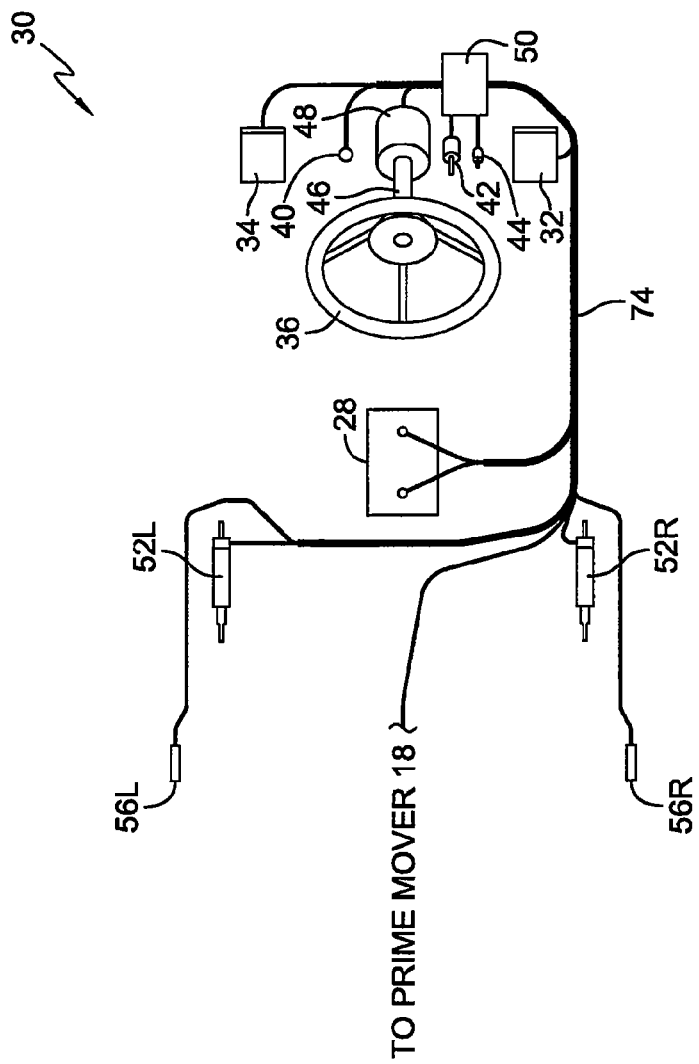
FIG. 2 is a view of the drive control system incorporated in the vehicle depicted in FIG. 1.
Figure 3:
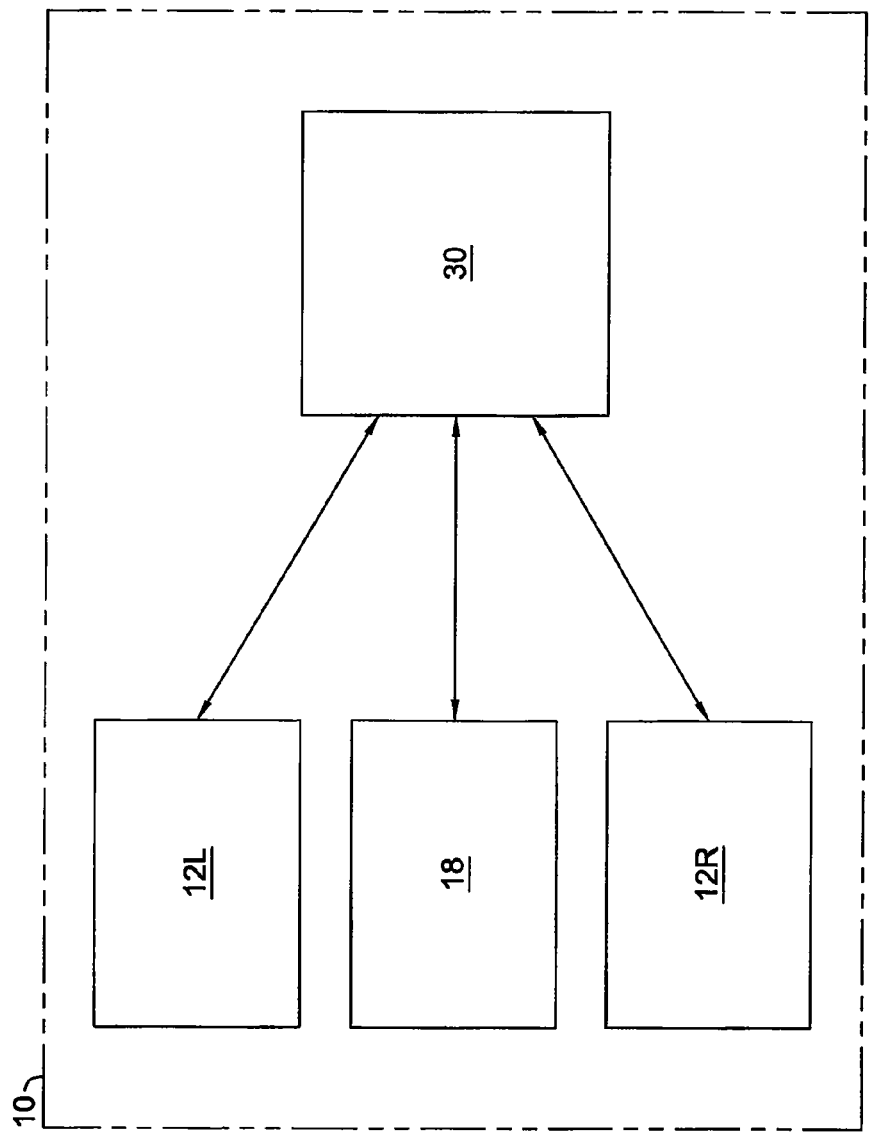
FIG. 3 is a block diagram of the vehicle depicted in FIG. 1 in accordance with the principles of the present invention.

Vehicle 10 also includes a plurality of systems to perform various functions, such as a drive control system 30, which is illustrated in FIG. 2. A general overview of the interaction between control system 30 and other portions of vehicle 10 is shown in the block diagram of FIG. 3. As shown in FIG. 3, drive control system 30 receives input from and controls transmission 12L and 12R and prime mover 18.

Referring to FIGS. 1 and 2, drive control system 30 may include a controller 50 that receives signals from, and sends signals to, various portions of drive control system 30. Drive control system 30 may include actuators 52L and 52R that are each respectively drivingly attached to a control arm 54 of each transmission 12L and 12R. External linear actuators 52L and 52R are shown, but rotary actuators, which are also known, may be substituted and drivingly attached to control arms 54. Optionally, internal actuators or electrically controlled proportional valves may be used in lieu of external actuators 52L and 52R. Each transmission 12L and 12R may be a configuration similar to that disclosed in U.S. Pat. No. 7,134,276, the terms of which are incorporated herein by reference. In the transmission disclosed in that patent, the transmission control arm is connected to a swash plate mechanism that is adjustable to control the direction and amount of fluid flow from a hydraulic pump to a hydraulic motor. This arrangement allows the speed of each transmission 12L and 12R to be adjustable by adjusting each individual actuator 52L and 52R. Accordingly, vehicle 10 may be steered and driven in a forward or reverse direction by varying the speed of each individual transmission 12L and 12R. A wiring harness or assembly 74 is connected to the various elements of drive control system 30 to electrically connect the various elements together. Wiring harness 74 may place wires together so that wires carrying signals are grouped together and wires carrying power and drive signals are grouped together.

As shown in FIGS. 1 and 2, a power system 28 is provided to operate some vehicle systems, including drive control system 30. In a particular embodiment, power system 28 is a battery. An accelerator pedal 32 or a foot or hand-operated control device establishes the direction and speed of operation of transmissions 12L and 12R. A brake pedal 34 actuates a brake system located either as part of transmissions 12L and 12R or as a separate device. In a particular embodiment, steering wheel 36 facilitates steering of vehicle 10. In a particular embodiment, steering wheel 36 includes a steering column 46 that mates with a steering position sensor 48. An equivalent hand or foot-operated steering device may be used in lieu of steering wheel 36 and steering column 46. In a particular embodiment, a vehicle dash 38 or an equivalent includes an LED or indicator light 40 of drive control system 30, a vehicle ignition switch 42, and a power take-off switch 44.

Figure 4:
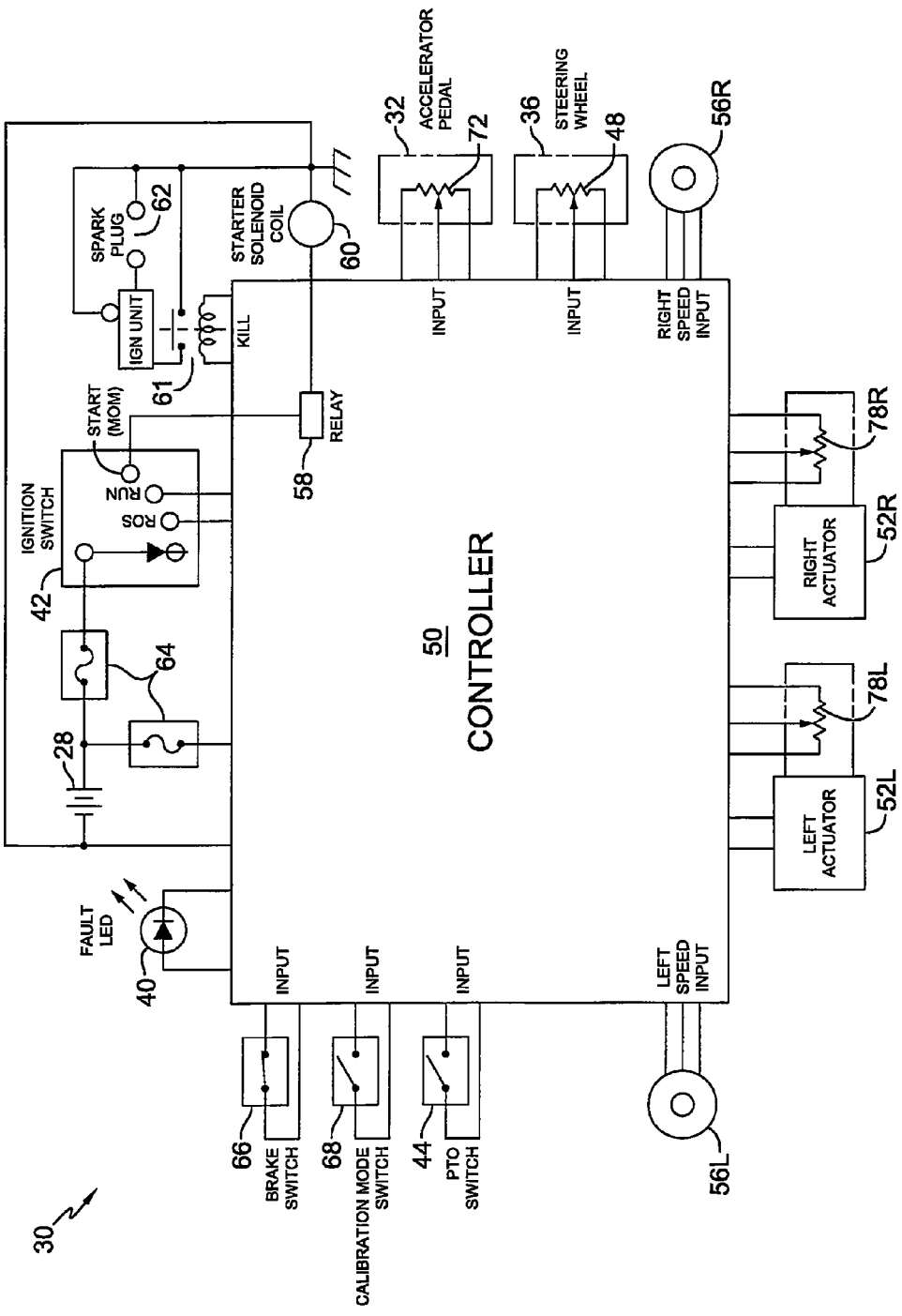
FIG. 4 is a block diagram of certain portions of the drive control system of the vehicle shown in FIG. 1.
Figure 5:
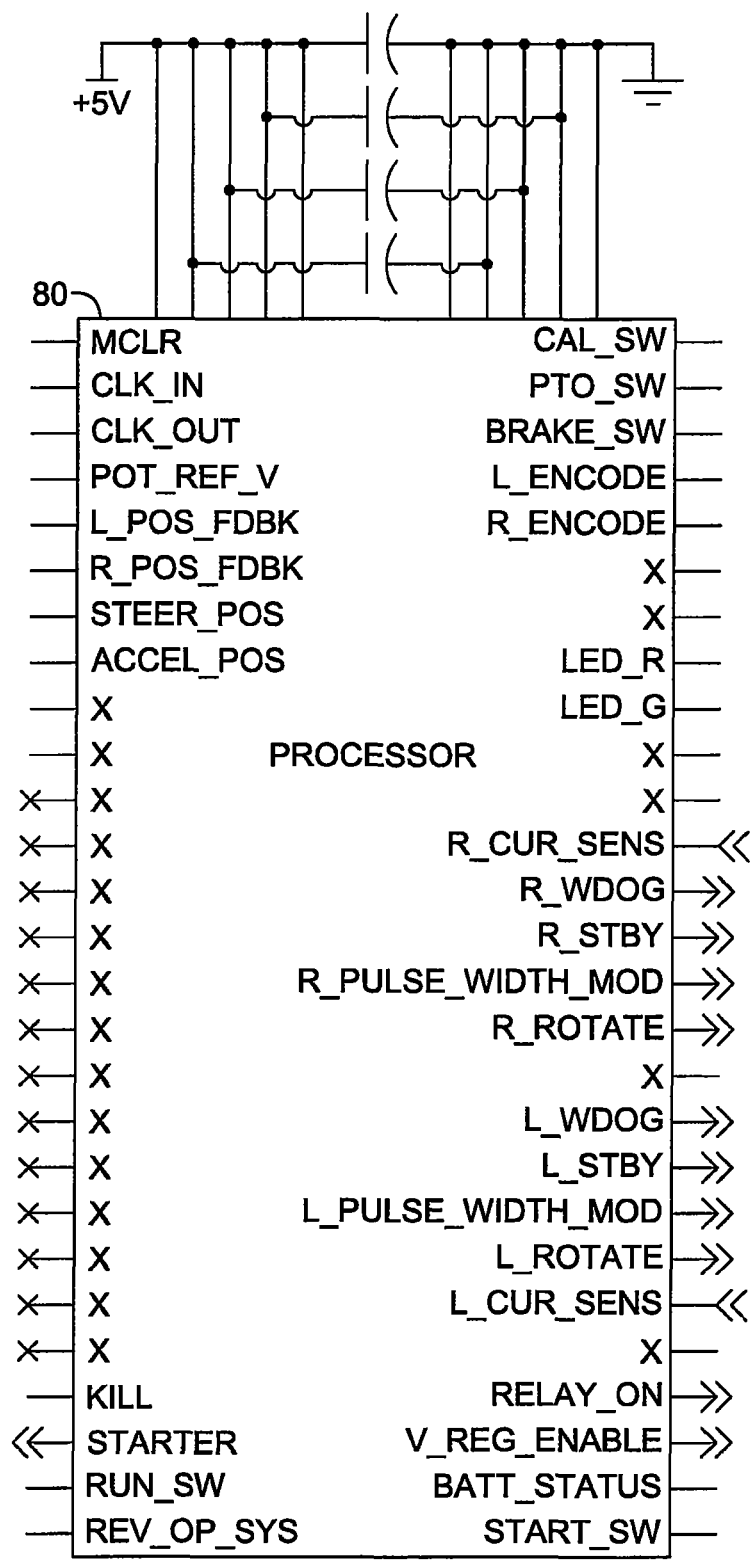
FIG. 5 is a schematic of a processor of the drive control system showing inputs to and outputs from the processor.

The block diagram shown in FIG. 4 illustrates an embodiment of drive control system 30 in more detail. Note that the following description describes a representative array of elements. Some of these elements may be optional for a particular embodiment. In other embodiments additional elements may be desirable. For example, a left speed sensor 56L and a right speed sensor 56R may be unnecessary in some applications. In another example, additional sensors may be desired to improve operator satisfaction. Such sensors may include thermocouples, proximity aids, and other devices relevant to the operation of a typical vehicle.

Controller 50 controls three general categories of functionality: (1) starting and running vehicle 10, (2) operational parameters or constraints for drive control system 30, and (3) adjustment of actuators 52L and 52R. Each of these general categories is discussed below.

There are several control aspects related to starting and running vehicle 10. Because vehicle 10 is steered, accelerated and decelerated electrically, a diagnostic routine is performed on the electronics prior to permitting vehicle 10 to be started. Referring again to FIG. 4, controller 50 performs an array of diagnostics when ignition switch 42 is rotated to the start position. Once diagnostics have successfully been completed, a relay 58 permits actuation of a starter solenoid 60. An additional relay 61 is in communication with the ignition unit and serves to shut down prime mover 18 under certain conditions. As will be noted in more detail later, controller 50 continuously monitors a variety of conditions and has the ability to shut down prime mover 18 by grounding spark plug 62. Once prime mover 18 has been started, the operator releases ignition switch 42 and ignition switch 42 moves to the run position. In a particular embodiment, ignition switch 42 also includes an ROS position. In the ROS position, a reverse operating system, which would normally stop the blades of deck 26 when vehicle 10 operates in reverse, may be bypassed to permit operation of the mower blades when vehicle 10 is operated in reverse. Power source 28 is utilized to provide starting power to vehicle 10. A related set of fuses or circuit breakers 64 may be provided to protect drive control system 30 from a power surge or a ground fault.

Controller 50 also receives signals that relate to the operation of vehicle 10. Referring to FIGS. 2 and 4, brake pedal 34 may actuate a brake switch 66 to signal to controller 50 that brake pedal 34 has been actuated. An optional calibration mode switch 68 may be provided that permits portions of controller 50 to be reprogrammed. Actuation of the cutting blades of mower deck 26 may also actuate a power take-off switch 44, which signals to controller 50 that the blades have been powered. Other signals may be desirable to permit controller 50 to provide for safe and effective operation of vehicle 10. For example, it is envisioned that some vehicles may find an inclinometer to be desirable to advise an operator of a potentially unsafe operating condition. In a particular embodiment, controller 50 may provide an indication of the operating condition of drive control system 30 by way of an indicator such as LED or indicator light 40. Optionally, text or graphical symbols indicating the operating condition of drive control system 30 may be displayed on an LCD screen (not shown) or other display device.

The remaining control aspects of controller 50 relate to operation of left actuator 52L and right actuator 52R. Referring again to FIGS. 2 and 4, accelerator pedal 32 actuates a sensor 72 that informs controller 50 of an operator-directed vehicle acceleration or deceleration in either the forward or reverse direction. In a particular embodiment, sensor 72 may be a potentiometer, Hall Effect sensor, or other device that can sense or signal a change in acceleration or position. Steering wheel 36 actuates a sensor 48 that informs controller 50 of an operator directed vehicle turn. In a particular embodiment, sensor 48 may be a potentiometer, Hall Effect sensor, or other device that can sense or signal a change in position of steering wheel 36. Each actuator 52R and 52L may respectively include a sensor 78L or 78R, such as a feedback potentiometer, Hall Effect sensor, or other type sensor capable of providing positional information. Each feedback potentiometer 78L and 78R provides information to controller 50 regarding the respective position of left actuator 52L and right actuator 52R.

Each axle shaft 14 may optionally have a respective speed sensor 56L and 56R associated with it. Speed sensors may be used for several purposes, such as, for example, a method for determining the neutral position, or neutral state, of transmissions 12L and 12R (sometimes referred to as "neutral."). The neutral position of transmissions 12L and 12R may be defined in terms of a position of each control arm 54 of each transmission 12L and 12R that does not cause movement of axle shafts 14. If speed sensors 56L and 56R do not detect any movement of axle shafts 14, control arms 54 are presumed to be in the "neutral" position, and hence, transmissions 12L and 12R are presumed to be in the neutral position. Speed sensors 56L and 56R therefore would, among other things, enhance the ability to establish the non-rotating condition of axle shafts 14, thereby further defining the neutral position. This type of closed-loop system may also be used to govern vehicle speed more accurately and compensate for hydraulic system losses or inefficiencies.

Throughout the following discussion reference will be made to a microprocessor or processor 80, which, in a particular embodiment, is part of controller 50. Processor 80, as configured for the first embodiment disclosed herein, is shown schematically in FIG. 5. In a particular embodiment, processor 80 is a PIC18F6620 microcontroller manufactured by Microchip Technology Incorporated. However, many other types of processors, programmable logic controllers (PLCs), or the like could be utilized in accordance with the principles of the present invention. For purposes of simplicity, some of the drawings described herein may illustrate only the portion of the processor being described in connection with a particular drawing, with the understanding that the processor may appear as illustrated schematically in FIG. 5.

Drive control system 30 will now be described in more detail.

Figure 6:
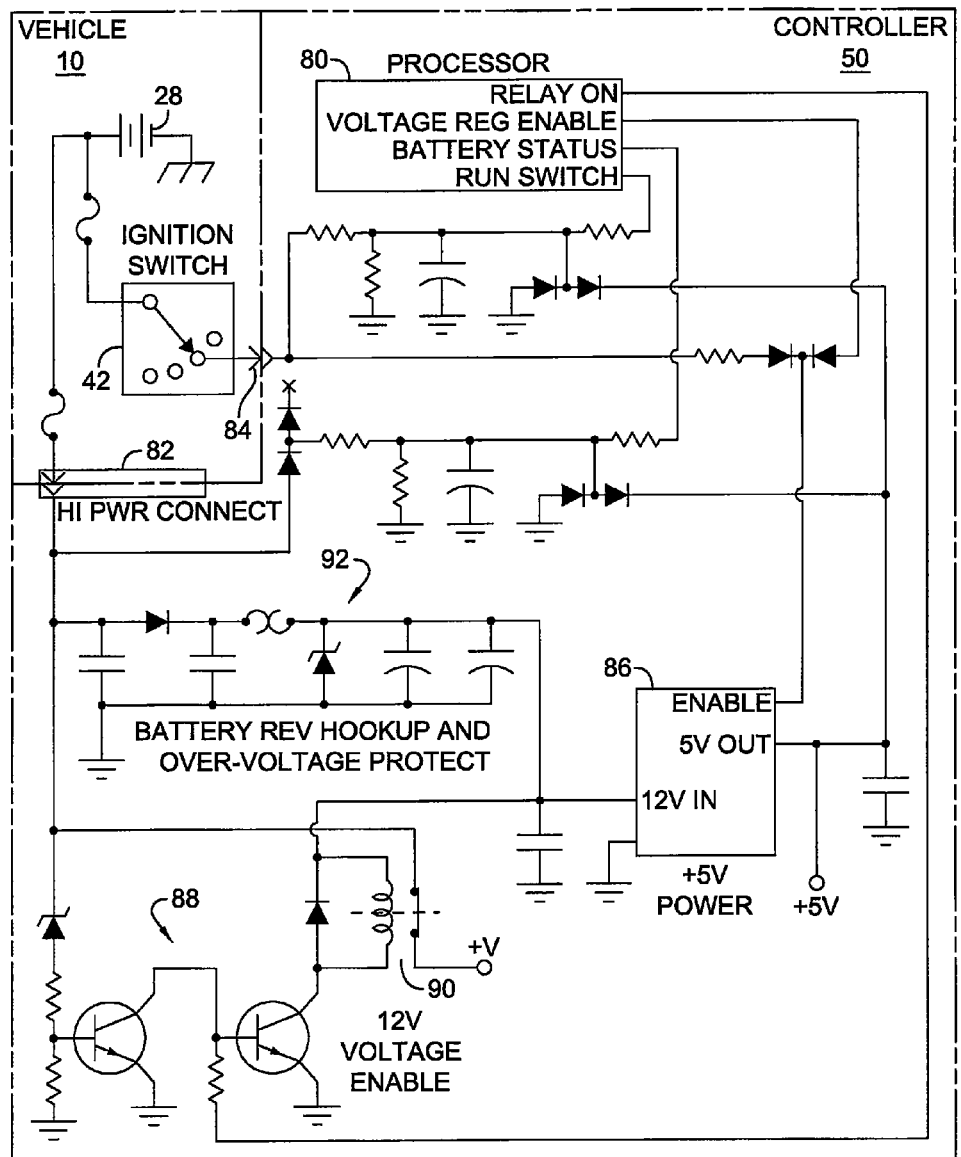
FIG. 6 is a schematic of one portion of the drive control system showing the power supply with the ignition switch in the run position.

Referring to FIG. 6, the power supplies and run circuit for drive control system 30 are illustrated. Power is connected from a voltage source, which is shown in this embodiment as battery 28, through a power connector 82 to controller 50. Battery 28 provides 12V power for use by components of drive control system 30, including a +5V power supply 86 and a 12V voltage enable relay 90. In a particular embodiment, power supply 86 is an LD29150PT50 voltage regulator manufactured by STMicroelectronics. Power supply 86 can take other forms that are known in the art. A reverse-battery-hookup and over-voltage protection circuit 92 is in electrical communication with battery 28, power supply 86 and relay 90 to protect drive control system 30 from reverse polarity and excessive voltage conditions. Power supply 86 is also in electrical communication with a signal connector 84, which is in electrical communication with ignition switch 42. +5V power supply 86 is enabled through connector 84 when ignition switch 42 is in the run position. With ignition switch 42 in the run position and with the presence of +5V power from power supply 86, processor 80 provides a signal through an amplifier 88 to 12V enable relay 90 to activate it. Once 12V enable relay 90 has been activated, unfiltered 12V power from battery 28 is provided for use at various locations in drive control system 30.

In this particular embodiment, the operating voltage of drive control system 30 is maintained until actuators 52L and 52R are returned to the neutral position. As such, power supply 86 must remain enabled to accomplish the return-to-neutral even when ignition switch 42 is switched to another position. Thus, a voltage regulator enable signal is also provided by +5V power supply 86 until processor 80 determines that it is safe to permit removal of voltage from drive control system 30, at which time the voltage regulator enable signal would be removed and power supply 86 would be disabled. Processor 80 would then remove the signal from amplifier 88, disconnecting unfiltered 12V power from drive control system 30.

Figure 7:
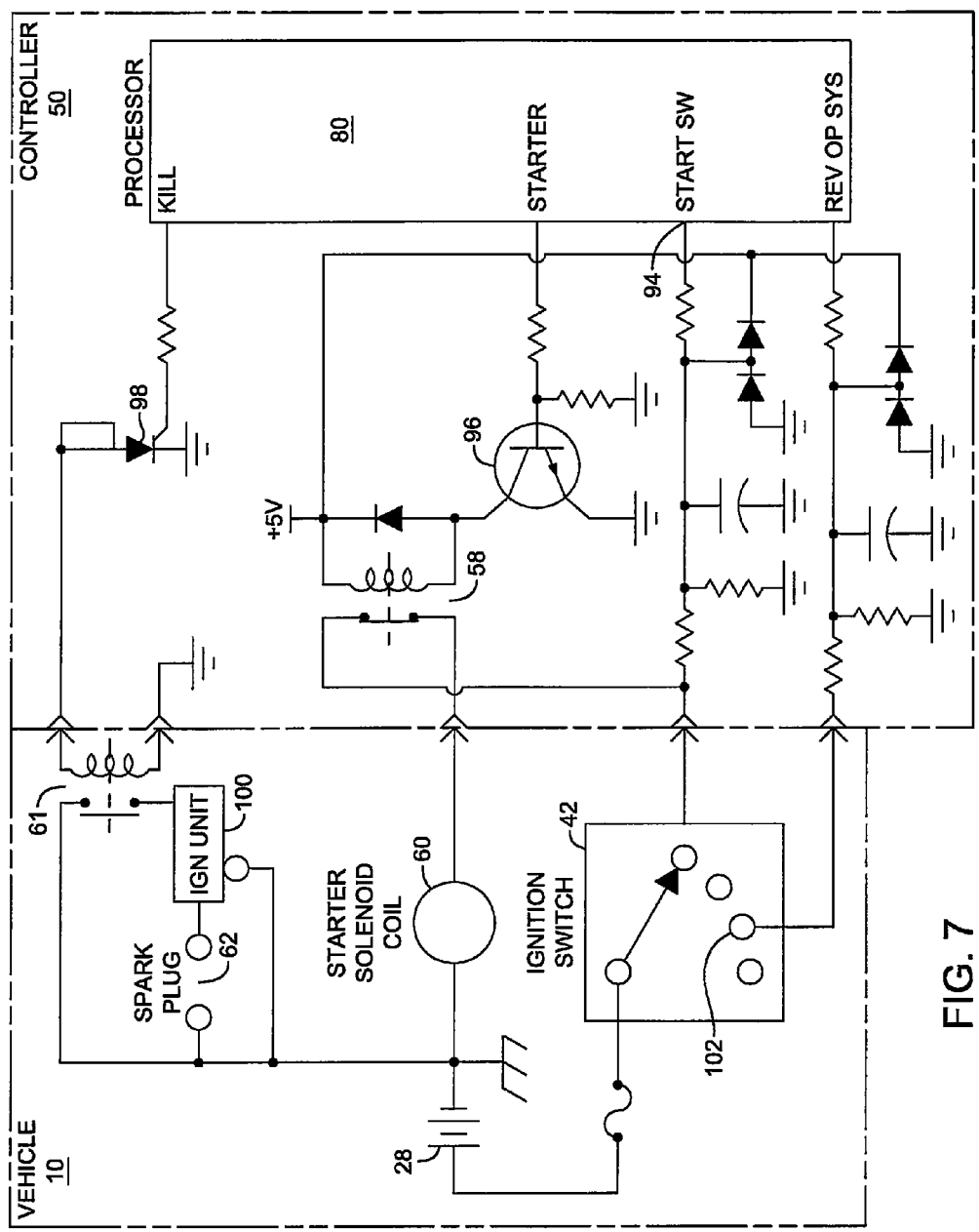
FIG. 7 is a schematic of one portion of the drive control system showing the vehicle start circuit along with certain other drive control system features.
Figure 8:
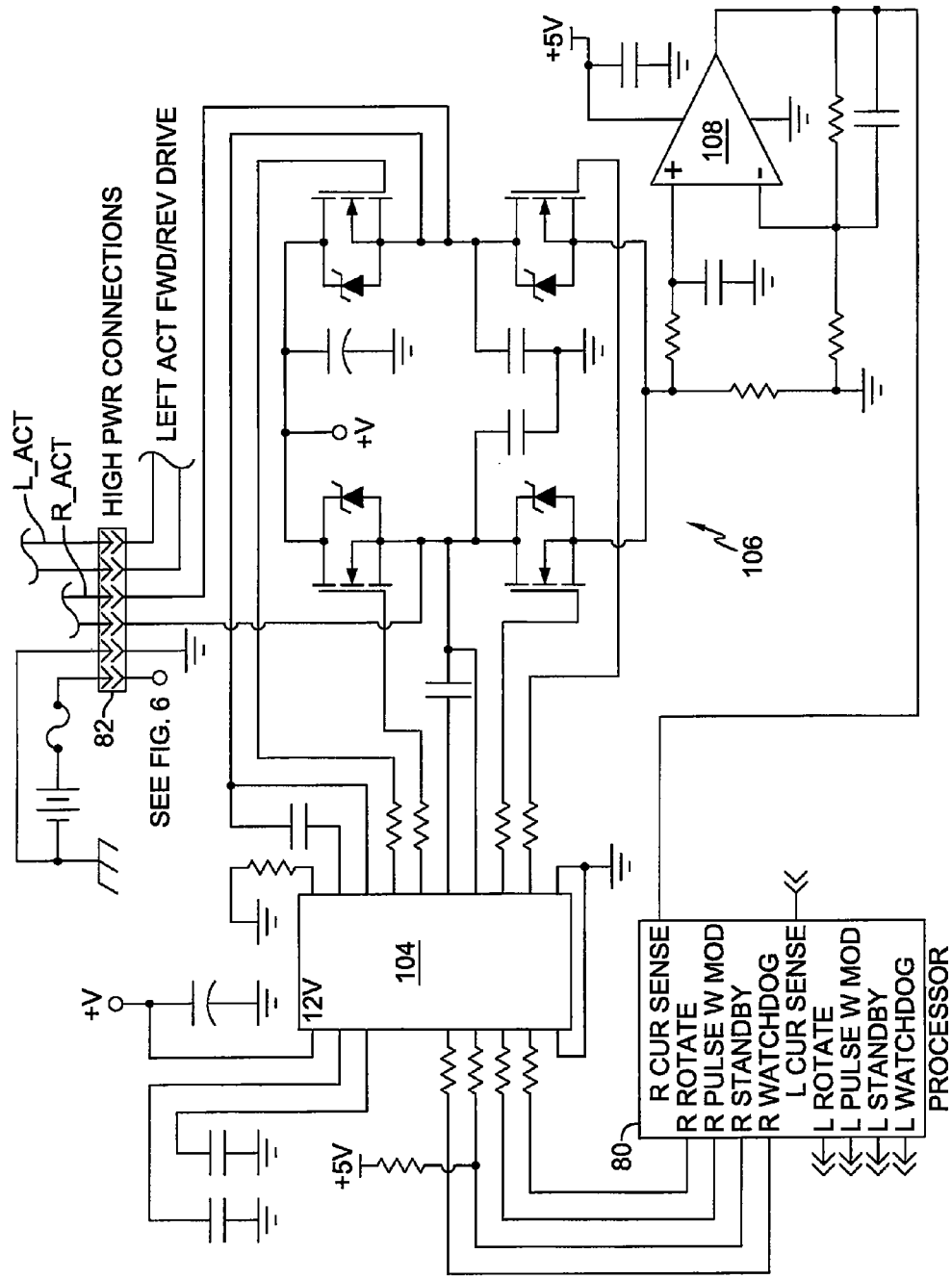
FIG. 8 is a schematic of one portion of the drive control system showing the drive circuits for one transaxle actuator.

Turning now to FIG. 7, the start, kill and reverse operating system functions are illustrated. When ignition switch 42 is placed in the start position, as shown in FIG. 7, voltage from battery 28 is provided to start switch input 94 of processor 80 as well as to relay 58. Processor 80 may perform a variety of functions prior to causing actuation of relay 58 (these functions will be described in more detail below). Processor 80 actuates relay 58 by sending a signal to a transistor 96, which then causes actuation of relay 58. Relay 58 is shown in an actuated state in FIG. 7. When relay 58 is actuated, it completes a voltage path to starter solenoid 60, which in turn permits vehicle 10 to be started.

Referring again to FIG. 7, processor 80 may provide a biasing voltage to a diode 98 that allows diode 98 to turn on and energize relay 61, which causes grounding of the signal from an ignition unit 100 should processor 80 determine that vehicle 10 has attained an impermissible operating condition. Grounding the signal from ignition unit 100 prevents spark plug 62 located in prime mover 18 from firing and thereby halts operation of prime mover 18. Thus, processor 80 has the ability to stop or "kill" operation of prime mover 18.

Ignition switch 42 may be rotated to a reverse operating system (ROS) contact position 102 as shown in FIG. 7. In this position, a signal is sent to processor 80 that indicates an operator desires mower deck 26 to keep operating even when vehicle 10 is operating or moving in a reverse direction. Many mowing vehicles have one of two types of systems to prevent mower deck 26 operation in reverse. One type of system involves removing power to an electric clutch in response to a reverse operation condition, which thus causes mower deck 26 to cease operation. The other type of system causes prime mover 18 to cease operation. Contact position 102 of ignition switch 42 enables drive control system 30 to allow operation of mower deck 26 or prime mover 18 during reverse movement or operation of vehicle 10. Additionally, reverse operating system contact position 102 could be used to enable other devices, such as a visual or audible alarm, proximity sensors for obstacle detection, a video display, etc., either individually or in combination.

As previously noted, drive control system 30 provides power to actuators 52L and 52R. The power for each actuator 52L and 52R is provided through a circuit like that shown in FIG. 8, which illustrates the power circuit for right actuator 52R. Processor 80 determines the length of time and direction that each actuator 52L and 52R is required to move based on signals from a variety of sources, as will be explained in more detail below. Processor 80 provides signals to an H-bridge MOSFET driver 104, which, in a particular embodiment, is a TD340H-bridge quad power MOSFET driver supplied by STMicroelectronics. MOSFET driver 104 then provides drive signals as directed by processor 80 to a MOSFET H-bridge 106. Note that the functions of the H-bridge could be accomplished by other designs, such as, for example, a half H-bridge configuration. The output from MOSFET H-bridge 106 is directed through power connector 82 to actuator 52R. A current sense op-amp 108 is also provided, which, in a particular embodiment, is an LMV321 operational amplifier supplied by National Semiconductor. The output of op-amp 108 is provided to processor 80 to enable processor 80 to determine that MOSFET H-bridge 106 is operating properly.

Figure 9:
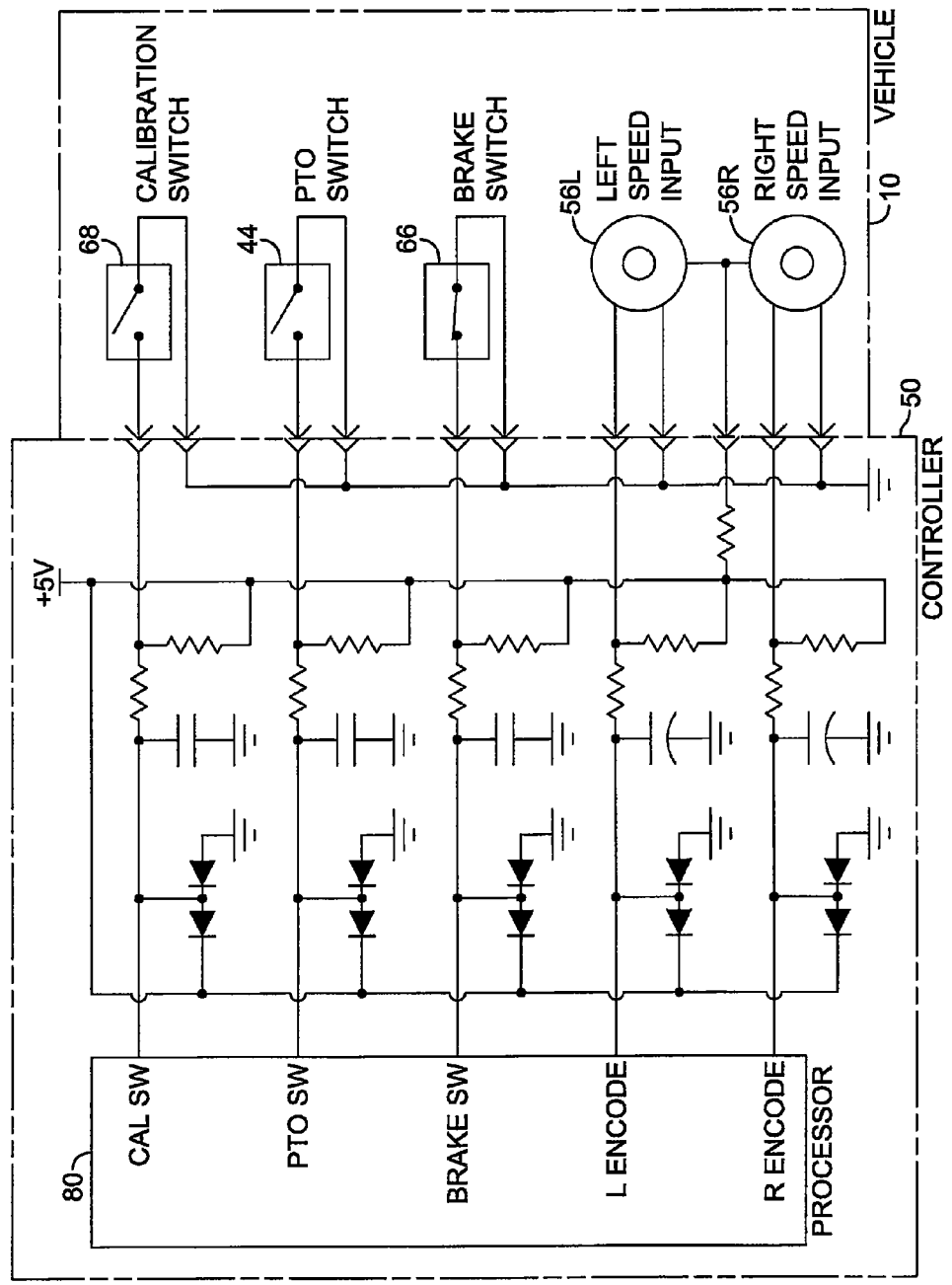
FIG. 9 is a schematic of one portion of the drive control system showing some sensor inputs to the drive control system processor.

FIG. 9 illustrates some of the various inputs that may be connected to processor 80. Processor 80 is in electrical communication with brake switch 66, which is activated by brake pedal 34. Brake switch 66 may be located such that actuation of brake pedal 34 or other similar brake actuating device causes switch 66 to be actuated. In a particular embodiment, brake switch 66 is located on transmissions 12L and 12R or is part of the brake linkage connected to brake pedal 34.

Referring to FIG. 9, processor 80 is in electrical communication with power take-off switch 44 in order to govern power to an auxiliary device such as the blades of mower deck 26. When an actuating handle or switch for the blades of mower deck 26 is engaged, power take-off switch 44 may be actuated to inform processor 80 of such engagement. Actuation of power take-off switch 44 may also be a part of an optional reverse operating system and may work in conjunction with a position of ignition switch 42 to allow the blades of mower deck 26 to continue to operate even when vehicle 10 is operated in the reverse direction.

Referring again to FIG. 9, in this embodiment, processor 80 is also in electrical communication with calibration switch 68, which permits reprogramming of processor 80. Optional speed sensors 56L and 56R are available to provide speed information for each axle shaft 14.

Figure 10:
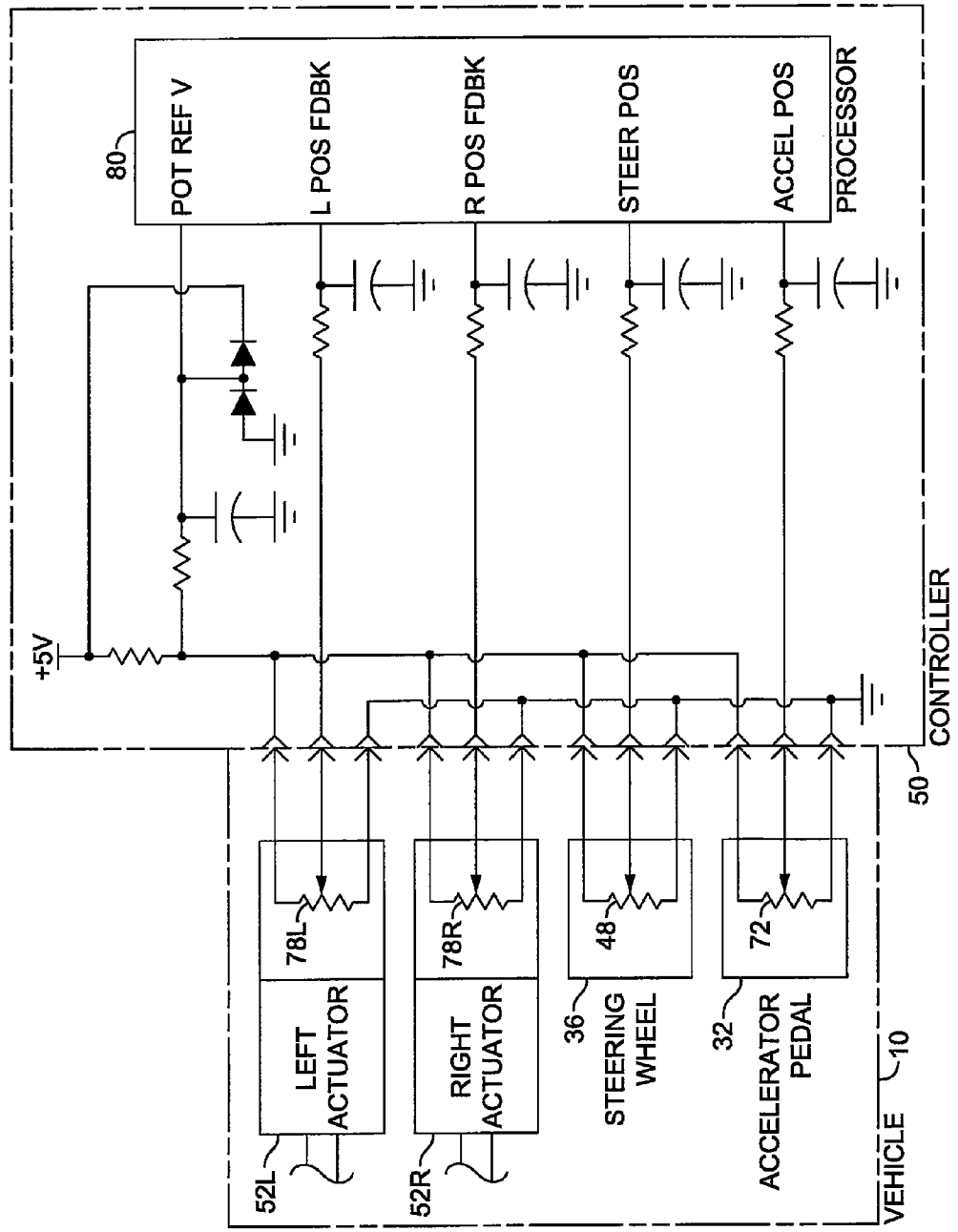
FIG. 10 is a schematic of one portion of the drive control system showing some sensor inputs to the drive control system processor.

FIG. 10 illustrates inputs to processor 80 that are directly involved in the movement of actuators 52L and 52R. Accelerator pedal 32 is associated with a sensor in the form of potentiometer 72 that provides information to processor 80 regarding the desired direction and speed of vehicle 10. Steering wheel 36 is associated with steering position sensor 48 that provides information related to the direction and desired amount of steering to processor 80. Each actuator 52L and 52R is respectively associated with actuator feedback potentiometers 78L and 78R, which provide feedback to processor 80 so that processor 80 is able to determine when each actuator 52L and 52R has reached its expected position.

Figure 11:
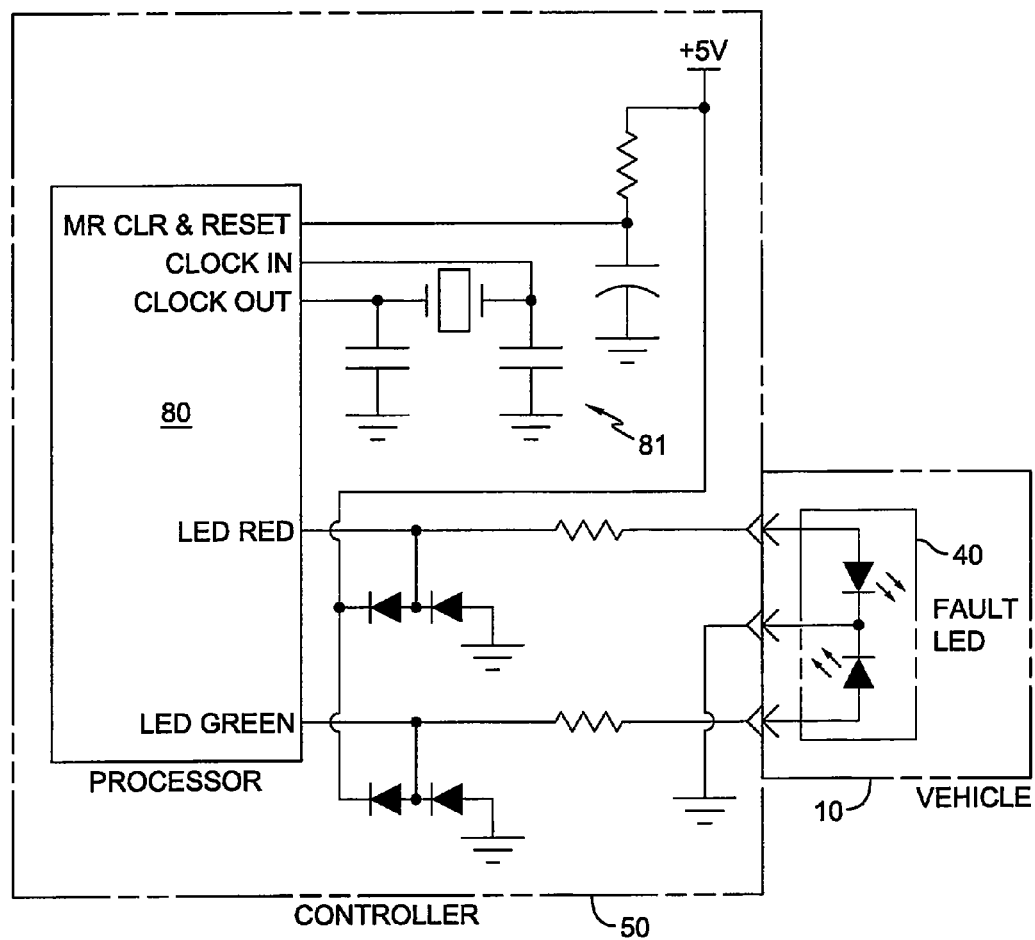
FIG. 11 is a schematic of one portion of the drive control system showing an optional processor clock and the outputs to an indicator light.

FIG. 11 illustrates an optional external clock 81 that controls the processing speed of processor 80. Processor 80 has an internal clock, but processor 80 is capable of higher processing speeds by using external clock 81. Use of external clock 81 may be desirable in some circumstances where a particular vehicle requires a faster than usual response in order to maintain end user satisfaction. Also shown in FIG. 11 is the connection between processor 80 and indicator light or LED 40. Indicator light 40 may have colored output such as red and green to indicate the status of drive control system 30.

In accordance with the principles of the present invention, drive control system 30 utilizes a number of methods and control routines to provide control functionality. In a particular embodiment, the control functions and methods of drive control system 30 are implemented by software in conjunction with processor 80. FIGS. 12 through 24 illustrate flow charts that describe embodiments of control functions and methods in accordance with the principles of the present invention that are preferably implemented in connection with the first embodiment of drive control system 30, but can also be implemented with other embodiments and other control systems as well. FIGS. 12 through 24 utilize various acronyms in order to keep the size of the flow charts and the flow chart labels reasonable. The terminology used in the flow charts is set forth in full form throughout the following description, though the acronym may be used interchangeably with the full form of a particular term.

Figure 12:
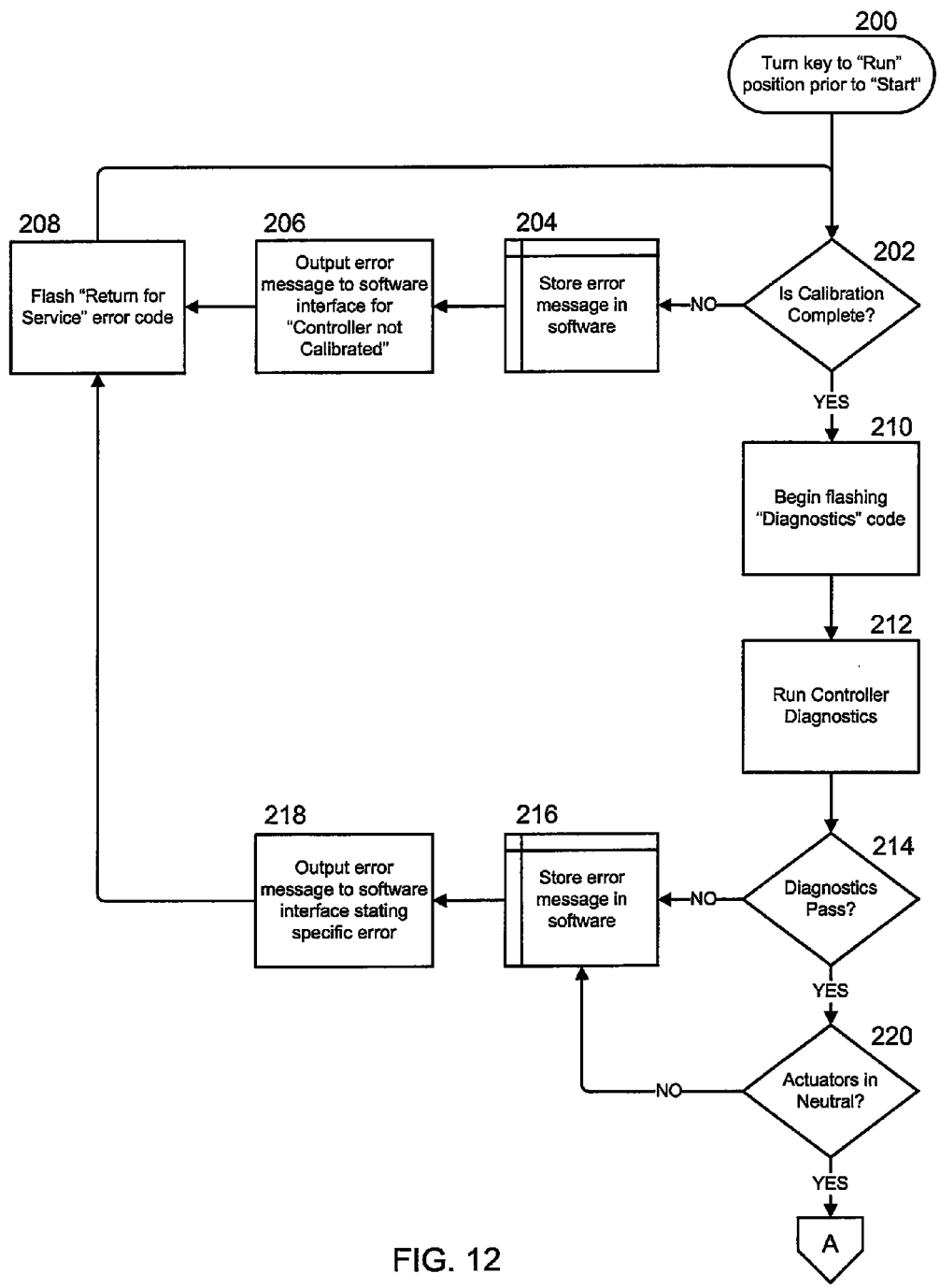
FIG. 12 is a flow chart of a control process of the drive control system, showing representative diagnostics performed prior to allowing the vehicle to be started.

In a particular embodiment, when a vehicle operator turns ignition switch 42 from its off position to the run position, drive control system 30 begins to perform a series of diagnostics and tests. Prime mover 18 is not permitted to operate until diagnostics and tests are complete. As shown in FIG. 12, step 200 denotes movement of ignition switch 42 from the off position to the run position, which is the position of ignition switch 42 as shown in FIG. 6. Once processor 80 recognizes that ignition switch 42 has been moved to the run position, processor 80 checks to determine whether drive control system 30 has been properly calibrated at step 202.

Calibration of drive control system 30 includes establishing the limits of travel and the neutral position of actuators 52L and 52R, and in a particular embodiment is performed as a part of manufacturing or servicing of drive control system 30. Since this process occurs only during assembly and maintenance of drive control system 30, it is not illustrated in the attached figures. As part of the calibration process, processor 80 may check to determine whether the limits of travel and neutral position of actuators 52L and 52R are within expected limits. If the limits of travel and neutral position of actuators 52L and 52R exceed the limits anticipated by processor 80, then processor 80 may return an error code either through a programming interface (not shown) or through indicator light 40. Once drive control system 30 has been calibrated, a soft switch is actuated and stored in processor 80's memory that denotes calibration is complete.

If the soft switch indicates that calibration of drive system 30 has not been accomplished, then an error message is stored at step 204. At step 206, an error message is output to an interface to indicate that the controller is not calibrated. In a particular embodiment, the error message may be read using appropriate diagnostic equipment connected to the software interface of drive system 30 (not shown). At step 208, indicator light 40 flashes in response to a signal that denotes that vehicle 10 needs to be returned to a qualified dealer for service. At this point vehicle 10 is inoperable, and an operator's only choice will be to return ignition switch 42 to the off position. However, it should be noted that this path of steps is available only in the unlikely event that the manufacturer installing drive control system 30 has failed to perform the proper calibration procedure.

At step 210, if the calibration-completed soft switch has been set, indicator light 40 flashes a code denoting the diagnostics mode of drive control system 30. At step 212, diagnostics of controller 50 are performed to verify that controller 50 is operating properly. As part of the diagnostics of controller 50, the position of each actuator 52L and 52R is determined. If actuators 52L and 52R are not in neutral, controller 50 attempts to drive actuators 52L and 52R into neutral. Once the diagnostics of controller 50 are complete, the status of the diagnostics is determined at step 214. If the diagnostics failed, an error message is stored at step 216. The error message is output to an interface, such as a software interface, indicating or stating the specific error at step 218. Indicator light 40 flashes to denote that vehicle 10 needs to be returned to a qualified dealer for service.

If drive control system 30 passes its diagnostic tests, drive control system 30 determines whether actuators 52L and 52R are in the neutral position at step 220. If actuators 52L and 52R are not in the neutral position and if drive control system 30 is unable to return actuators 52L and 52R to the neutral position, an error message is stored at step 216. The error message is output to an interface stating the specific error at step 218. Indicator light 40 flashes to denote that vehicle 10 needs to be returned to a qualified dealer for service.

Figure 13:
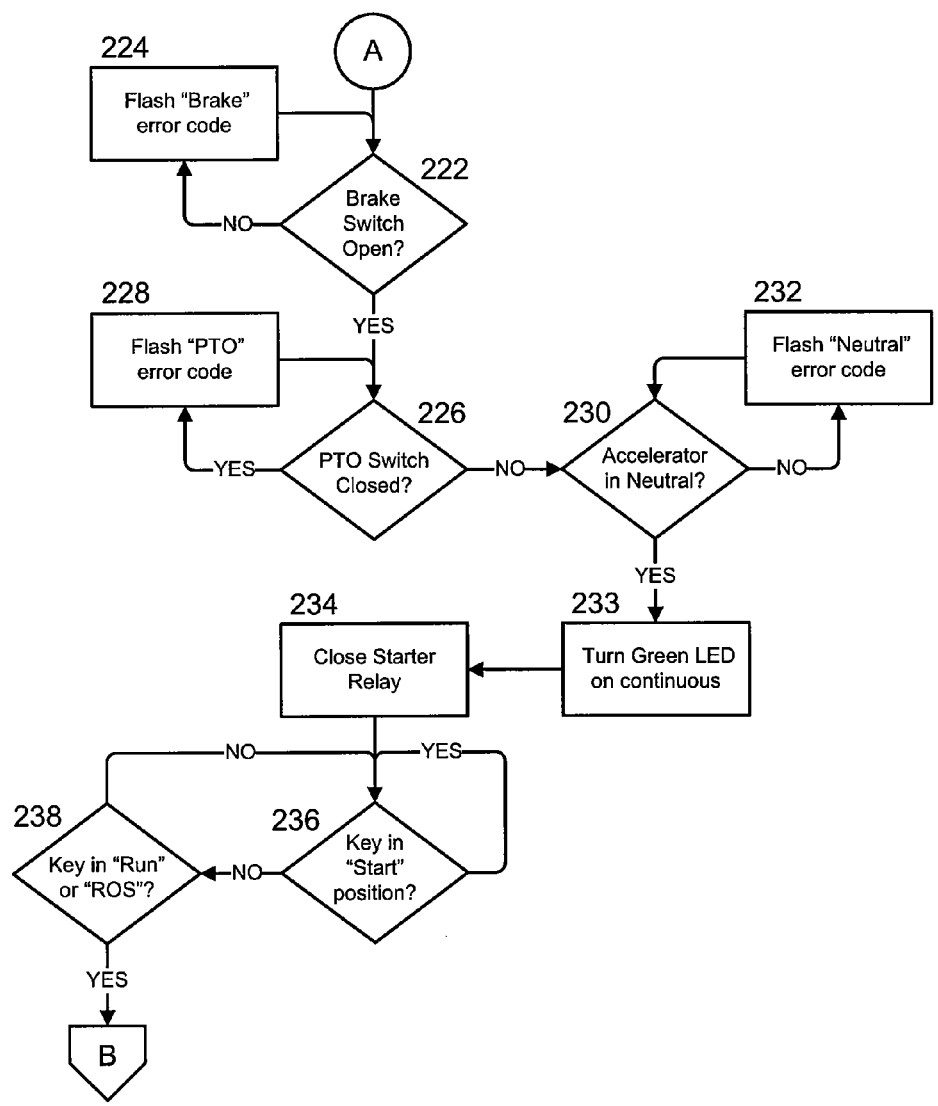
FIG. 13 is a flow chart of a control process of the drive control system, showing further representative diagnostics performed prior to allowing the vehicle to be started as well as enabling of the starter.

If actuators 52L and 52R are in the neutral position, determination of the status of brake switch 66 is made at step 222 shown in FIG. 13. If brake switch 66 is closed, indicator light 40 flashes in a pattern to indicate that the brake pedal 34 needs to be actuated prior to starting at step 224. If brake switch 66 is open, which indicates that brake pedal 34 of vehicle 10 has been actuated, then the status of power take-off switch 44 is checked at step 226. If power take-off switch 44 is closed, which indicates that the mechanism that controls the blades of mower deck 26 has been actuated, then, at step 228, indicator light 40 flashes in a pattern to indicate that power take-off switch 44 needs to be deactivated.

If power take-off switch 44 is open, it is then determined at step 230 whether the accelerator is in the neutral position. The sensors or switches involved in this step may be located as a part of accelerator pedal 32 or its equivalent, actuators 52L and 52R, control arms 54, or other portions of vehicle 10 that are associated with changing the output of transmissions 12L and 12R. At step 232, if transmissions 12L and 12R are not in the neutral position, indicator light 40 flashes in a pattern to indicate that vehicle 10 is not in neutral. Control then returns to step 230. This loop continues until vehicle 10 is returned to neutral or until ignition switch 42 is returned to the off condition.

If accelerator pedal 32 or a feature associated with accelerator pedal 32 is in neutral, a signal is sent to indicator light 40 to cause indicator light 40 to light with a color in accordance with step 233. In a particular embodiment, the color of indicator light 40 at step 233 is green. Now that drive control system 30 has determined that it is safe for vehicle 10 to be operated, drive control system 30 permits starter relay 58 to be actuated at step 234, which then enables starter solenoid 60 to operate when an operator moves ignition switch 42 to the start position. Starter solenoid 60 then causes prime mover 18 to operate, assuming that prime mover 18 is in a condition to be operable (i.e., contains fuel, oil, is mechanically sound, etc.). Under typical circumstances, an operator will release ignition switch 42, which is spring loaded to return to the run position. At step 236, a check is performed to determine whether the operator has released ignition switch 42 to the run position. At step 238, if ignition switch 42 is not in either the run or ROS position, then control returns to step 236. This check remains in a control loop until ignition switch 42 is moved from the start position. If ignition switch 42 is in either the run or ROS position, then control moves to step 240, shown in FIG. 14.

Step 240 enables the input controls to processor 80. By enabling the input controls, processor 80 is able to receive input signals from the various components of drive control system 30. The inputs from steering wheel 36 and accelerator pedal 32 cause processor 80 to send signals to actuators 52L and 52R. Step 244 in FIG. 15 begins a series of steps that controls the movement and position of actuators 52L and 52R. These steps are detailed in FIGS. 15 through 22.

Figure 15:
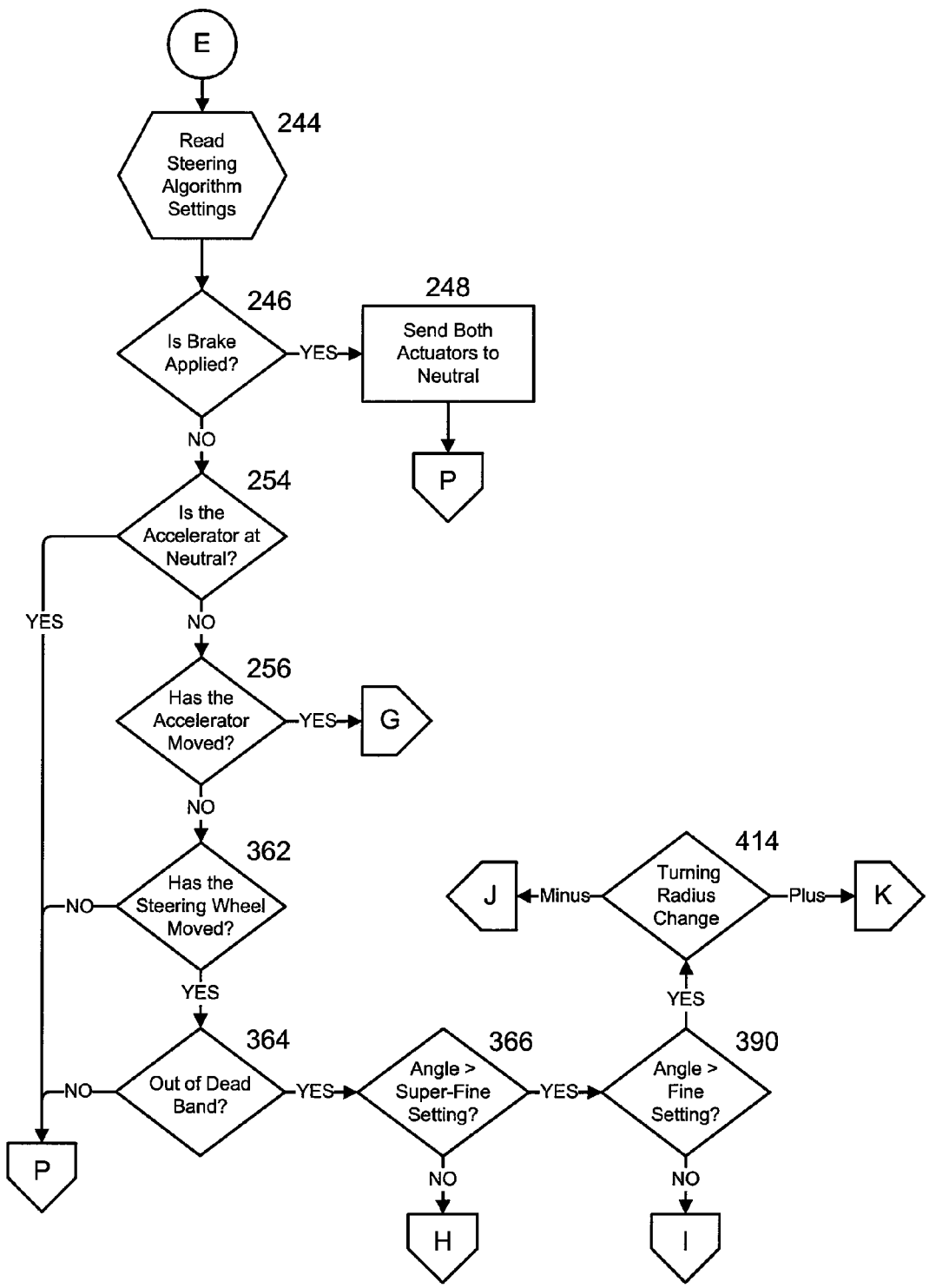
FIG. 15 is a flow chart of a control process of the drive control system, showing a portion of the actuator control process.

At step 244, shown in FIG. 15, steering algorithm settings are read. In a particular embodiment, these settings are established during the programming of processor 80. These settings may include the speed at which actuators 52L and 52R respond, the maximum speed of transmissions 12L and 12R, the maximum speed of deceleration when brake pedal 34 is actuated or accelerator pedal 32 is released to return to the neutral position, and the acceleration permitted in the transition from the zero-turn mode of operation (i.e., a pure turning mode without any significant forward or reverse progression of the vehicle) to full forward speed. Other operating settings may be established in a table or may be adjustable with operator selectable input.

After the operating settings have been established, it is determined at step 246 whether brake pedal 34 has been actuated. If brake pedal 34 has been actuated, actuators 52L and 52R are returned to neutral at step 248. After step 248, control is returned to step 304 in FIG. 14. If the brake of vehicle 10 is not applied, which in this embodiment means that brake pedal 34 is not depressed, then control passes from step 246 to step 254. At step 254, it is determined whether accelerator pedal 32 is in the neutral position. If accelerator pedal 32 is in the neutral position, control moves to step 304 in FIG. 14 (the flow chart shown in FIG. 14 will be described later). If accelerator pedal 32 is moved from the neutral position, control passes to step 256.

Figure 21:
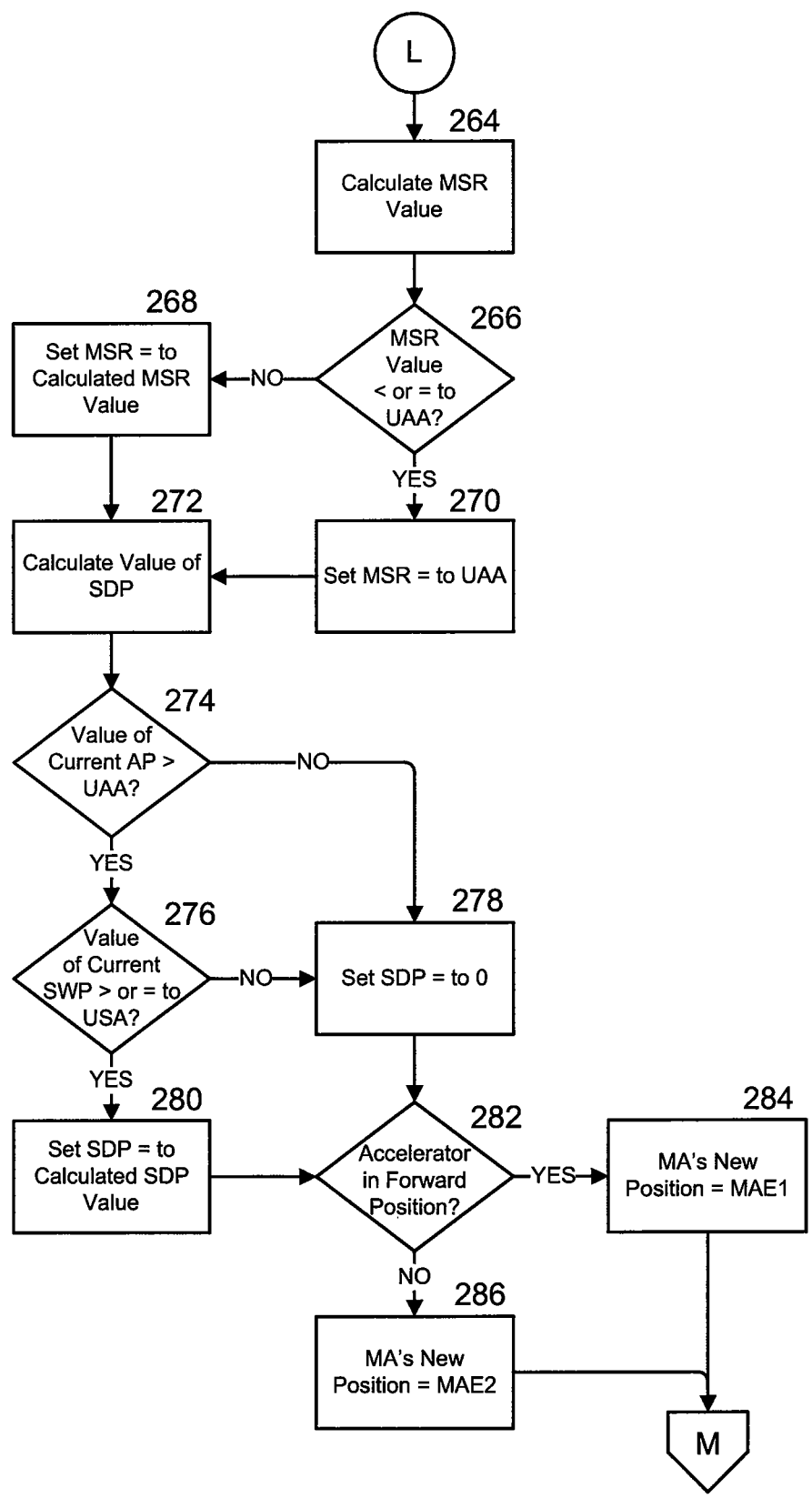
FIG. 21 is a flow chart of a control process of the drive control system, showing a portion of the actuator control process that calculates the position of the master actuator.
Figure 22:
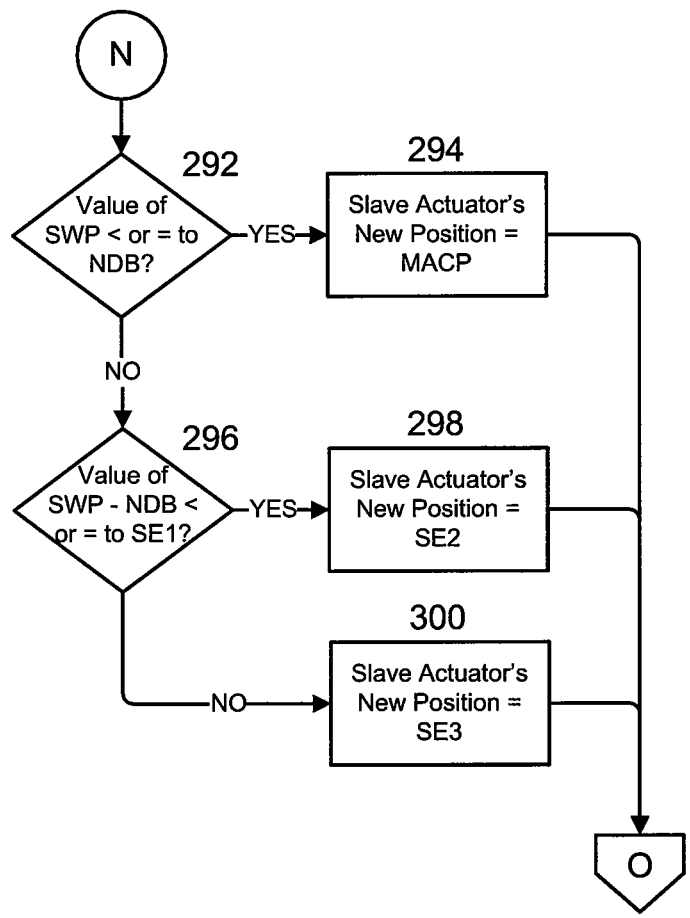
FIG. 22 is a flow chart of a control process of the drive control system, showing a portion of the actuator control process that calculates the position of the slave actuator.
Figure 25:
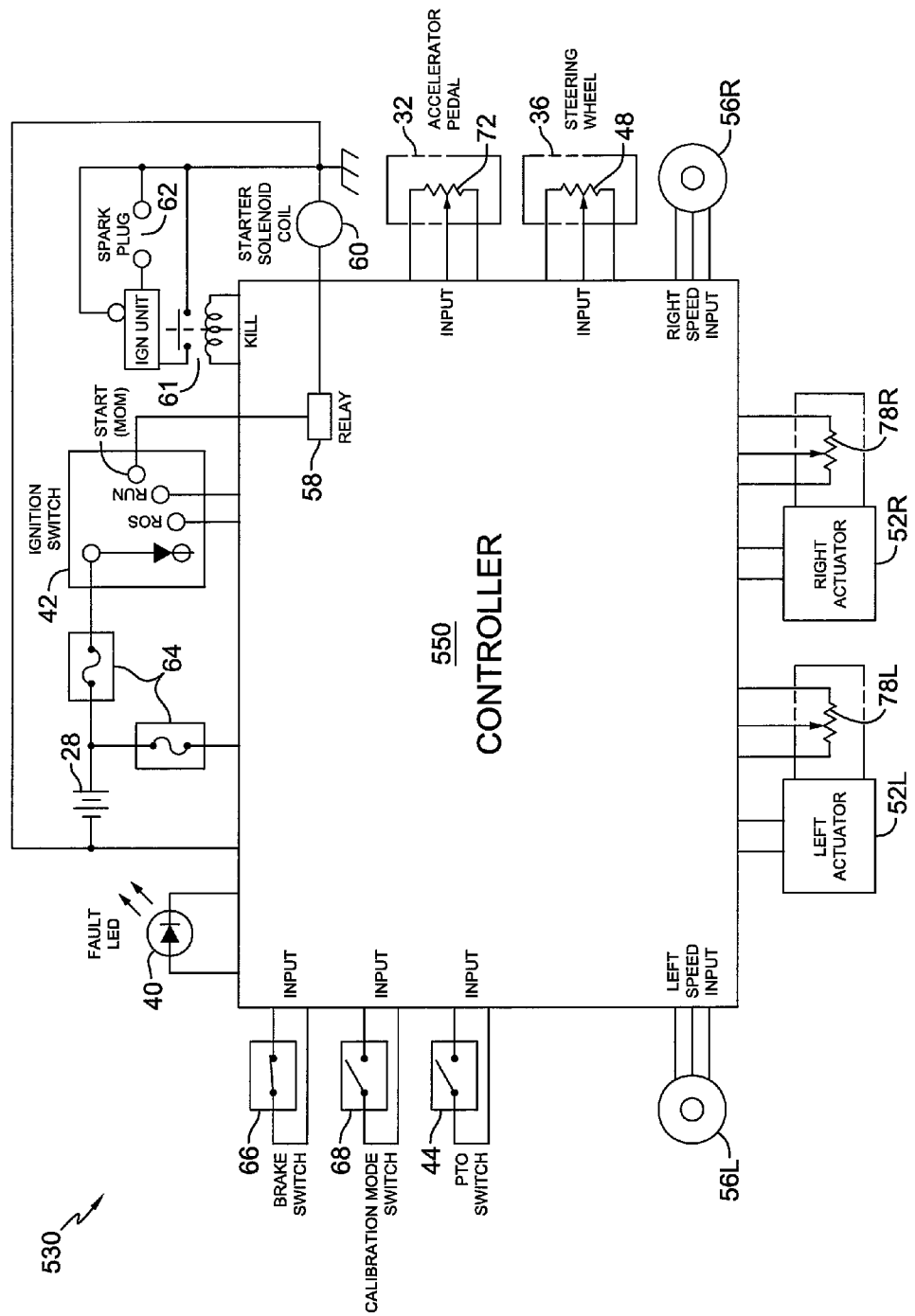
FIG. 25 is a block diagram of certain portions of a second embodiment drive control system in accordance with the principles of the present invention.

At step 256, the current position of accelerator pedal 32 is compared to the previous position of accelerator pedal 32. In a particular embodiment, the positions of accelerator pedal 32 are continuously stored in a memory. If the position of accelerator pedal 32 has changed, control passes to step 258 in FIG. 16. At step 258, the position of steering wheel 36 is determined. If steering wheel 36 is left of, or at, the center position (or non-steering position), control continues to step 260. At step 260, control system 30 denotes that right actuator 52R operates as the master and left actuator 52L operates as the slave. In a particular embodiment, the control system denotes the master and slave status via software. Software also directs the subroutines shown in FIGS. 21 and 22 where to return control, since the subroutines shown in FIGS. 21 and 22 are utilized in more than one control process. Step 262 indicates that the new master actuator position is being calculated.

At step 264 in FIG. 21, the minimum speed reduction (MSR) is calculated. The calculated minimum speed reduction is effectively the maximum permissible speed of vehicle 10 in a zero-turn or near zero-turn mode of operation. As will be explained, the effect of the calculated minimum speed reduction is to control the maximum speed of this type of vehicle in the tightest turning radii, which is seen to improve the safety of this type of vehicle as some zero-turn vehicles can also be operated at straight-line speeds in excess of 15 mph (24 kph). The reason the minimum speed reduction needs to be calculated is that it is related to both the turning radius and the vehicle speed. Thus, a large turning radius and high speed will have a different calculated minimum speed reduction than a short turning radius and a high vehicle speed or a short turning radius and a slow vehicle speed.

At step 266, the calculated minimum speed reduction is compared to the unreduced accelerator angle (UAA), which is a manufacturer-defined position of accelerator pedal 32. For example, a manufacturer may decide that the unreduced accelerator angle should result in a top vehicle speed of 3 mph. If the calculated minimum speed reduction is greater than the unreduced accelerator angle, control is passed to step 268, where the minimum speed reduction is set to the calculated minimum speed reduction. If the calculated minimum speed reduction is less than or equal to the unreduced accelerator angle, control is passed to step 270, where the minimum speed reduction is set to the unreduced accelerator angle. Thus, if the calculated minimum speed reduction is less than or equal to a certain set point, there will be no change in vehicle speed in a turn. If the calculated minimum speed reduction is greater than a certain set point, then the vehicle will see a change in speed, as will be described in more detail.

Step 272 follows either step 268 or step 270. At step 272, the speed difference percent (SDP) is calculated. In order to accomplish vehicle turning using two independent transaxles, such as with the embodiment shown in FIG. 1, the speed of one transaxle (and corresponding driven tire) must either be reduced or increased with respect to the other transaxle (and corresponding driven tire). In a particular embodiment, this difference in speed is accomplished by reducing the speed of the master tire with respect to the slave tire. In order to determine whether and by how much the speed of the master tire must be reduced, a speed difference percent is calculated. The speed difference percent may be calculated a variety of ways. One way is to calculate the speed difference percent as an amount that relates to the unreduced steering angle (USA), which, like the unreduced accelerator angle, is established by a manufacturer based on its vehicle configuration and operating needs. The speed difference percent may thus be calculated as the absolute value of the steering position minus the unreduced steering angle, with this amount divided by 100 minus the unreduced steering angle. After this calculation, control is passed to step 274.

Step 274 determines whether the position of accelerator pedal 32 is greater than the unreduced accelerator angle. If the accelerator position (AP) is less than or equal to the unreduced accelerator angle, then there is no need to modify the speed of transaxles 12L and 12R considering only the speed of transaxles 12L and 12R and the speed difference percent is set to zero at step 278. If the accelerator position is greater than the unreduced accelerator angle, control is passed to step 276, where the position of steering wheel 36 is compared to the unreduced steering angle. If the rotation angle of steering wheel 36 is less than the unreduced steering angle, then there is no need to modify the speed of transaxles 12L and 12R and the speed difference percent is set to zero at step 278. This is because the turning radius of vehicle 10 is large enough that the current output speed of transaxles 12L and 12R is acceptable. If the rotation angle of steering wheel 36 is greater than or equal to the unreduced steering angle, control passes to step 280, where the speed difference percent is set to the calculated speed difference percent.

Step 278 and step 280 both pass control to step 282, which determines whether accelerator pedal 32 is in a forward position. If accelerator pedal 32 is in a forward position, control is passed to step 284, where the master accelerator's (MA's) new position is calculated using master accelerator equation 1:

$$\text{New Position}=MAE1=CAP-[(CAP-MSR)*SDP]$$

Where:
MAE1=Master Accelerator Equation 1
CAP=Current Accelerator Position
MSR=Minimum Speed Reduction
SDP=Speed Difference Percent If accelerator pedal 32 is not in a forward position, then control moves to step 286, where the master accelerator's new position is calculated using Master Accelerator Equation 2:

$$\text{New Position}=MAE2=CAP-[(CAP+MSR)*SDP]$$

Where:
MAE2=Master Accelerator Equation 2
and where the other acronyms are the same as those specified for master accelerator equation 1 above.

Figure 16:
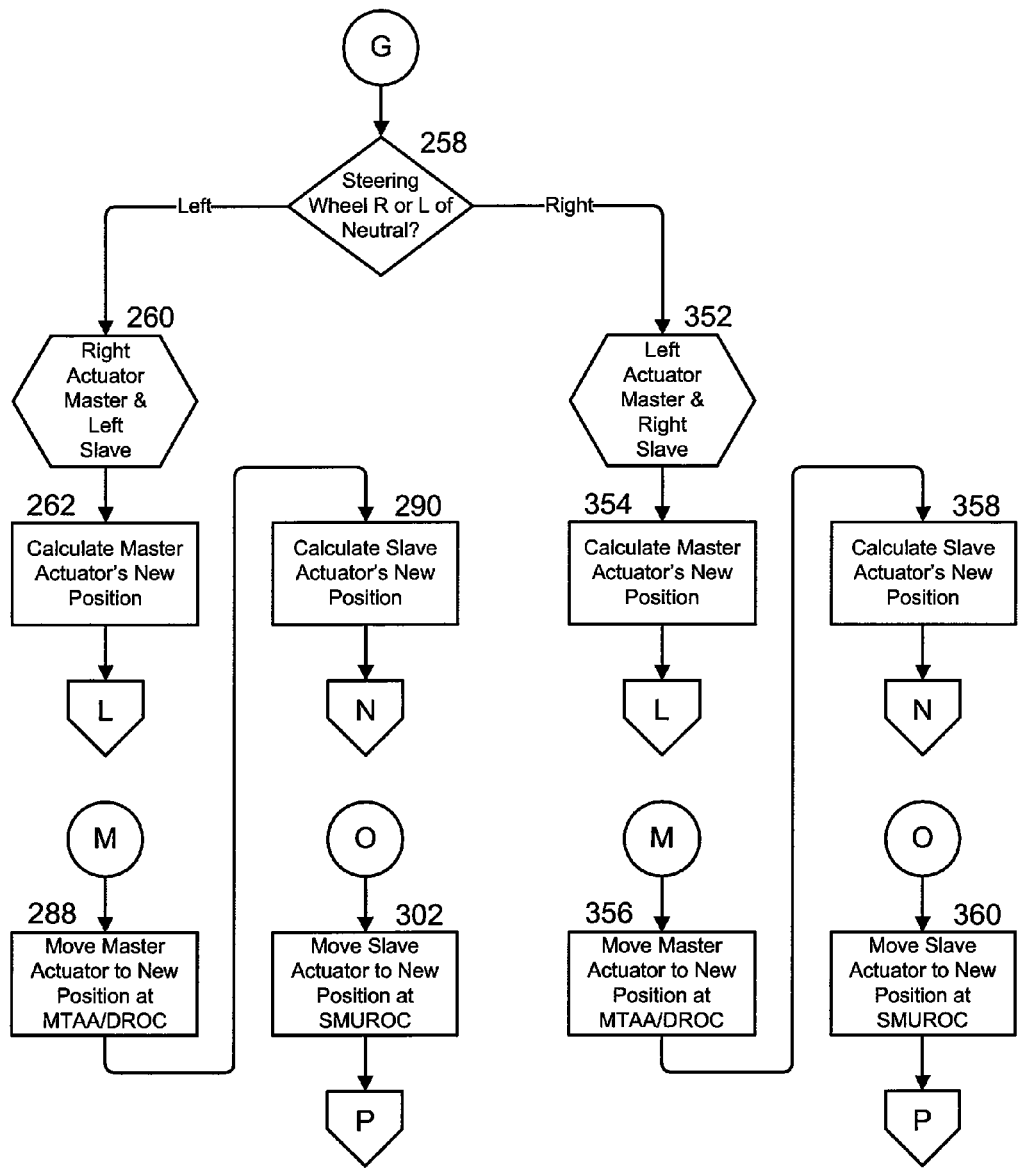
FIG. 16 is a flow chart of a control process of the drive control system, showing a portion of the actuator control process that occurs with movement of the vehicle accelerator.

Control is now returned to step 288 in FIG. 16. At step 288, the master actuator is moved to the calculated new position at the master tire accelerator accelerating and decelerating rate of change (MTAA/DROC). The master tire accelerator accelerating and decelerating rate of change is preferably defined during programming and may be modified to meet the operating requirements of a specific vehicle. This value sets how quickly an actuator moves in response to a signal to move to a new position.

After the master actuator has been moved, the slave actuator position must be determined. Step 290 indicates that the new slave actuator position is being calculated by the following steps. Step 292, shown in FIG. 22, determines whether the steering wheel position (SWP) is less than or equal to the neutral dead band (NDB). The neutral dead band defines how far from the center or nominally non-steering position steering wheel 36 must be before the slave actuator is moved. If the position of steering wheel 36 is less than or equal to the neutral dead band (that is, within the neutral dead band), steering is not required and the slave actuator's new position is set to be the master actuator's current position (MACP) at step 294. From this point, control returns to step 302 in FIG. 16.

Returning to step 292, if the position of steering wheel 36 is greater than the neutral dead band (that is, outside the neutral dead band), then control is moved to step 296, which determines whether the value of steering wheel 36 position minus the neutral dead band is less than or equal to the value of slave equation 1 (SE1), which is:

SE1=(PSW/100)*(100-NDB)

Where:
SE1=Slave Equation 1
PSW=Percent Steering Wheel
NDB=Neutral Dead Band
Thus, the test at step 296 is:

SWP-NDB≤[(PSW/100)*(100-NDB)]

The percent steering wheel (PSW) is the amount of rotation of steering wheel 36 relative to the maximum allowed rotation of steering wheel 36.

If the test at step 296 is met, then control passes to step 298, where the slave actuator's new position is set to slave equation 2, which is:

SE2=MACP-{MACP*[(AVCSP-NDB)/{(PSW/100)*(100-NDB)]}

And which may be written as:

SE2=MACP-{MACP*[AVCSP-NDB/SE1]}

Where:
SE2=Slave Equation 2
MACP=Master Actuator's Current Position
AVCSP=Absolute Value of the Current Steering Position
PSW=Percent Steering Wheel
NDB=Neutral Dead Band
SE1=Slave Equation 1

If the test at step 296 is not met, control passes to step 300, where the slave actuator's new position is set to slave equation 3, which is:

SE3=MACP+{MACP*[1-{[AVCSP-NDB-[(PSW/100)*(100-NDB)]]/[1-{(PSW/100)*(100-NDB)}]}]}

And which may be written:

SE3=MACP+{MACP*[1-{[AVCSP-NDB-SE1]/[1-SE1]}]}

Where:
SE1=Slave Equation 1
SE3=Slave Equation 3
MACP=Master Actuator's Current Position
AVCSP=Absolute Value of the Current Steering Position
PSW=Percent Steering Wheel
NDB=Neutral Dead Band After the new slave actuator position has been calculated, control passes to step 302 in FIG. 16. At step 302, the slave actuator is moved to its new position at the slave maximum unrestricted rate of change (SMUROC). Once step 302 is complete, control passes to step 304 in FIG. 14. Step 304 determines whether ignition switch 42 is in the run or ROS position. If ignition switch 42 is not in either the run or ROS position, then control passes to step 306, shown in FIG. 23. At step 306, actuators 52L and 52R are returned to neutral. At step 308, starter relay 58 is opened, which prevents vehicle 10 from being started again should ignition switch 42 be moved to the start position. At step 310, indicator light 40 flashes in a pattern that indicates that vehicle 10 needs to be restarted, also called a restart error code. Step 312 then determines whether ignition switch 42 is in the start, run or ROS position. If ignition switch 42 is in one of these positions, control is passed back to step 310, and this control loop continues until ignition switch 42 is moved to the off position. If ignition switch 42 is in the off position, then drive control system 30 is in the condition specified by step 314, and drive control system 30 is deactivated.

Figure 14:
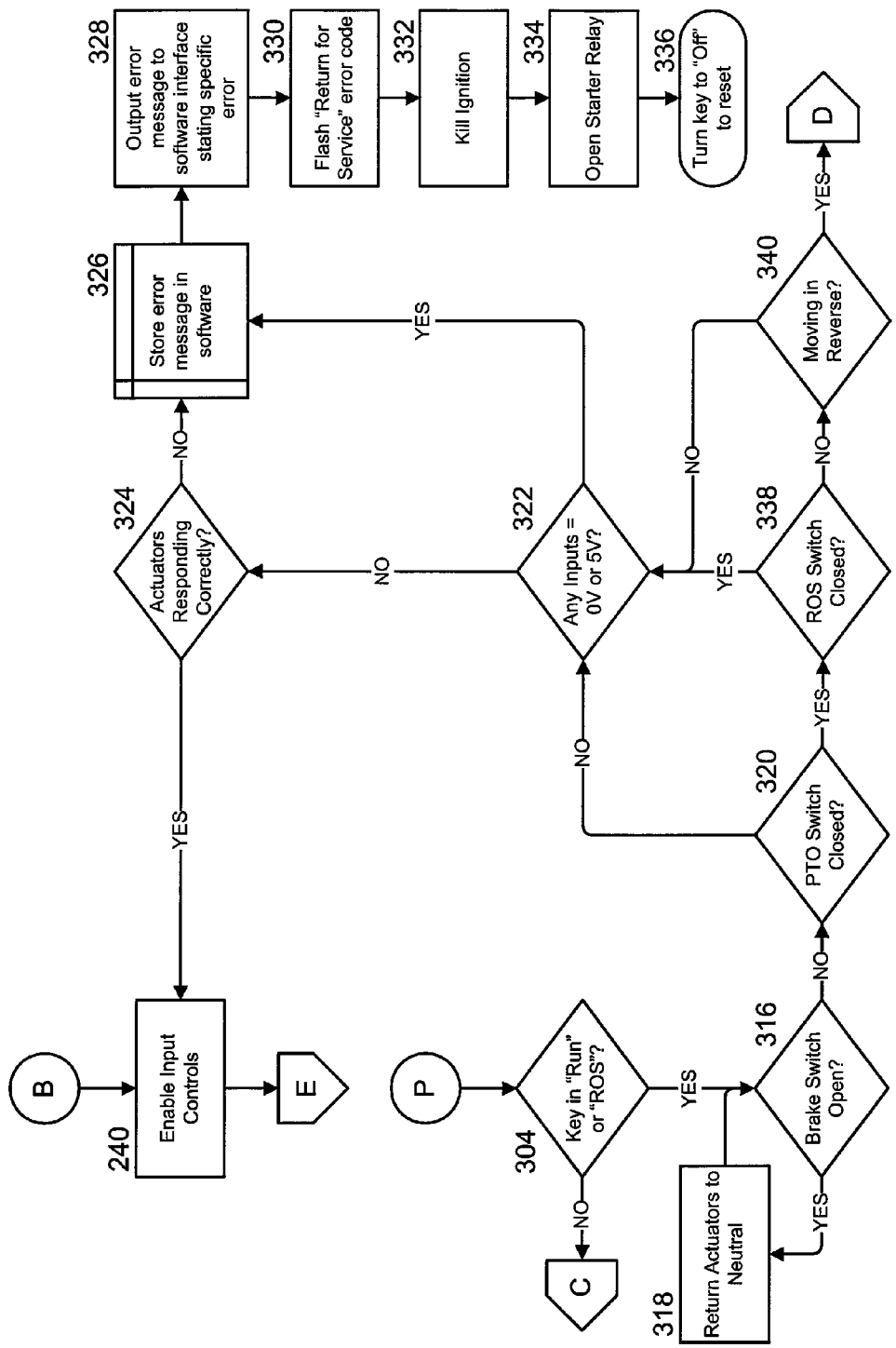
FIG. 14 is a flow chart of a control process of the drive control system, showing diagnostics performed to determine whether to kill the prime mover or enable input controls.

Returning to step 304 in FIG. 14, if ignition key switch 42 is in either the run or ROS position, then step 316 determines whether brake switch 66 is open. If brake switch 66 is open, step 318 returns actuators 52L and 52R to neutral. Control then loops back through step 316 until brake switch 66 is closed or until ignition switch 42 is turned off. If brake switch 66 is not open, step 320 determines whether power take-off switch 44 is closed. If power take-off switch 44 is not closed, step 322 determines whether any inputs are at a voltage that might indicate a problem. If all inputs are normal, step 324 determines whether actuators 52L and 52R are functioning correctly. If actuators 52L and 52R are functioning properly, control returns to step 240. If inputs are not normal or if actuators 52L and 52R are not responding correctly, control moves to step 326.

At step 326, an error message is stored into a memory. At step 328, the error message is output to an interface stating the specific error. At step 330, an error code is flashed, preferably via indicator light 40, in a pattern to indicate that vehicle 10 should be returned to a qualified dealer for service. At step 332, processor 80 sends a signal that causes primer mover 18 to stop operating. At step 334, starter relay 58 is opened, and an operator is prevented from restarting vehicle 10 at this time. At step 336, the operator moves ignition switch 42 to the off position. From this point, the operator may attempt to restart vehicle 10 by turning ignition switch 42 from its off position to the run position, wherein drive control system 30 begins to perform a series of diagnostics following step 200 in FIG. 12. The error condition may be removed during initialization of drive control system 30. Alternatively, the operator may have vehicle 10 serviced by a qualified dealer.

Returning to step 320, if power take-off switch 44 has been actuated, control passes to step 338. If ignition switch 42 is in the ROS position, then control passes to step 322. If ignition switch 42 is not in the ROS position, step 340 tests for reverse operation. Since step 340 is reached only if power take-off switch 44 has been actuated, the blades of mower deck 26 will be operating. It may be undesirable to permit operation of mower deck 26 with vehicle 10 operating in reverse. An operator may elect to mow in reverse by selecting the ROS position with ignition switch 42, or some other optional bypass switch that permits operation of mower deck 26 with vehicle 10 operating in reverse. If a vehicle is not configured with this arrangement, or if the optional bypass feature is not selected, control passes to step 342 in FIG. 24.

At step 342, indicator light 40 flashes in response to a signal that denotes an ROS error. Step 344 kills the ignition by grounding ignition unit 100 through diode 98. Step 346 returns actuators 52L and 52R to neutral. Step 348 opens starter relay 58. Ignition switch 42 will need to be returned to the off position in order to reset drive control system 30 to enable restart of vehicle 10, which occurs at step 350.

As described in a particular embodiment, a signal from processor 80 causes prime mover 18 to cease operation. However, other methods of halting mowing operation in reverse are known and drive control system 30 is compatible with known methodologies. For example, blade clutches are also known, and the signal that forward-biases diode 98 could be used to enable and disable an electric blade clutch. Thus, the description of how the ROS function prevents mowing operation in reverse is illustrative of one of a plurality of techniques for halting mowing operation in reverse in accordance with the principles of the present invention.

Returning now to step 258 in FIG. 16, if steering wheel 36 is to the right of the center position, drive control system 30 denotes left actuator 52L as the master and right actuator 52R as the slave at step 352. In a particular embodiment, control system 30 denotes the master and slave status via software. Software also directs the subroutines shown in FIGS. 21 and 22 where to return control, since the subroutines shown in FIGS. 21 and 22 are utilized in more than one control process. Step 354 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 356 in FIG. 16.

At step 356, the master actuator is moved to the calculated new position at the master tire accelerator accelerating and decelerating rate of change (MTAA/DROC). The master tire accelerator accelerating and decelerating rate of change is defined during programming and may be modified to meet the operating requirements of a specific vehicle. This value sets how quickly an actuator moves in response to a signal to move to a new position.

After the master actuator has been moved, the slave actuator position must be determined. Step 358 indicates that the new slave actuator position is being calculated by the steps shown in FIG. 22 and previously described above. The only difference from the previously described procedure is that upon completion of the process steps in FIG. 22, control returns to step 360 in FIG. 16. At step 360, the slave actuator is moved to its new position at the slave maximum unrestricted rate of change (SMUROC). Once step 360 is complete, control passes to step 304 in FIG. 14. The function of the methodology illustrated in FIG. 14 has been previously described above.

Returning now to step 256 in FIG. 15, if accelerator pedal 32 has not moved, step 362 determines whether steering wheel 36 has moved. If steering wheel 36 has not moved, control passes to step 304 in FIG. 14, which has been previously described in detail. If steering wheel 36 has moved, step 364 determines whether steering wheel 36 is out of the neutral dead band (NDB), which has previously been described. If steering wheel 36 is not out of the neutral dead band, control is passed to step 304 in FIG. 14, which has been previously described. If steering wheel 36 is out of the neutral dead band, then control passes to step 366.

Figure 17:
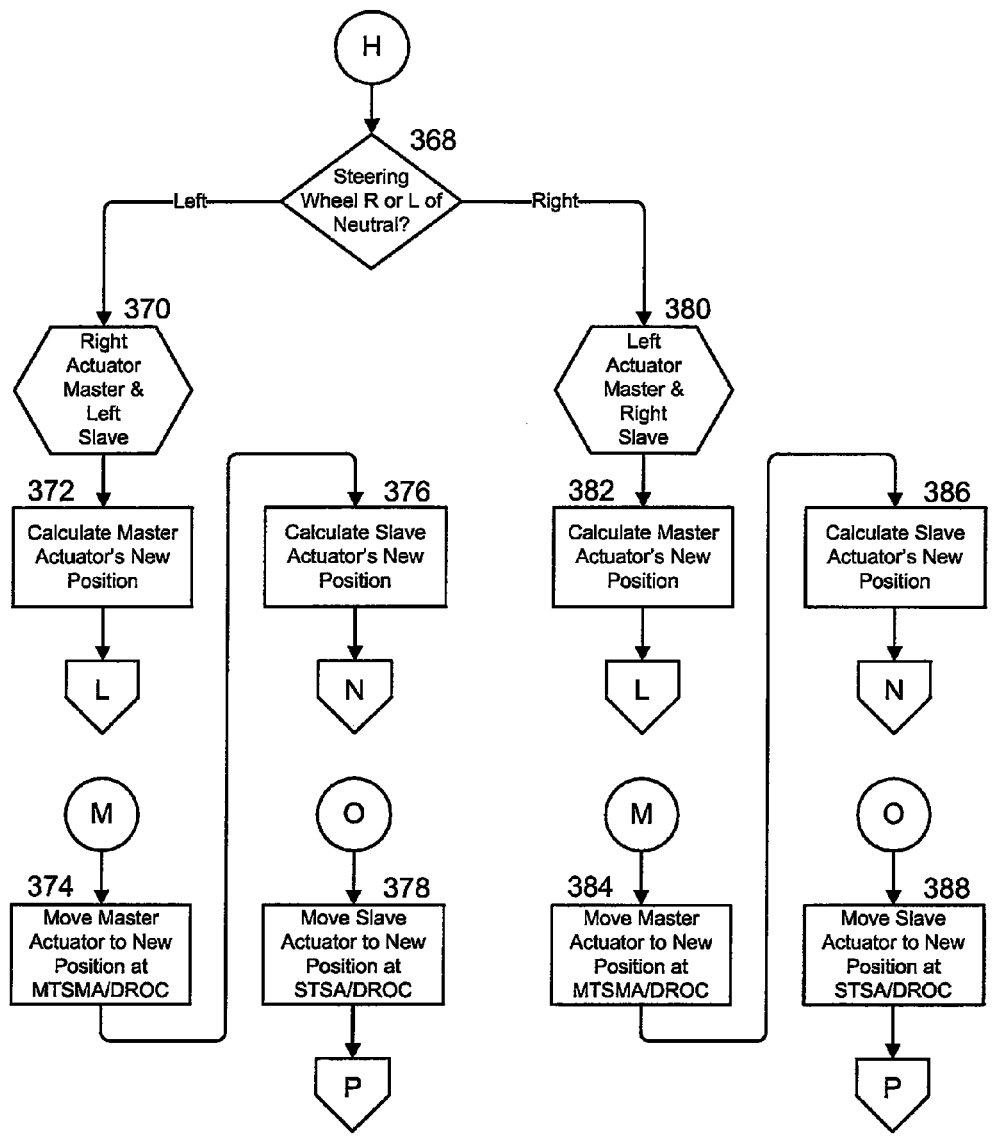
FIG. 17 is a flow chart of a control process of the drive control system, showing a portion of the actuator control process that occurs with movement of the steering wheel.

At step 366, shown in FIG. 15, if steering wheel 36 has moved to an angle less than or equal to the angle defined as super-fine (which, in a particular embodiment, has been predetermined), control passes to step 368 in FIG. 17. In step 368, the position of steering wheel 36 is determined. If steering wheel 36 is left of, or at, the center position (non-steering position), step 370 denotes that right actuator 52R operates as the master and left actuator 52L operates as the slave. In a particular embodiment, these denotations are accomplished via software. Software also directs the subroutines shown in FIGS. 21 and 22 where to return control, since the subroutines shown in FIGS. 21 and 22 are utilized in more than one control process. Step 372 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 374 in FIG. 17.

At step 374, the master actuator is moved to the new position at the master tire steering minimum accelerating and decelerating rate of change (MTSMA/DROC). The master tire steering minimum accelerating and decelerating rate of change is defined during programming and may be modified to meet the operating requirements of a specific vehicle. This value sets how quickly an actuator moves in response to a signal to move to a new position during a steering operation.

Now that the master actuator has been moved, the slave actuator position must be determined. Step 376 indicates that the new slave actuator position is being calculated by the steps shown in FIG. 22 and previously described above. The only difference from the previously described procedure is that completion of the process steps in FIG. 22 returns control to step 378 in FIG. 17. At step 378, the slave actuator is moved to its new position at the slave tire steering accelerating and decelerating rate of change (STSA/DROC). Once step 378 is complete, control passes to step 304 in FIG. 14. The function of the flow chart in FIG. 14 has been previously described above.

Returning now to decision step 368 in FIG. 17, if steering wheel 36 is to the right of the center position, step 380 denotes left actuator 52L as the master and right actuator 52R as the slave. In a particular embodiment, this denotation is accomplished via software. Software also directs the subroutine shown in FIGS. 21 and 22 where to return control, since the subroutines shown in FIGS. 21 and 22 are utilized in more than one control process. Step 382 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that on completion of either step 284 or step 286 in FIG. 21, control passes to step 384 in FIG. 17.

At step 384, the master actuator is moved to the calculated new position at the master tire steering minimum accelerating and decelerating rate of change (MTSMA/DROC). The master tire steering minimum accelerating and decelerating rate of change is defined during programming and may be modified to meet the operating requirements of a specific vehicle. This value sets how quickly an actuator moves in response to a signal to move to a new position.

After the master actuator has been moved, the slave actuator position must be determined. Step 386 indicates that the new slave actuator position is being calculated by the steps shown in FIG. 22 and previously described above. The only difference from the previously described procedure is that completion of the process steps in FIG. 22 returns control to step 388 in FIG. 17. At step 388, the slave actuator is moved to its new position at the slave tire steering accelerating and decelerating rate of change (STSA/DROC). Once step 388 is complete, control passes to step 304 in FIG. 14. The function of the flow chart in FIG. 14 has been previously described above.

Returning now to decision step 366 in FIG. 15, if steering wheel 36 has moved to an angle greater than the angle defined as super-fine (which, in a particular embodiment, has been predetermined), control passes to decision step 390. If the steering wheel angle is less than or equal to the angle defined as fine, then control passes to step 392 in FIG. 18. In step 392, the position of steering wheel 36 is determined. If steering wheel 36 is left of, or at, the center position (non-steering position), control moves to step 394.

Step 394 denotes that right actuator 52R operates as the master and left actuator 52L operates as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 396 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 398 in FIG. 18.

At step 398, the master actuator is moved to the new position at the master tire accelerator accelerating and decelerating rate of change (MTAA/DROC). The master tire accelerator accelerating and decelerating rate of change is defined during programming and may be modified to meet the operating requirements of a specific vehicle. This value sets how quickly an actuator moves in response to a signal to move to a new position during a steering operation.

After the master actuator has been moved, the slave actuator position must be determined. Step 400 indicates that the new slave actuator position is being calculated by the steps shown in FIG. 22 and previously described above. The only difference from the previously described procedure is that completion of the flow chart in FIG. 22 returns control to step 402 in FIG. 18. At step 402, the slave actuator is moved to its new position at the calculated fine steering angle rate of change (CFSAROC). Once step 402 is complete, control passes to step 304 in FIG. 14. The function of the flow chart in FIG. 14 has been previously described above.

Figure 18:
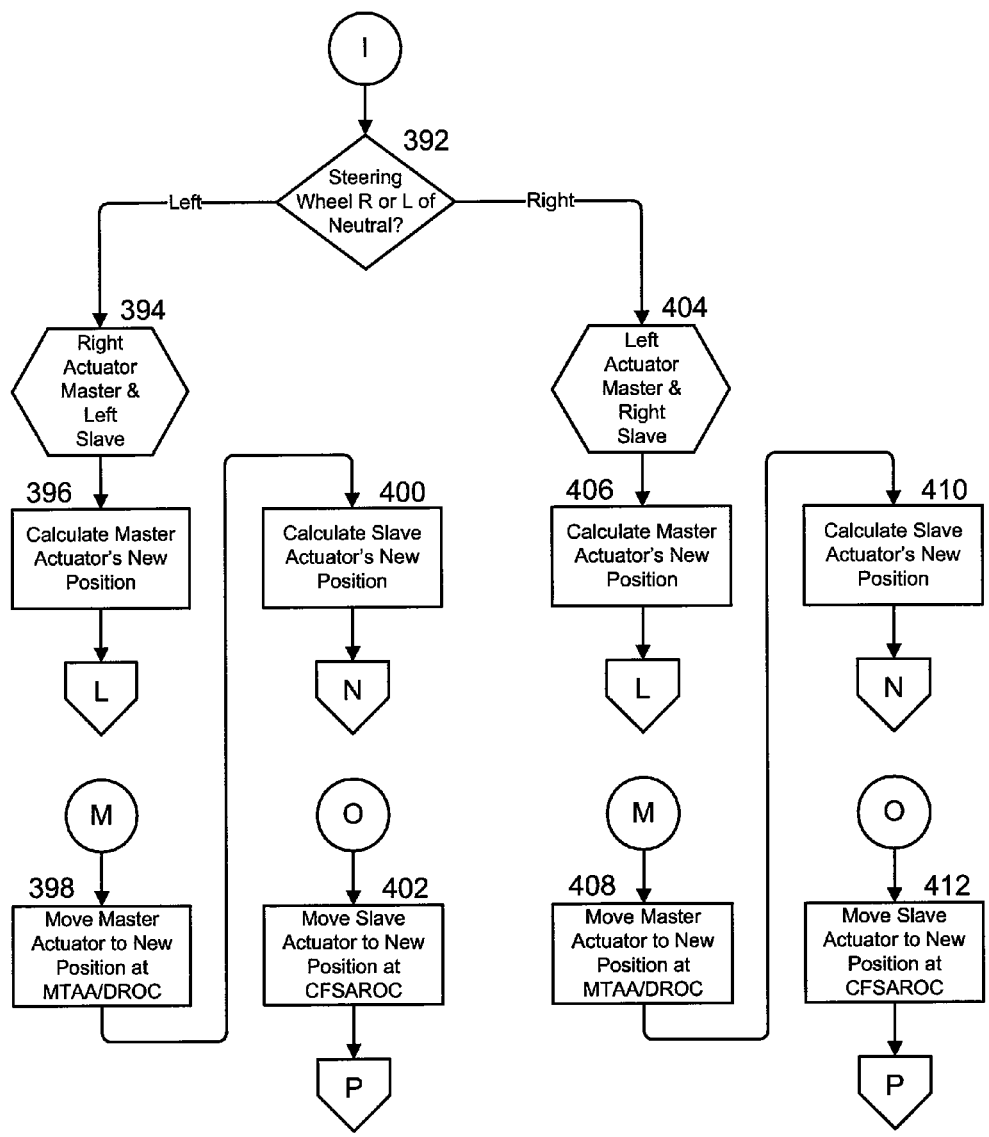
FIG. 18 is a flow chart of a control process of the drive control system, showing a portion of the actuator control process that occurs with movement of the steering wheel.

Returning now to step 392 in FIG. 18, if steering wheel 36 is to the right of the center position, step 404 denotes left actuator 52L as the master and right actuator 52R as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 406 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 408 in FIG. 18.

At step 408, the master actuator is moved to the calculated new position at the master tire accelerator accelerating and decelerating rate of change (MTAA/DROC). The master tire accelerator accelerating and decelerating rate of change is defined during programming and may be modified to meet the operating requirements of a specific vehicle. This value sets how quickly an actuator moves in response to a signal to move to a new position.

After the master actuator has been moved, the slave actuator position must be determined. Step 410 indicates that the new slave actuator position is being calculated by the steps shown in FIG. 22 and previously described above. The only difference from the previously described procedure is that completion of the process steps in FIG. 22 returns control to step 412 in FIG. 18. At step 412, the slave actuator is moved to its new position at the calculated fine steering angle rate of change (CFSAROC). Once step 412 is complete, control passes to step 304 in FIG. 14. The function of the flow chart in FIG. 14 has been previously described above.

Returning now to step 390 in FIG. 15, if the steering angle is greater than fine, step 414 determines whether there has been an increase or decrease in the turning radius. If there has been a decrease in turning radius, control passes to step 416 in FIG. 19.

In step 416, the position of steering wheel 36 is determined. If steering wheel 36 is left of, or at, the center position (non-steering position), step 418 denotes that right actuator 52R operates as the master and left actuator 52L operates as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 420 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 422 in FIG. 19.

At step 422, the master actuator is moved to the new position at the master tire steering acceleration rate of change (MTSAROC). The master tire steering acceleration rate of change is defined during programming and may be modified to meet the operating requirements of a specific vehicle. This value sets how quickly an actuator moves in response to a signal to move to a new position during a steering operation.

After the master actuator has been moved, the slave actuator position must be determined. Step 424 indicates that the new slave actuator position is being calculated by the steps shown in FIG. 22 and previously described above. The only difference from the previously described procedure is that completion of the process steps in FIG. 22 returns control to step 426 in FIG. 19. At step 426, the slave actuator is moved to its new position at the slave maximum unrestricted rate of change (SMUROC). Once step 426 is complete, control passes to step 304 in FIG. 14. The function of the flow chart in FIG. 14 has been previously described above.

Figure 19:
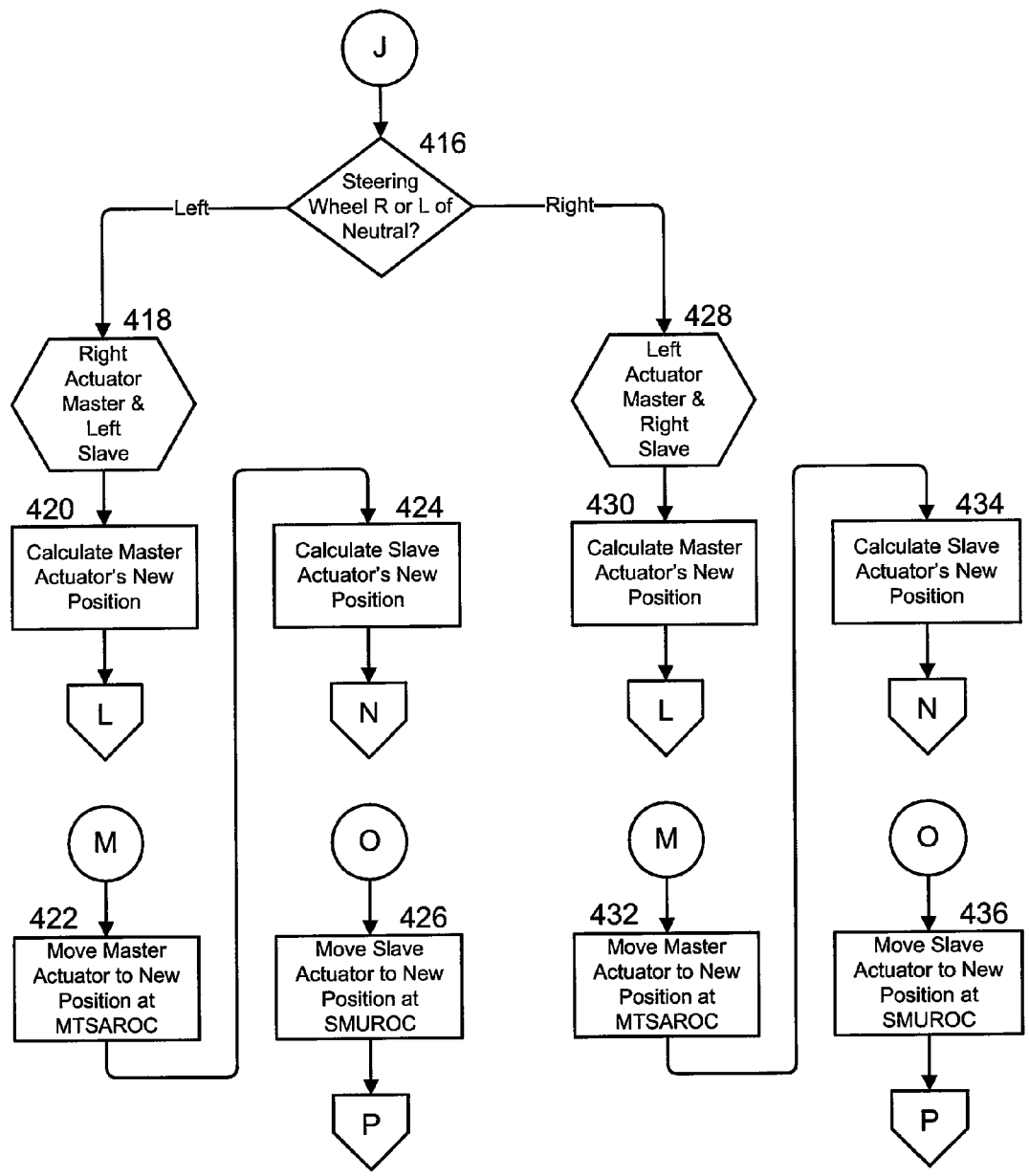
FIG. 19 is a flow chart of a control process of the drive control system, showing a portion of the actuator control process that occurs with movement of the steering wheel.

Returning now to step 416 in FIG. 19, if steering wheel 36 is to the right of the center position, step 428 denotes left actuator 52L as the master and right actuator 52R as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 430 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 432 in FIG. 19.

At step 432, the master actuator is moved to the calculated new position at the master tire steering acceleration rate of change (MTSAROC). The master tire steering acceleration rate of change is defined during programming and may be modified to meet the operating requirements of a specific vehicle. This value sets how quickly an actuator moves in response to a signal to move to a new position.

After the master actuator has been moved, the slave actuator position must be determined. Step 434 indicates that the new slave actuator position is being calculated by the steps shown in FIG. 22 and previously described above. The only difference from the previously described procedure is that completion of the process steps in FIG. 22 returns control to step 436 in FIG. 19. At step 436, the slave actuator is moved to its new position at the slave maximum unrestricted rate of change (SMUROC). Once step 436 is complete, control passes to step 304 in FIG. 14. The function of the flow chart in FIG. 14 has been previously described above.

Figure 20:
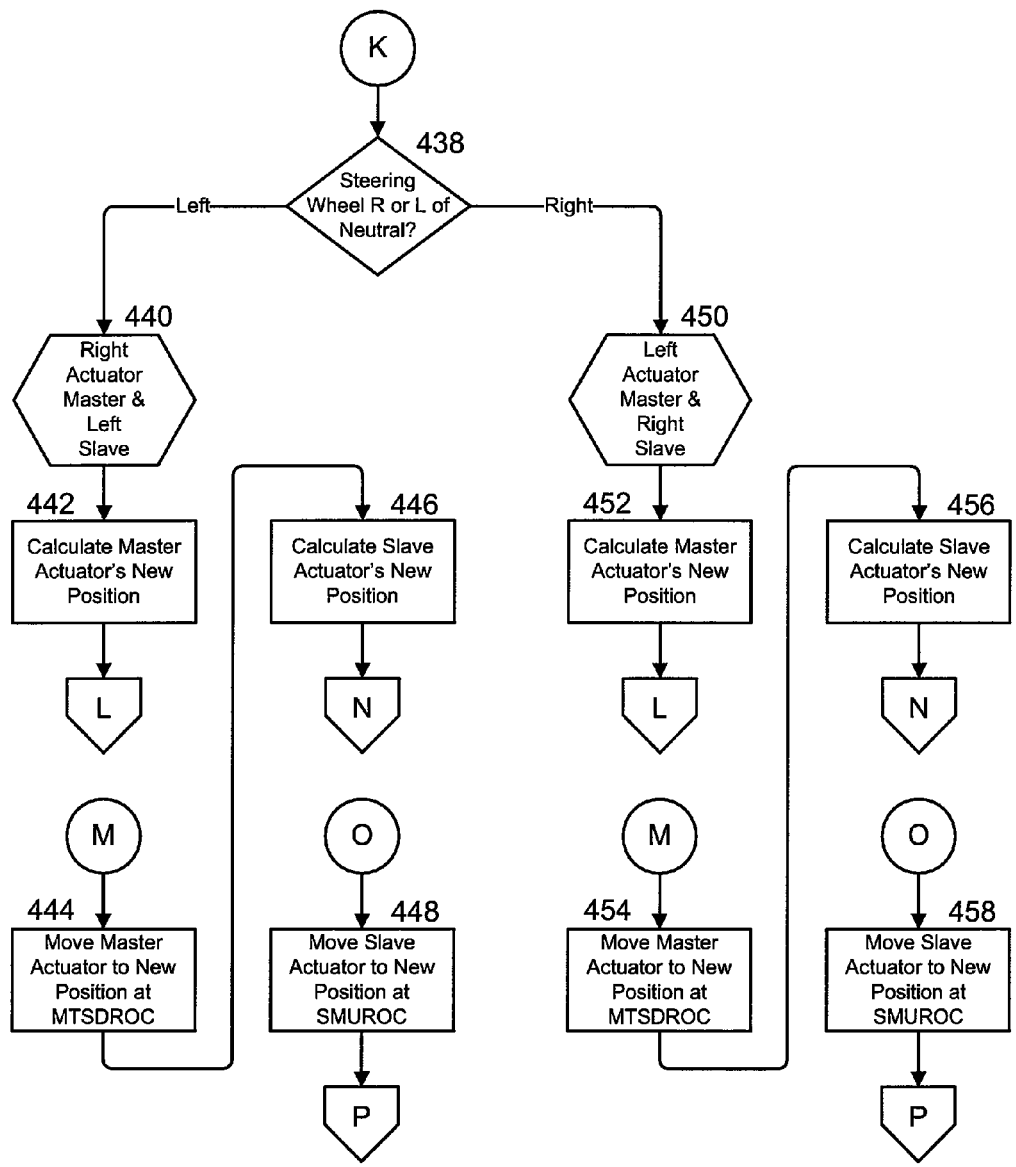
FIG. 20 is a flow chart of a control process of the drive control system, showing a portion of the actuator control process that occurs with movement of the steering wheel.

Returning now to step 414 in FIG. 15, if the turning radius has increased, control passes to step 438 in FIG. 20, where the position of steering wheel 36 is determined. If steering wheel 36 is left of, or at, the center position (non-steering position), step 440 denotes right actuator 52R as the master and left actuator 52L as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 442 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 444 in FIG. 20.

At step 444, the master actuator is moved to the new position at the master tire steering deceleration rate of change (MTSDROC). The master tire steering deceleration rate of change is defined during programming and may be modified to meet the operating requirements of a specific vehicle. This value sets how quickly an actuator moves in response to a signal to move to a new position during a steering operation.

After the master actuator has been moved, the slave actuator position must be determined. Step 446 indicates that the new slave actuator position is being calculated by the steps shown in FIG. 22 and previously described above. The only difference from the previously described procedure is that completion of the process steps in FIG. 22 returns control to step 448 in FIG. 20. At step 448, the slave actuator is moved to its new position at the slave maximum unrestricted rate of change (SMUROC). Once step 448 is complete, control passes to step 304 in FIG. 14. The function of the flow chart in FIG. 14 has been previously described above.

Returning now to step 438 in FIG. 20, if steering wheel 36 is to the right of the center position, step 450 denotes left actuator 52L as the master and right actuator 52R as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 452 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 454 in FIG. 20.

At step 454, the master actuator is moved to the calculated new position at the master tire steering deceleration rate of change (MTSDROC). The master tire steering deceleration rate of change is defined during programming and may be modified to meet the operating requirements of a specific vehicle. This value sets how quickly an actuator moves in response to a signal to move to a new position.

After the master actuator has been moved, the slave actuator position must be determined. Step 456 indicates that the new slave actuator position is being calculated by the steps shown in FIG. 22 and previously described above. The only difference from the previously described procedure is that upon completion of the flow chart in FIG. 22 control returns to step 458 in FIG. 20. At step 458, the slave actuator is moved to its new position at the slave maximum unrestricted rate of change (SMUROC). Once step 458 is complete, control passes to step 304 in FIG. 14. The function of the flow chart in FIG. 14 has been previously described above.

Throughout this description actuators 52L and 52R are caused to move by the actions of accelerator pedal 32 and steering wheel 36. Though the movement is limited by minimum and maximum speeds, one aspect that has yet to be addressed is how processor 80 causes actuators 52L and 52R to transition to a particular speed of movement. If the transition is too abrupt, then an end user will perceive the vehicle to be jerky. If the transition is too slow, then an end user will perceive the vehicle to be sluggish and possibly hard to turn.

In order to address these issues, the control methods of the present invention make use of a proportional integral derivative (PID) loop to control the beginning and end of the actuator movements. PID loops are known in the art. Other transitioning moderating techniques may also be used, such as proportional (P) loops, proportional integral (PI) loops, and proportional derivative (PD) loops. Other transition moderating techniques may be used, as long as they can be adjusted for reasonably smooth operation of a particular vehicle or particular class of vehicle.

Another factor is the time required to process the information provided by accelerator pedal 32 and steering wheel 36. Because the maximum rate of movement of actuators 52L and 52R are preferably controlled via software processes resident in processor 80 as described herein, there is no penalty to operation with an extremely fast processor. However, a slow processor may be noticed by a user as sluggish response. Optional clock 81 may be used if the speed of processor 80 is insufficiently fast for a particular vehicle application. In the configuration described herein, the approximate speed of response to a change in controls is about 20 milliseconds. This response speed should be sufficient for most applications.

Figure 26:
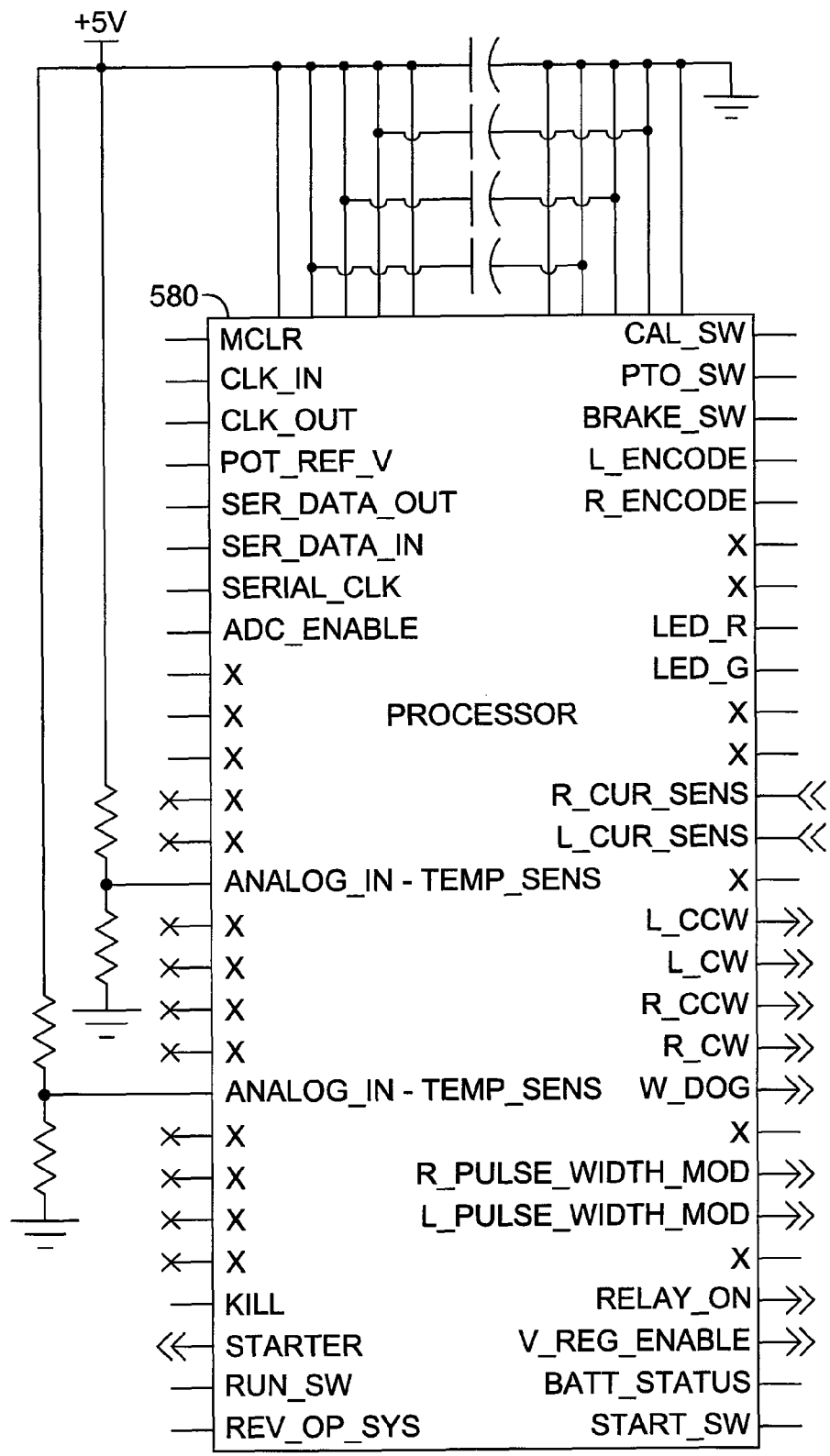
FIG. 26 is a schematic of a processor of the second embodiment drive control system showing inputs to and outputs from the processor.

FIGS. 25 through 33 illustrate a second embodiment of a drive control system 530 in accordance with the principles of the present invention. This embodiment illustrates that the principles of the present invention can be implemented in numerous ways and with various modifications without departing from those principles. Referring to FIGS. 25 through 33, controller 550 preferably includes processor 580, which is configured with some differences compared to processor 80 of the first embodiment. These differences will be explained in more detail below with respect to the control algorithms of the second embodiment. Referring generally to FIG. 26, processor 580 is configured with several inputs/ outputs that differ from processor 80, including SER_DATA_OUT, SER_DATA_IN, SERIAL_CLK, ADC_ENABLE, ANALOG_IN-TEMP_SENS, L_CCW, L_CW, R_CCW, R_CW, and W_DOG. In a particular embodiment, processor 580 is a PIC18F6620 microcontroller manufactured by Microchip Technology Incorporated. However, many other types of processors, programmable logic controllers (PLCs), or the like could be utilized in accordance with the principles of the present invention. As with the first embodiment, for purposes of simplicity, some of the drawings described herein with respect to the second embodiment may illustrate only the portion of the processor being described in connection with a particular drawing, with the understanding that the processor may appear as illustrated schematically in FIG. 26.

Figure 27:
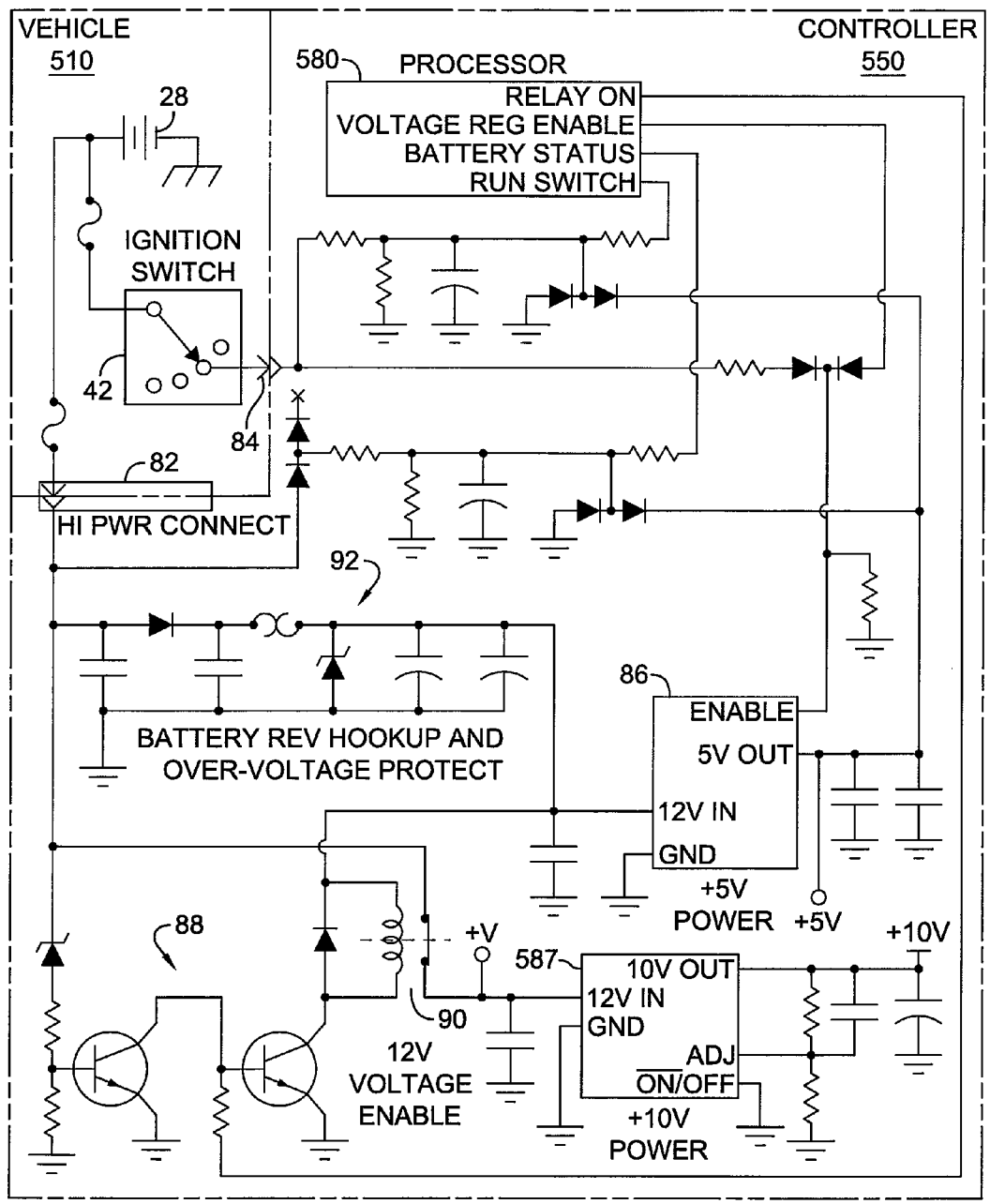
FIG. 27 is a schematic of one portion of the second embodiment drive control system showing the power supply with the ignition switch in the run position.

Referring to FIG. 27, controller 550 is similar to controller 50. Controller 550 includes an additional power supply, which is in the form of +10V power supply 587. Similar to operation of controller 50, +5V power supply 86 is enabled through connector 84 when ignition switch 42 is in the run position. With ignition switch 42 in the run position and with the presence of +5V power from power supply 86, processor 580 provides a signal through an amplifier 88 to 12V enable relay 90 to activate it. Once 12V enable relay 90 has been activated, unfiltered 12V power from battery 28 is provided for use at various locations in drive control system 530. Additionally, in this embodiment, when 12V enable relay 90 has been activated, +10V power supply 587 is also enabled to supply 10V power for use in system 530 or vehicle 510.

Figure 28:
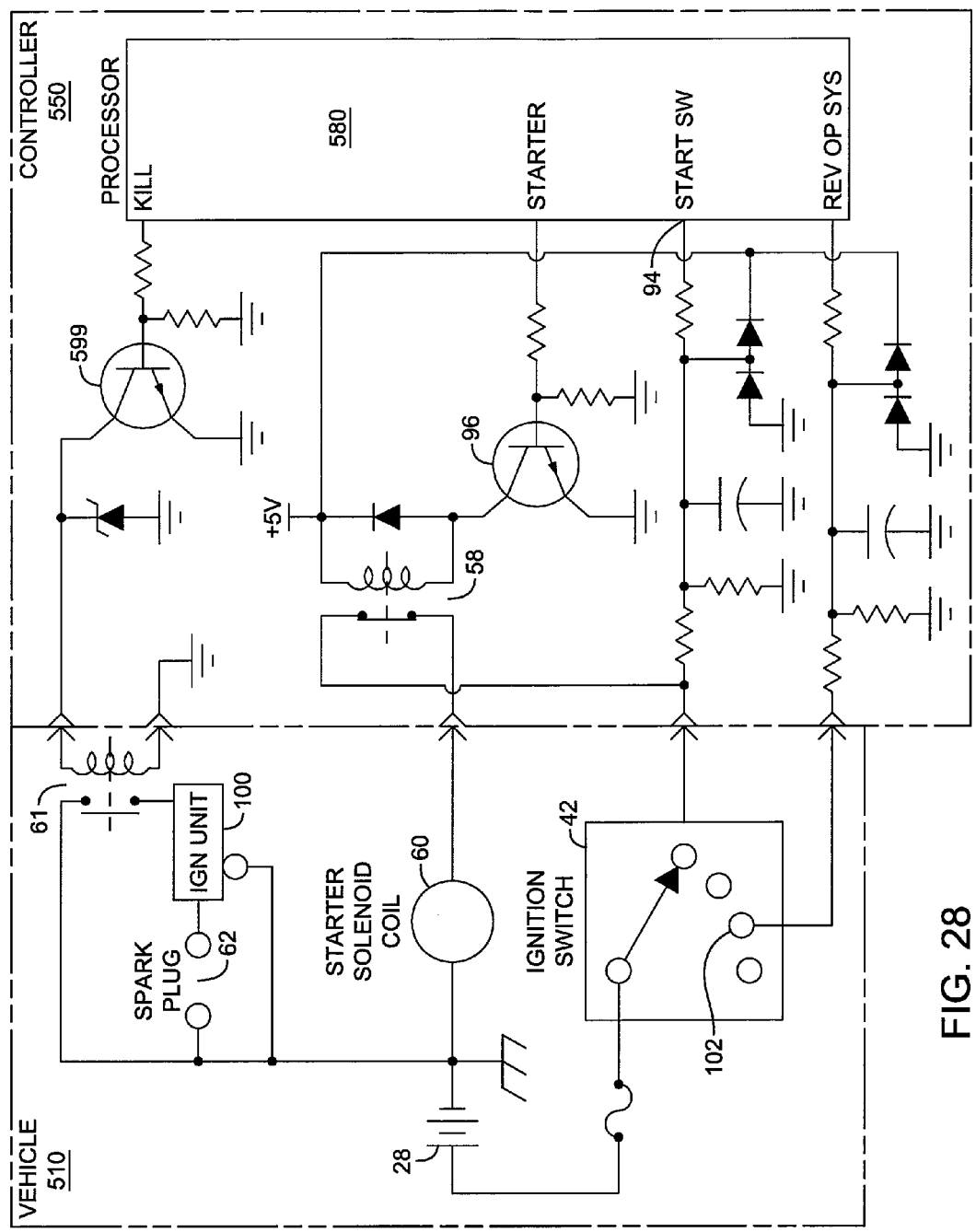
FIG. 28 is a schematic of one portion of the second embodiment drive control system showing the vehicle start circuit along with certain other drive control system features.

Turning now to FIG. 28, the start, kill and reverse operating system functions are illustrated, which are similar to those described with respect to the first embodiment. When ignition switch 42 is placed in the start position, as shown in FIG. 28, voltage from battery 28 is provided to start switch input 94 of processor 580 as well as to relay 58. Processor 580 performs a variety of functions prior to causing actuation of relay 58, as previously described with respect to the first embodiment. Processor 580 actuates relay 58 by sending a signal to a transistor 96, which then causes actuation of relay 58. Relay 58 is shown in an actuated state in FIG. 28. When relay 58 is actuated, it completes a voltage path to starter solenoid 60, which in turn permits vehicle 510 to be started.

Referring again to FIG. 28, processor 580 may provide a biasing voltage to a transistor 599 that allows relay 61 to be energized, which causes grounding of the signal from an ignition unit 100 if processor 580 determines that vehicle 510 has attained an impermissible operating condition. A Zener diode (not numbered) is associated with transistor 599 so that the avalanche/zener point introduces compensating temperature co-efficient balancing of the transistor PN junction. Grounding the signal from ignition unit 100 prevents spark plug 62 located in prime mover 18 from firing and thereby halts operation of prime mover 18. Thus, processor 580 has the ability to stop or "kill" operation of prime mover 18.

Ignition switch 42 may be rotated to a reverse operating system (ROS) contact position 102 as shown in FIG. 28. Similar to the first embodiment, in this position, a signal is sent to processor 580 that indicates an operator desires mower deck 26 to keep operating even when vehicle 510 is operating or moving in a reverse direction. Many mowing vehicles have one of two types of systems to prevent mower deck 26 operation in reverse. One type of system involves removing power to an electric clutch in response to a reverse operation condition, which thus causes mower deck 26 to cease operation. The other type of system causes prime mover 18 to cease operation. Contact position 102 of ignition switch 42 enables drive control system 530 to allow operation of mower deck 26 or prime mover 18 during reverse movement or operation of vehicle 510. As in the first embodiment, reverse operating system contact position 102 could be used to enable other devices, such as a visual or audible alarm, proximity sensors for obstacle detection, a video display, etc., either individually or in combination.

As previously noted, first embodiment drive control system 30 provides power to actuators 52L and 52R. In the second embodiment, the power for each actuator 52L and 52R is provided through a circuit like that shown in FIG. 29, which illustrates the power circuit for right actuator 52R. Similar to the first embodiment, processor 580 determines the length of time and direction that each actuator 52L and 52R is required to move based on signals from a variety of sources. Processor 580 provides signals to an H-bridge MOSFET driver 504, which then provides drive signals as directed by processor 580 to a MOSFET half H-bridge 506. The output from MOSFET half H-bridge 506 is directed through power connector 82 to actuator 52R. A current sense op-amp 108 is also provided, which, in a particular embodiment, is an LMV321 operational amplifier supplied by National Semiconductor. The output of op-amp 108 is provided to processor 580 to enable processor 580 to determine that MOSFET half H-bridge 506 is operating properly.

Figure 29:
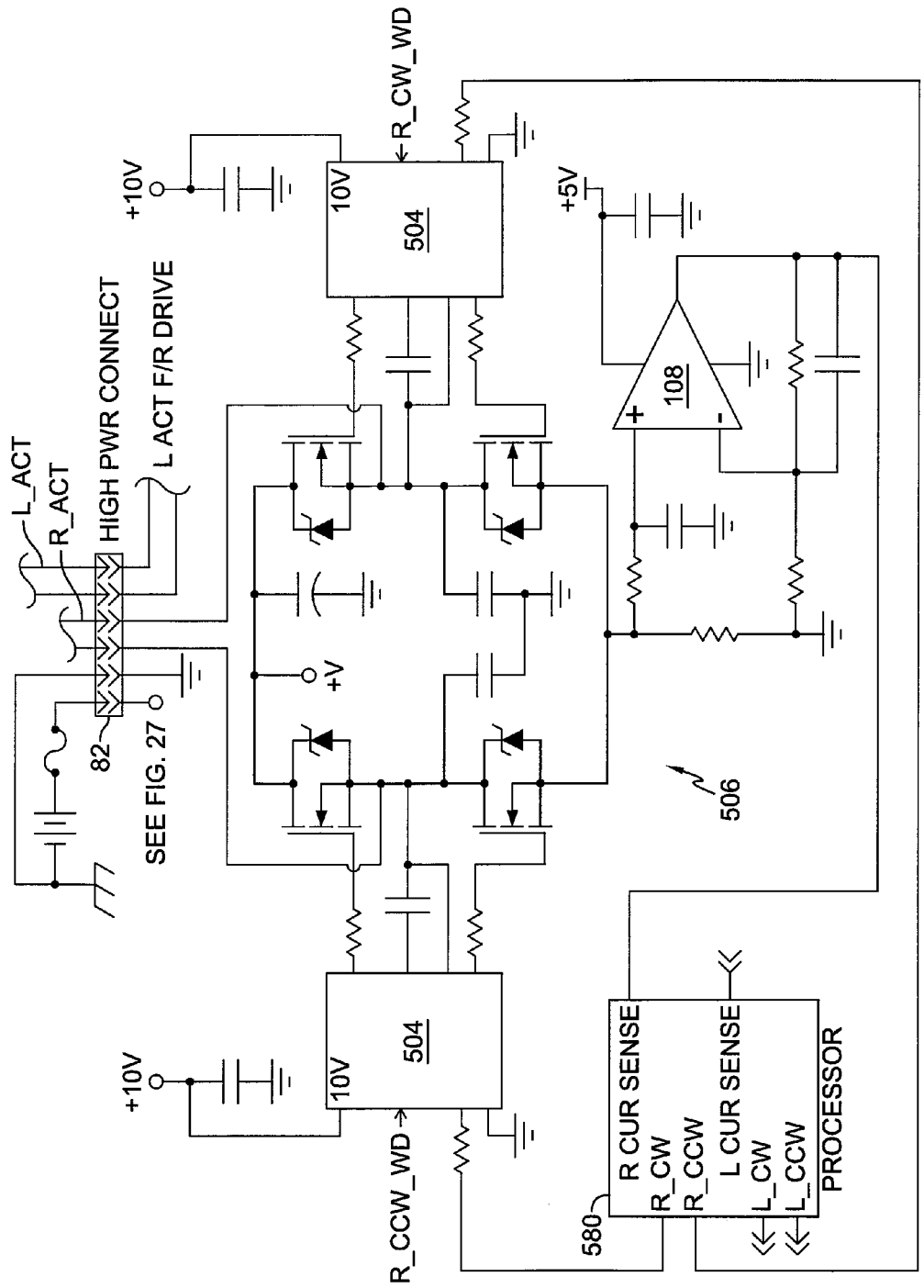
FIG. 29 is a schematic of one portion of the second embodiment drive control system showing the drive circuits for one transaxle actuator.
Figure 30:
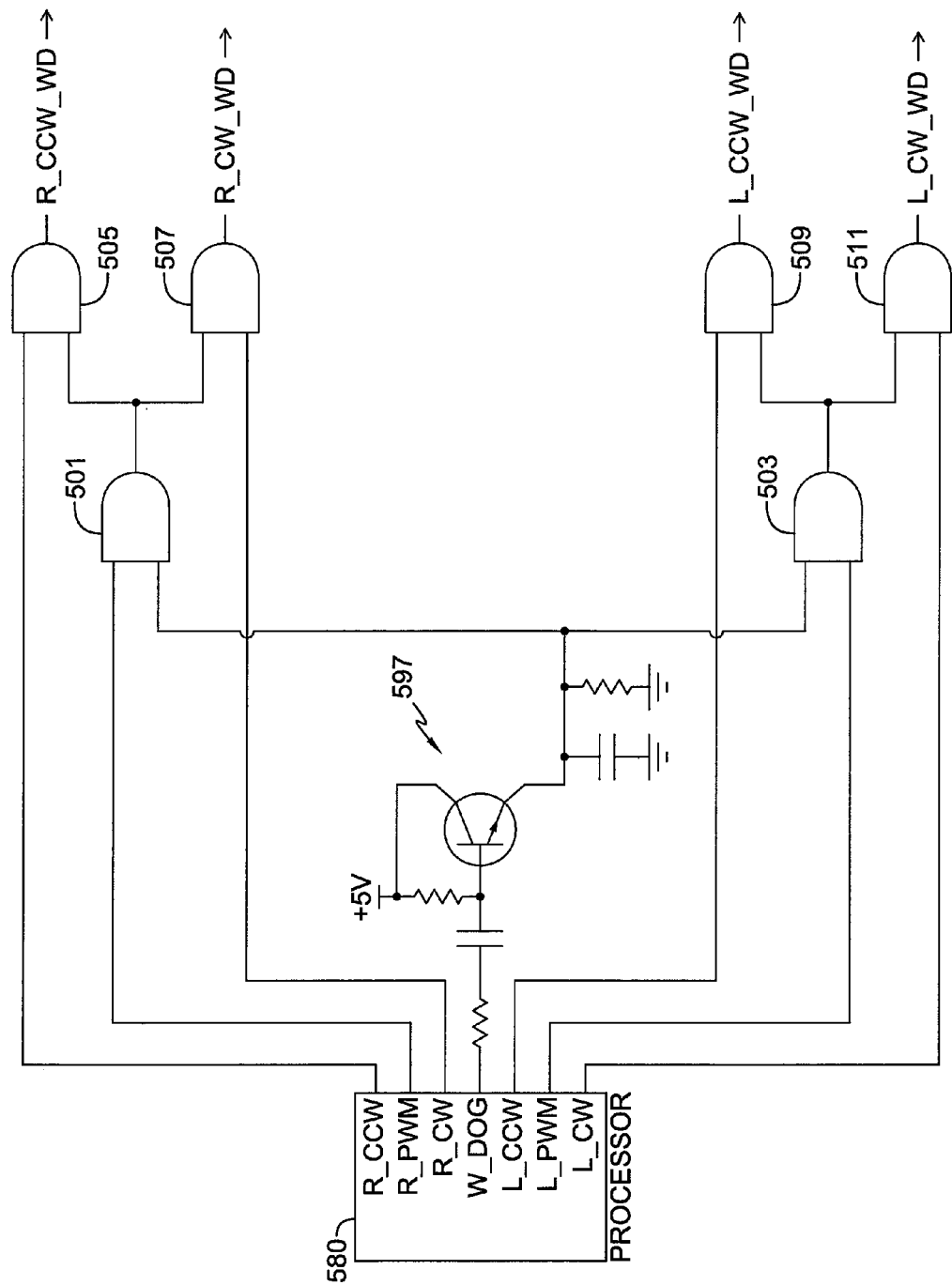
FIG. 30 is a schematic of one portion of the second embodiment drive control system showing an external watch dog circuit and an arrangement of AND gates providing input to the circuit shown in FIG. 29.

As shown in FIG. 30, in the second embodiment, a watchdog circuit is provided external to the processor 580. When the internal watchdog of processor 580 generates a signal, transistor 597 is switched to provide +5V to one input of each AND gate 501 and 503, which are respectively associated with each drive circuit for each actuator 52L and 52R. The second input to each AND gate 501 and 503 is respectively provided by the R_PWM and L_PWM outputs of processor 580. The output of AND gate 501 feeds one input of each AND gate 505 and 507. The other inputs of these AND gates receive input from R_CCW and R_CW of processor 580, respectively. The output of each of these AND gates, R_CCW_WD and R_CW_WD, provides input signals to the appropriate H-bridge MOSFET driver 504 as shown in FIG. 29. Likewise, the output of AND gate 503 feeds one input of each AND gate 509 and 511. The other inputs of these AND gates receive input from L_CCW and L_CW of processor 580, respectively. The output of each of these AND gates, L_CCW_WD and L_CW_WD, provides input signals to the appropriate H-bridge MOSFET driver 504 as shown in FIG. 29.

Figure 31:
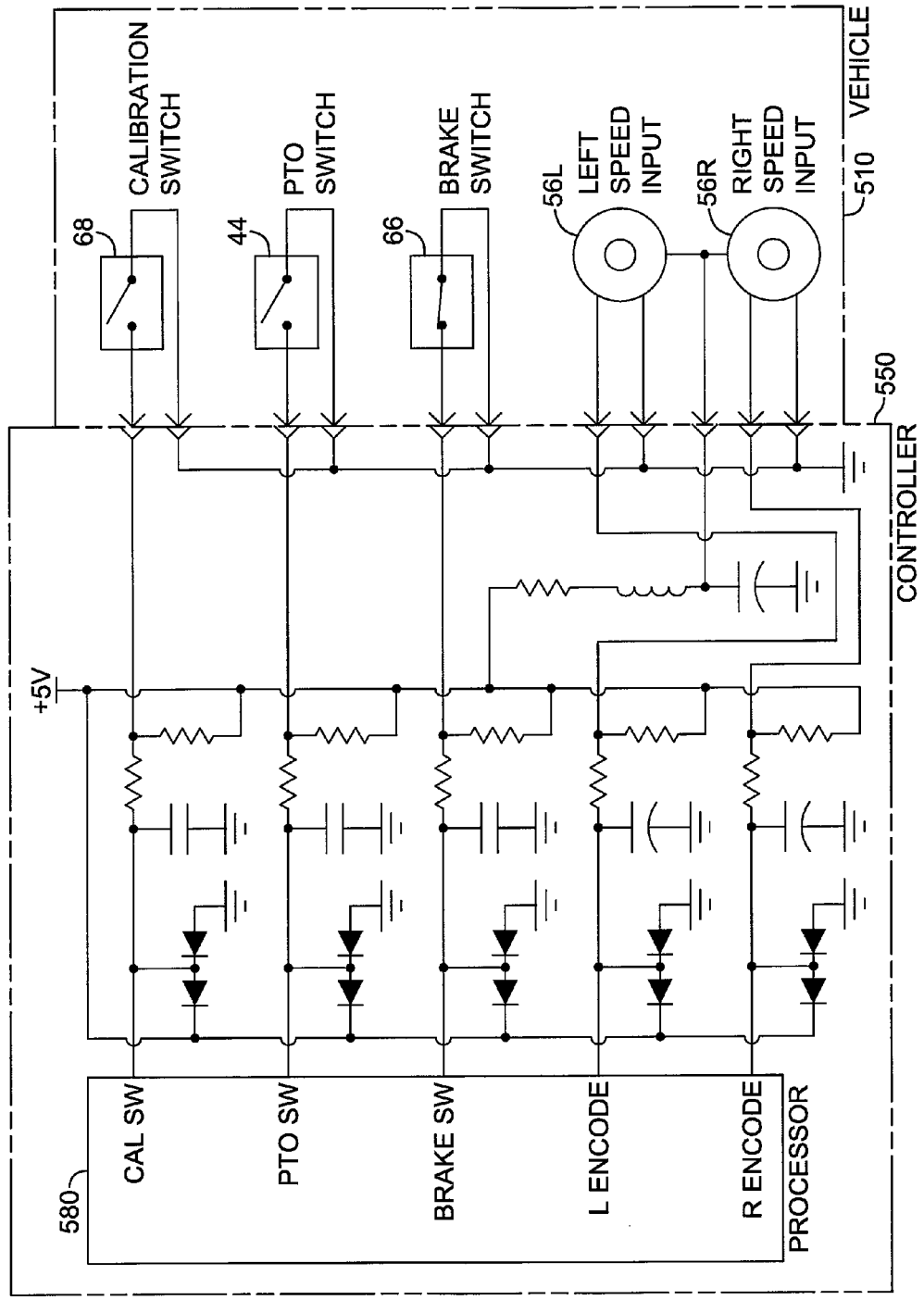
FIG. 31 is a schematic of one portion of the second embodiment drive control system showing some sensor inputs to the drive control system processor.

Similar to the first embodiment, FIG. 31 illustrates some of the various inputs that may be connected to processor 580. Processor 580 is in electrical communication with brake switch 66, which is activated by brake pedal 34. Brake switch 66 may be located such that actuation of brake pedal 34 or other similar brake actuating device causes switch 66 to be actuated. In a particular embodiment, brake switch 66 is located on transmissions 12L and 12R or is part of the brake linkage connected to brake pedal 34.

Referring to FIG. 31, processor 580 is in electrical communication with power take-off switch 44 in order to govern power to an auxiliary device such as the blades of mower deck 26. When an actuating handle or switch for the blades of mower deck 26 is engaged, power take-off switch 44 may be actuated to inform processor 580 of such engagement. Actuation of power take-off switch 44 may also be a part of an optional reverse operating system and may work in conjunction with a position of ignition switch 42 to allow the blades of mower deck 26 to continue to operate even when vehicle 510 is operated in the reverse direction.

Referring again to FIG. 31, processor 580 is also in electrical communication with calibration switch 68, which permits reprogramming of processor 580. Optional speed sensors 56L and 56R are available to provide speed information for each axle shaft 14.

In the second embodiment circuit shown in FIG. 31, an RLC circuit (not numbered) is included between the processor 580 and the various inputs to act as a filter.

Figure 32:
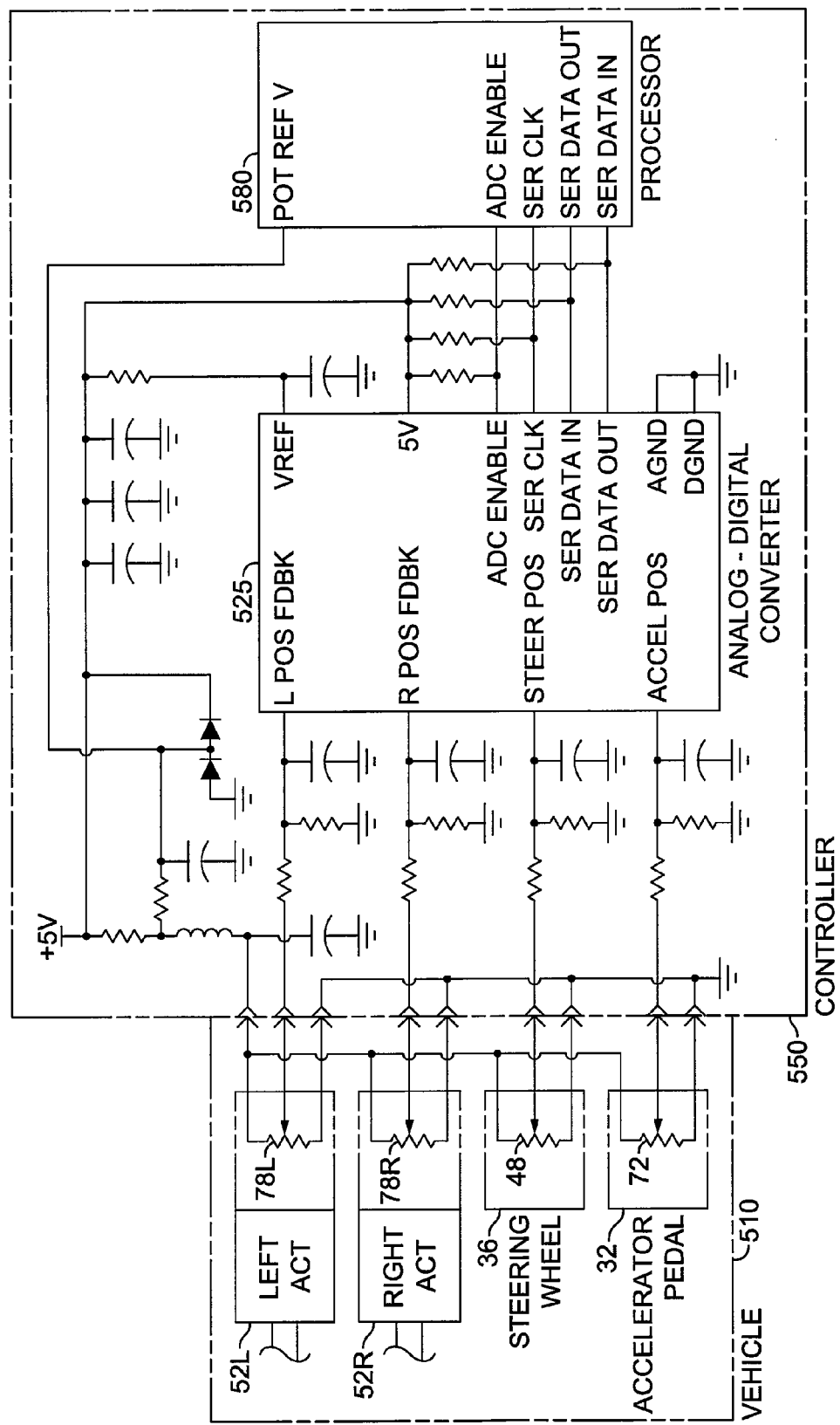
FIG. 32 is a schematic of one portion of the second embodiment drive control system showing some sensor inputs to the drive control system processor.

FIG. 32 illustrates inputs to processor 580 that are directly involved in the movement of actuators 52L and 52R. Accelerator pedal 32 is associated with a sensor in the form of potentiometer 72 that provides information to processor 580 regarding the desired direction and speed of vehicle 510. Steering wheel 36 is associated with steering position sensor 48 that provides information related to the direction and desired amount of steering to processor 580. Each actuator 52L and 52R is respectively associated with actuator feedback potentiometers 78L and 78R, which provide feedback to processor 580 so that processor 580 is able to determine when each actuator 52L and 52R has reached its expected position. In the second embodiment shown in FIG. 32, an analog-to-digital converter 525 is provided between the inputs and processor 580.

Figure 33:
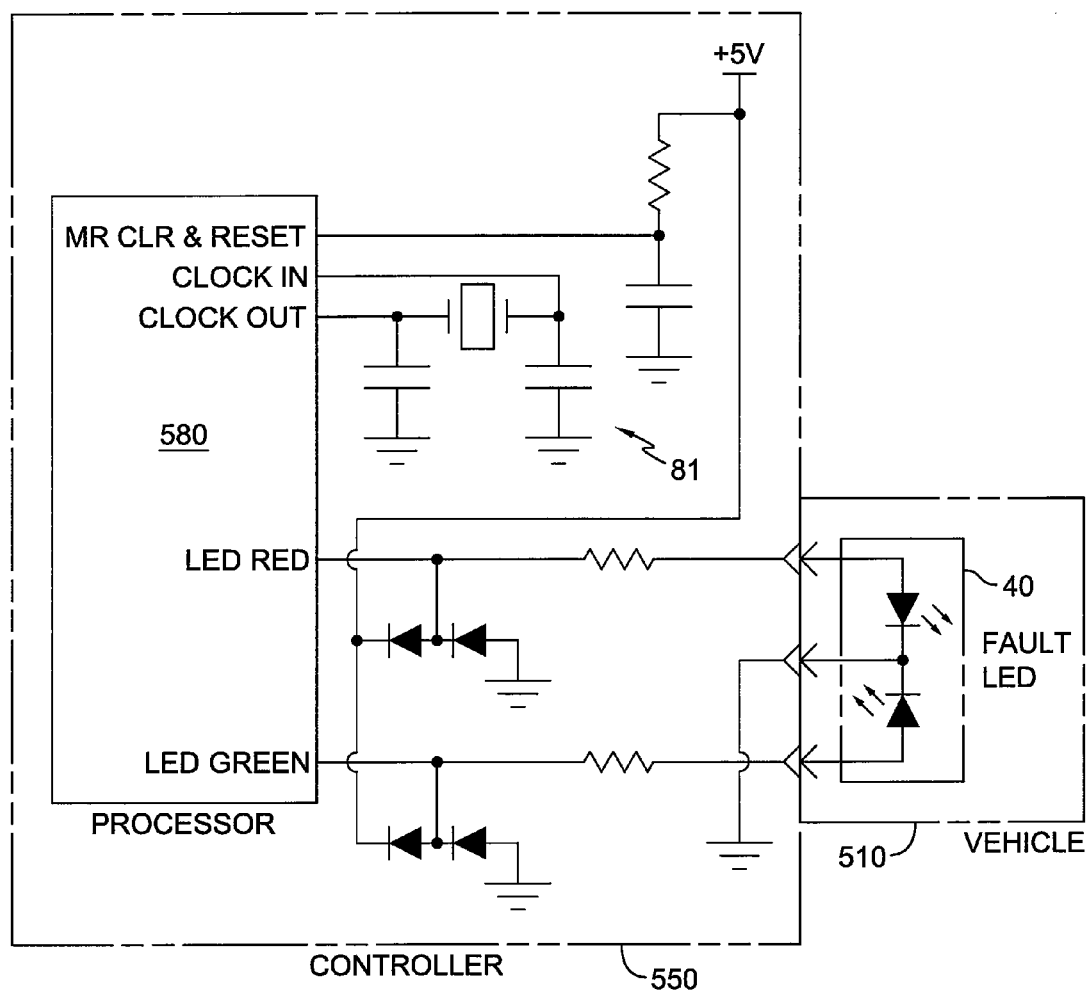
FIG. 33 is a schematic of one portion of the second embodiment drive control system showing an optional processor clock and the outputs to an indicator light.

FIG. 33 illustrates an optional external clock 81 that controls the processing speed of processor 580. Processor 580 has an internal clock, but processor 580 is capable of higher processing speeds by using external clock 81. External clock 81 may be desirable in some circumstances where a particular vehicle requires a faster than usual response in order to maintain end user satisfaction. Also shown in FIG. 33 is the connection between processor 580 and indicator light or LED 40. Indicator light 40 may have colored output such as red and green to indicate the status of drive control system 530.

Figure 34:
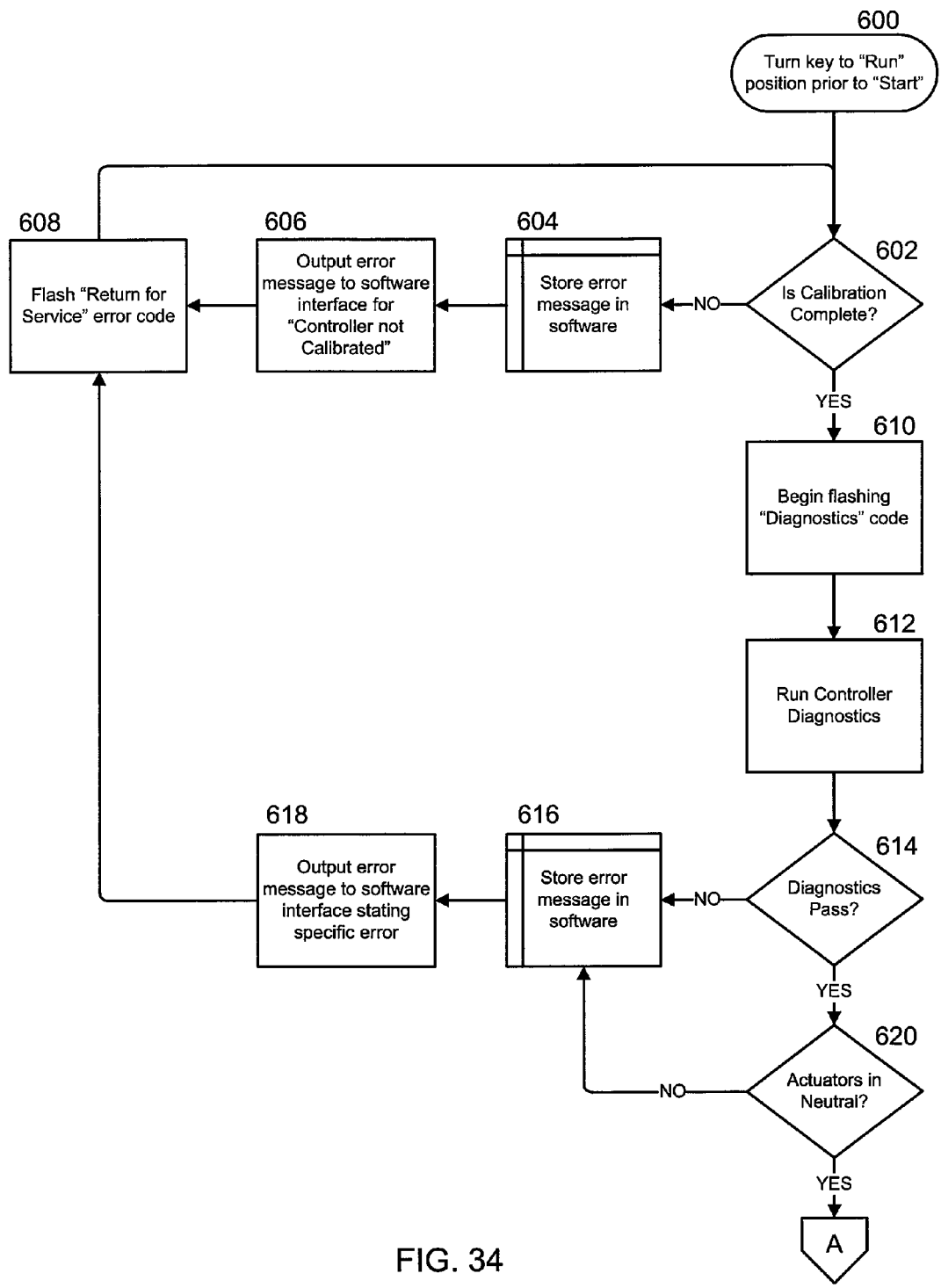
FIG. 34 is a flow chart of a control process of the second embodiment drive control system, showing representative diagnostics performed prior to allowing the vehicle to be started.

FIGS. 34 through 40 illustrate flow charts that describe the control functions and methods of the second embodiment in accordance with the principles of the present invention. When a vehicle operator turns ignition switch 42 from its off position to the run position, drive control system 530 begins to perform a series of diagnostics and tests. Prime mover 18 is not permitted to operate until diagnostics and tests are complete. As shown in FIG. 34, step 600 denotes movement of ignition switch 42 from the off position to the run position, which is the position of ignition switch 42 as shown in FIG. 27. Once processor 580 recognizes that ignition switch 42 has been moved to the run position, processor 580 checks to determine whether drive control system 530 has been properly calibrated at step 602.

Calibration of drive control system 530 includes establishing the limits of travel and the neutral position of actuators 52L and 52R, and is performed as a part of manufacturing or servicing of drive control system 530. Since this process occurs only during assembly and maintenance of drive control system 530, it is not illustrated in the attached figures. As part of the calibration process, processor 580 may check to determine whether the limits of travel and neutral position of actuators 52L and 52R are within expected limits. If the limits of travel and neutral position of actuators 52L and 52R exceed the limits anticipated by processor 580, then processor 580 may return an error code either through a programming interface (not shown) or through indicator light 40. Once drive control system 530 has been calibrated, a soft switch is actuated and stored in processor 580's memory that denotes calibration is complete.

If the soft switch indicates that calibration of drive system 530 has not been accomplished, then an error message is stored at step 604. At step 606, an error message is output to an interface to indicate that the controller is not calibrated. In a particular embodiment, the error message may be read using appropriate diagnostic equipment connected to the software interface (not shown) of drive system 530. At step 608, an error code is flashed, preferably via indicator light 40, in response to a signal that denotes that vehicle 510 needs to be returned to a qualified dealer for service. At this point, vehicle 510 is inoperable and an operator's only choice will be to return ignition switch 42 to the off position. However, it should be noted that this path of steps is available only in the unlikely event that the manufacturer installing drive control system 530 has failed to perform the proper calibration procedure.

At step 610, if the calibration-completed soft switch has been set, indicator light 40 flashes a code denoting the diagnostics mode of drive control system 530. At step 612, diagnostics of controller 550 are performed to verify that controller 550 is operating properly. As part of the diagnostics of controller 550, the position of each actuator 52L and 52R is determined. If actuators 52L and 52R are not in neutral, controller 550 attempts to drive actuators 52L and 52R into neutral. Once the diagnostics of controller 550 are complete, the status of the diagnostics is determined at step 614. If the diagnostics failed, an error message is stored at step 616. The error message is output to an interface stating the specific error at step 618. Indicator light 40 flashes to denote that vehicle 510 needs to be returned to a qualified dealer for service.

If drive control system 530 passes its diagnostic tests, drive control system 530 determines whether actuators 52L and 52R are in the neutral position at step 620. If actuators 52L and 52R are not in the neutral position and if drive control system 530 is unable to return actuators 52L and 52R to the neutral position, an error message is stored at step 616. The error message is output to an interface stating the specific error at step 618. Indicator light 40 flashes to denote that vehicle 510 needs to be returned to a qualified dealer for service.

Figure 35:
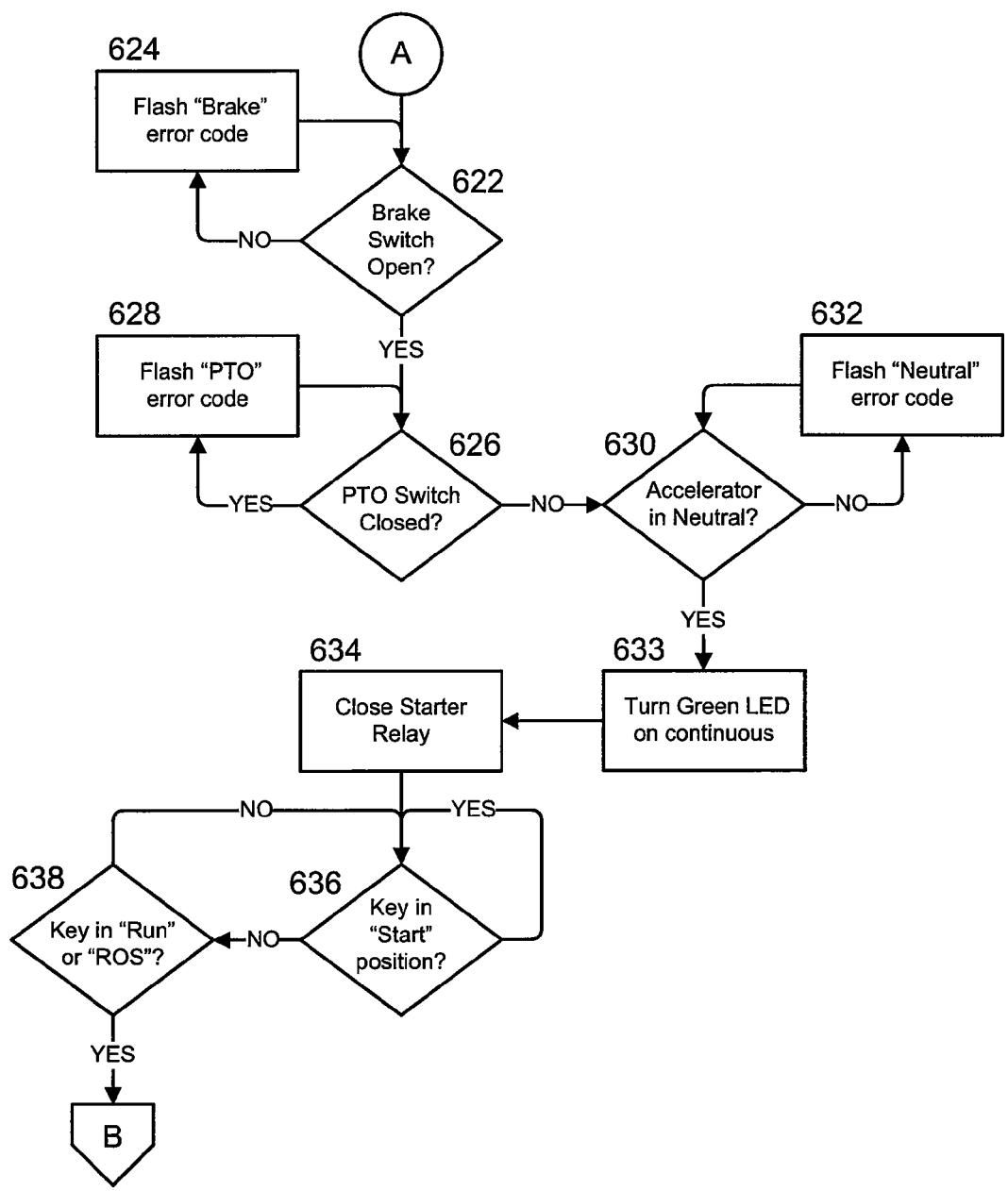
FIG. 35 is a flow chart of a control process of the second embodiment drive control system, showing further representative diagnostics performed prior to allowing the vehicle to be started as well as enabling of the starter.
Figure 36:
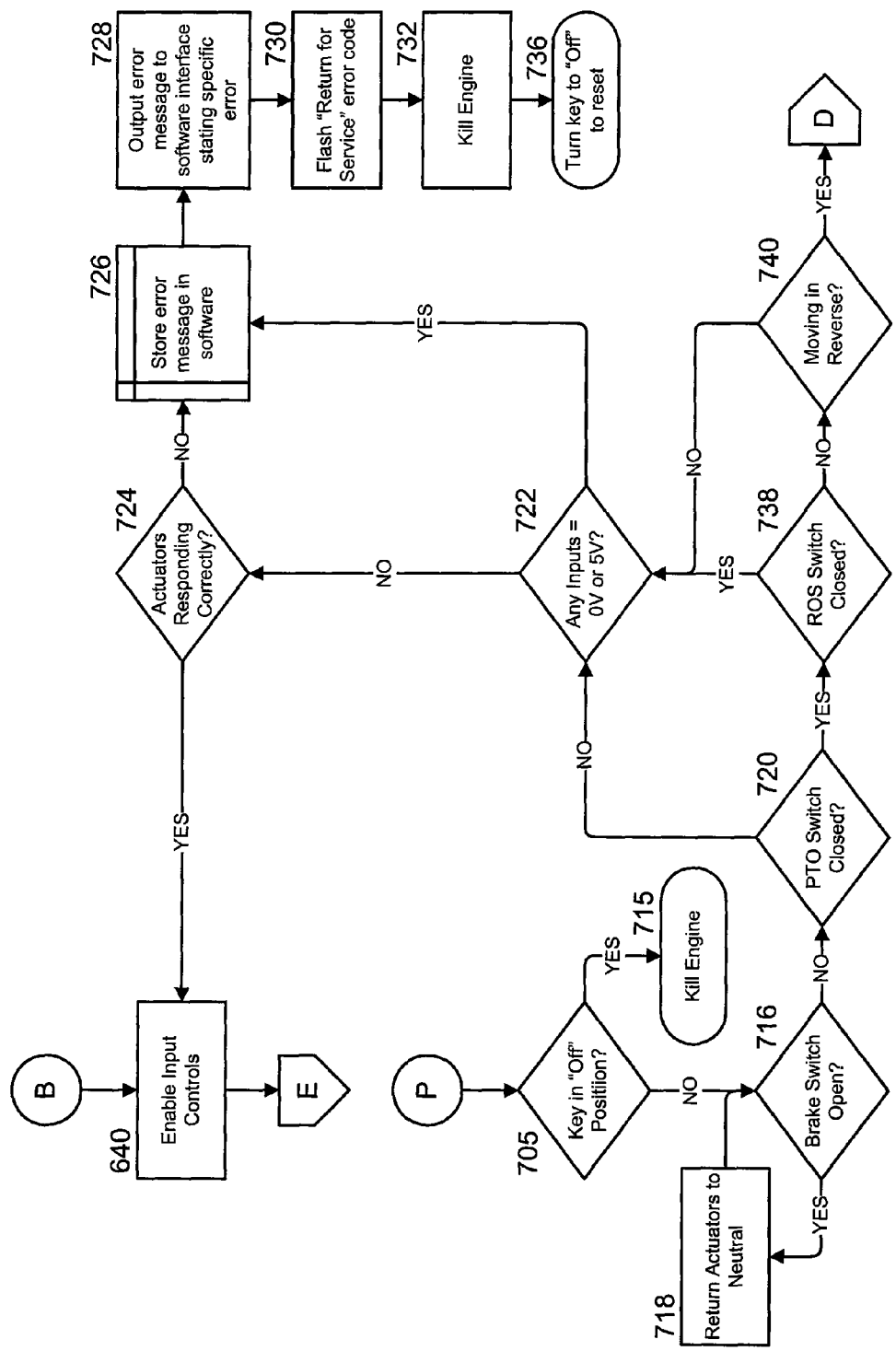
FIG. 36 is a flow chart of a control process of the second embodiment drive control system, showing diagnostics performed to determine whether to kill the prime mover or enable input controls.

If actuators 52L and 52R are in the neutral position, determination of the status of brake switch 66 is made at step 622 shown in FIG. 35. If brake switch 66 is closed, indicator light 40 flashes in a pattern to indicate that the brake pedal 34 needs to be actuated prior to starting at step 624. If brake switch 66 is open, which indicates that brake pedal 34 of vehicle 510 has been actuated, then the status of power take-off switch 44 is checked at step 626. If power take-off switch 44 is closed, which indicates that the mechanism that controls the blades of mower deck 26 has been actuated, then, at step 628, indicator light 40 flashes in a pattern to indicate that power take-off switch 44 needs to be deactivated.

If power take-off switch 44 is open, it is then determined at step 630 whether the accelerator is in the neutral position. The sensors or switches involved in this step may be located as a part of accelerator pedal 32 or its equivalent, actuators 52L and 52R, control arms 54, or other portions of vehicle 510 that are associated with changing the output of transmissions 12L and 12R. At step 632, if transmissions 12L and 12R are not in the neutral position, indicator light 40 flashes in a pattern to indicate that vehicle 510 is not in neutral. Control then returns to step 630. This loop continues until vehicle 510 is returned to neutral or until ignition switch 42 is returned to the off condition.

If accelerator pedal 32 or a feature associated with accelerator pedal 32 is in neutral, a signal is sent to indicator light 40 to cause indicator light 40 to light with a color in accordance with step 633. In a particular embodiment, the color of indicator light 40 at step 633 is green. Now that drive control system 530 has determined that it is safe for vehicle 510 to be operated, drive control system 530 permits starter relay 58 to be actuated at step 634, which then enables starter solenoid 60 to operate when an operator moves ignition switch 42 to the start position. Starter solenoid 60 then causes prime mover 18 to operate, assuming that prime mover 18 is in a condition to be operable (i.e., contains fuel, oil, is mechanically sound, etc.). Under typical circumstances, an operator will release ignition switch 42, which is spring loaded to return to the run position. At step 636, a check is performed to determine whether the operator has released ignition switch 42 to the run position or if it is still in the start position. If ignition switch 42 is not in the start position, control moves to step 638. At step 638, if ignition switch 42 is not in either the run or ROS position, then control returns to step 636. This check remains in a control loop until ignition switch 42 is moved from the start position. If ignition switch 42 is in either the run or ROS position, then control moves to step 640, shown in FIG. 36.

Step 640 enables the input controls to processor 580. By enabling the input controls, processor 580 is able to receive input signals from the various components of drive control system 530. The inputs from steering wheel 36 and accelerator pedal 32 cause processor 580 to send signals to actuators 52L and 52R. Step 644 in FIG. 37 begins a series of steps that controls the movement and position of actuators 52L and 52R. These steps are detailed in FIGS. 36 to 40.

Figure 37:
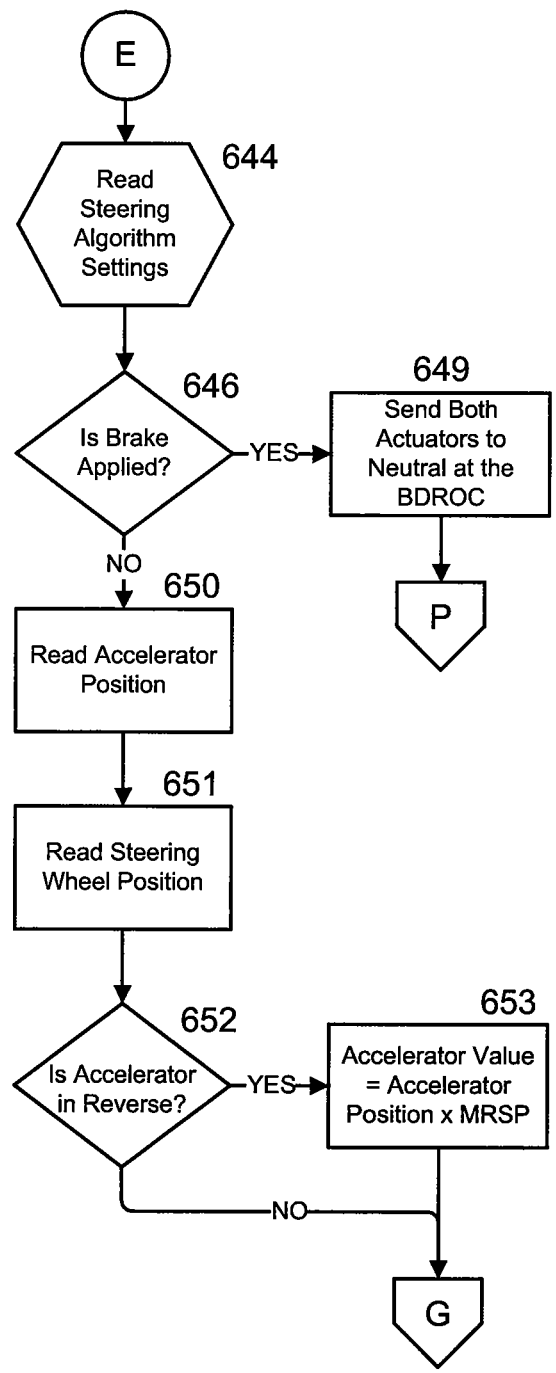
FIG. 37 is a flow chart of a control process of the second embodiment drive control system, showing a portion of the actuator control process.

At step 644, shown in FIG. 37, steering algorithm settings are read. In a particular embodiment, these settings are established during the programming of processor 580. These settings may include the speed at which actuators 52L and 52R respond, the maximum speed of transmissions 12L and 12R, the maximum speed of deceleration when brake pedal 34 is actuated or accelerator pedal 32 is released to return to the neutral position, and the acceleration permitted in the transition from the zero-turn mode of operation (i.e., a pure turning mode without any significant forward or reverse progression of the vehicle) to full forward speed. Other operating settings may be established in a table or may be adjustable with operator selectable input.

After the operating settings have been established, it is determined at step 646 whether brake pedal 34 has been actuated. If brake pedal 34 has been actuated, actuators 52L and 52R are returned to neutral at the brake deceleration rate of change (BDROC) at step 649. After step 649, control is returned to step 705 in FIG. 36 (which will be explained in more detail, below). If the brake of vehicle 510 is not applied, which in this embodiment means that brake pedal 34 is not depressed, then control passes from step 646 to steps 650 and 651. At steps 650 and 651, accelerator pedal 32 and steering wheel 36 positions are read and obtained, respectively. At step 652, it is determined whether accelerator pedal 32 is in reverse. If accelerator pedal 32 is in reverse, then the accelerator value is set equal to the accelerator position multiplied by the maximum reverse speed percent (MRSP) at step 653. The algorithm then proceeds to step 658 in FIG. 38. If accelerator pedal 32 is not in reverse, the algorithm proceeds directly to step 658 in FIG. 38.

At step 658, it is determined whether steering wheel 36 is either right or left of the neutral position. If left of neutral, the algorithm proceeds to step 660, which sets the right actuator 52R as the master and the left actuator 52L as the slave. If steering wheel 36 is right of neutral at step 658, the algorithm proceeds to step 752, which sets the left actuator 52L as the master and the right actuator 52R as the slave. When the right actuator 52R is set as the master and the left actuator 52L is set as the slave at step 660, the algorithm proceeds to step 663, where the position of accelerator pedal 32 determines the master actuator position. At step 689, the master actuator is moved to reflect the position of accelerator pedal 32. At step 690, the new position of the slave actuator is calculated and the algorithm proceeds to step 692 in FIG. 39. When the left actuator 52L is set as the master and the right actuator 52R is set as the slave at step 752, the algorithm proceeds to step 755, where the position of accelerator pedal 32 determines the master actuator position. At step 757, the master actuator is moved to reflect the position of accelerator pedal 32. At step 758, the new position of the slave actuator is calculated and the algorithm proceeds to step 692 in FIG. 39.

At step 692, with steering wheel 36 positioned either left or right of neutral, it is determined whether the value of the steering wheel position (SWP) is less than or equal to the neutral dead band (NDB) value. If SWP is less than or equal to NDB, the algorithm proceeds to step 695, where the slave actuator's new position is set to the master actuator's set point (MASP) and the algorithm proceeds to step 703 in FIG. 38. If SWP is not less than or equal to NDB in step 692, the algorithm proceeds to step 696, where it is determined whether the value of SWP minus NDB is less than or equal to slave Equation 1 (SE1=(PSW/100)*(100−NDB)). If this value is less than or equal to SE1, then the algorithm proceeds to step 698, where the slave actuator's new position is set to slave equation 2 (SE2=MACP−{MACP*[AVCSP−NDB/SE1]}) and the algorithm proceeds to step 703 in FIG. 38. If this value is not less than or equal to SE1, then the algorithm proceeds to step 700, where the slave actuator's new position is set to slave equation 3 (SE3=MACP+{MACP*[1−{[AVCSP−NDB−SE1]/[1−SE1]}]}) and the algorithm proceeds to step 703 in FIG. 38.

Figure 38:
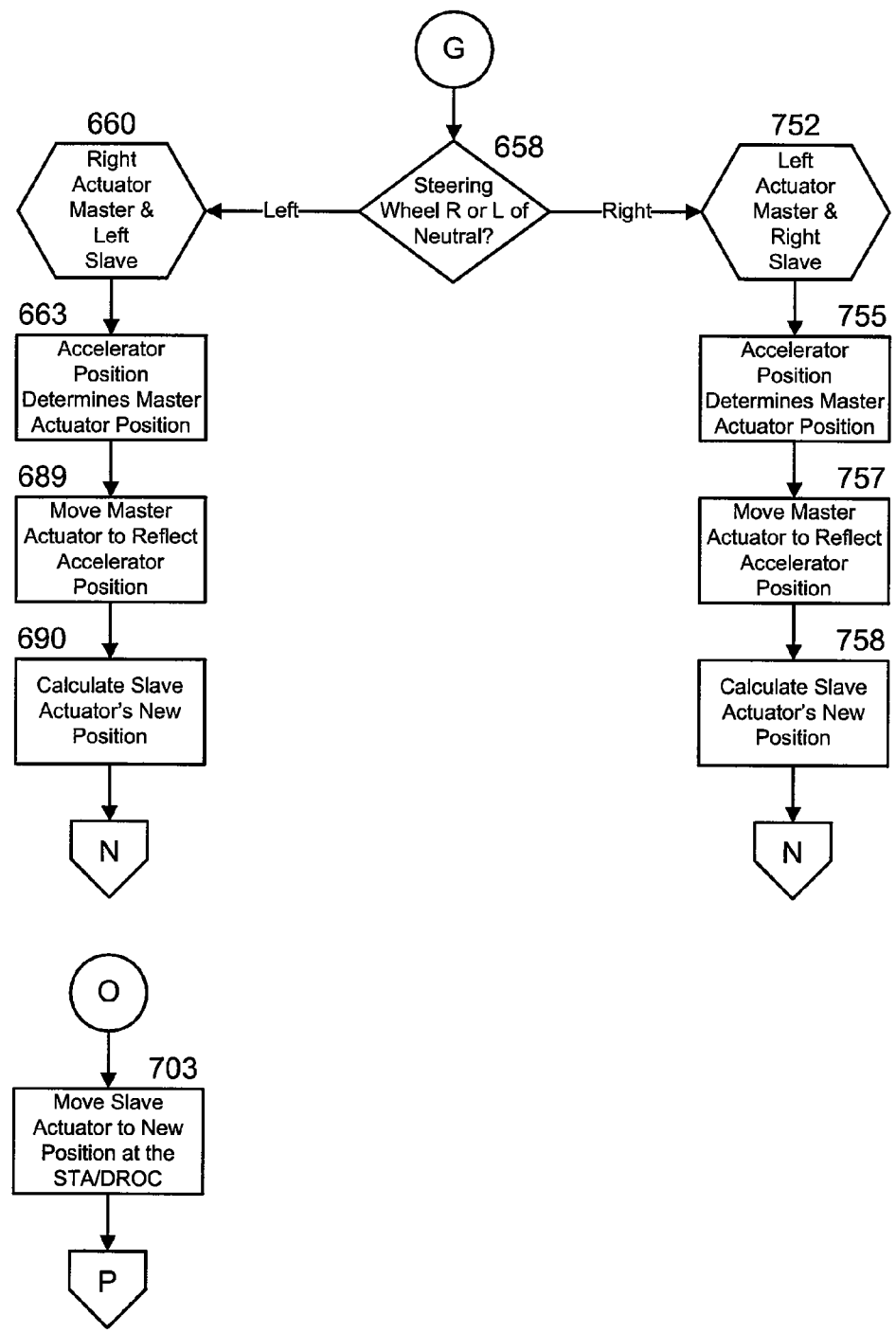
FIG. 38 is a flow chart of a control process of the second embodiment drive control system, showing a portion of the actuator control process.
Figure 39:
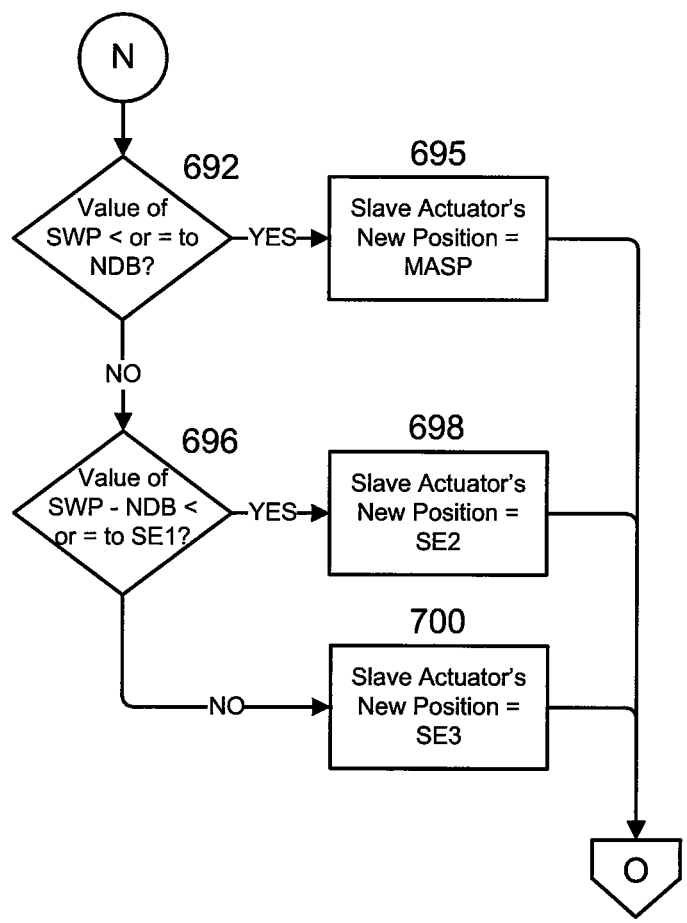
FIG. 39 is a flow chart of a control process of the second embodiment drive control system, showing a portion of the slave actuator control process.
Figure 40:
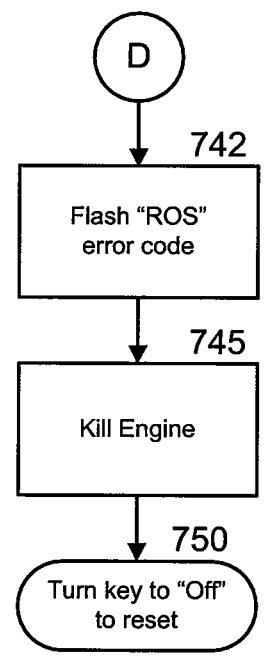
FIG. 40 is a flow chart of a control process of the second embodiment drive control system, showing shutdown of the vehicle due to a malfunctioning reverse operating system.

At step 703 in FIG. 38, the slave actuator is moved to the new position at the slave tire acceleration/deceleration rate of change (STA/DROC). The algorithm then proceeds to step 705 in FIG. 36.

At step 705, it is determined whether ignition switch 42 is in the OFF position. If ignition switch 42 is in the OFF position, then prime mover 18 is killed at step 715. If ignition switch 42 is not in the OFF position, it is then determined whether brake switch 66 is open at step 716. If brake switch 66 is open, actuators 52R and 52L are returned to neutral at step 718 and the algorithm returns to step 716. The loop between step 716 and 718 continues until brake switch 66 is closed or until ignition switch 42 is turned off. If brake switch 66 is not open, it is then determined whether PTO switch 44 is closed at step 720. If PTO switch 44 is not closed, it is then determined whether any inputs equal either 0 volts or 5 volts at step 722. If no inputs are either 0V or 5V, then it is determined whether the actuators 52R and 52L are responding correctly at step 724. If actuators 52R and 52L are responding correctly, then the algorithm returns to step 640, which enables the input controls. If actuators 52R and 52L are not responding correctly at step 724, then an error message is stored in software at step 726, an output error message stating the specific error is sent to the software interface at step 728, a "Return for Service" error code is flashed at step 730, and prime mover 18 is killed at step 732. To reset the system, ignition switch 42 is turned to the OFF position at step 736.

Returning to step 720, if PTO switch 44 is closed, it is then determined whether the ROS switch is closed at step 738. If the ROS switch is closed, the algorithm proceeds to step 722 as previously described above. If the ROS switch is not closed, then it is determined whether vehicle 510 is moving in reverse at step 740. If vehicle 510 is not moving in reverse, then the algorithm proceeds to step 722 as previously described above. If vehicle 510 is moving in reverse, then the algorithm proceeds to step 742 in FIG. 40. At step 742, the 'ROS' error code is flashed, and prime mover 18 is killed at step 745. To reset the system, ignition switch 42 is turned to the OFF position at step 750.

Figure 41:
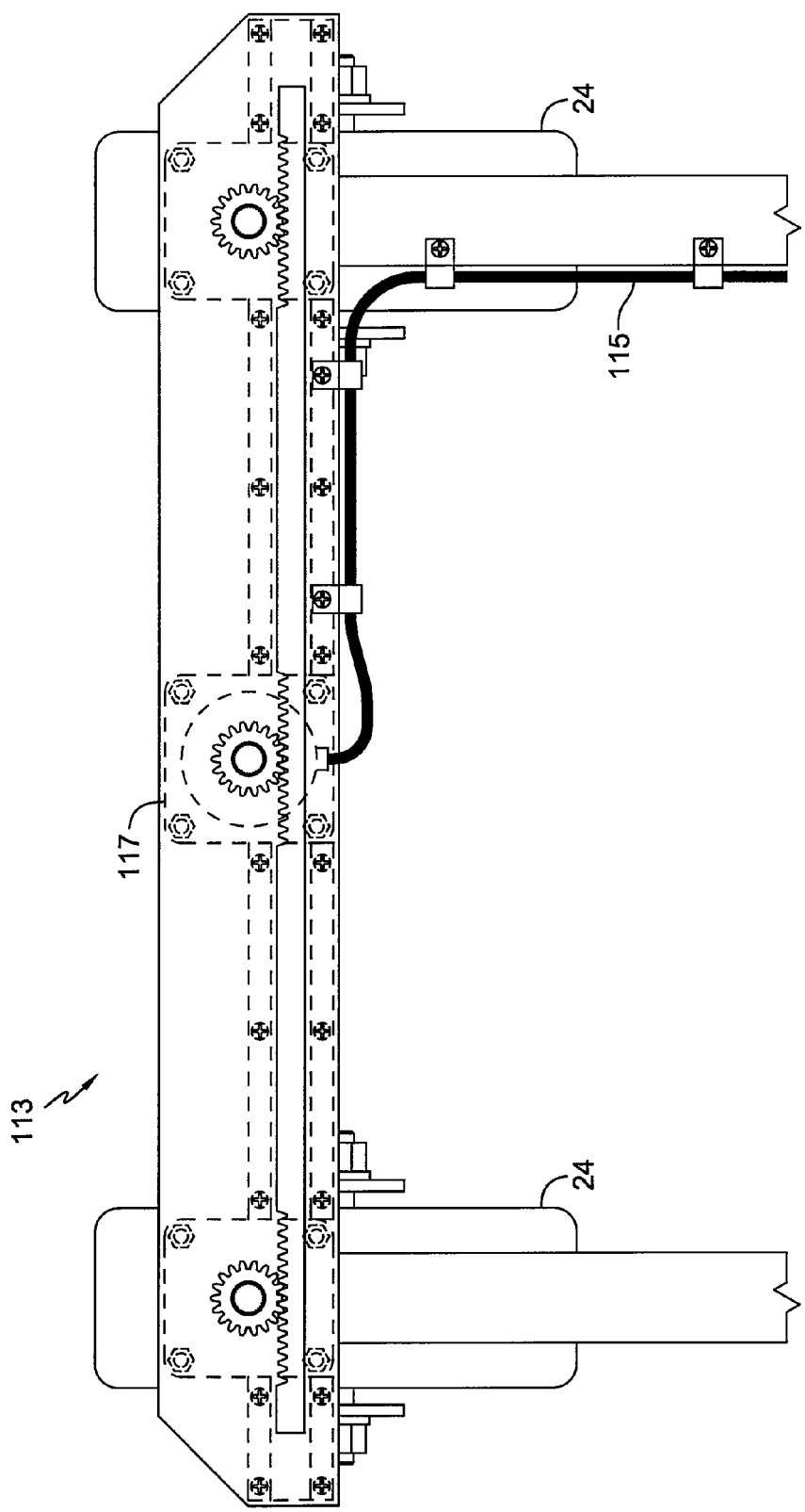
FIG. 41 is a top plan view of a first embodiment of an optional steering mechanism for the front caster wheels of the vehicle shown in FIG. 1.

According to another aspect of the invention, there may be an advantage to providing steering for front casters 24. Casters 24 normally move in response to the action of transaxles 12L and 12R. However, there may be applications where a defined response of front casters 24 is desirable, such as when laterally traversing a sloped surface. One embodiment of a front steering mechanism is shown in FIG. 41, which is in the form of a rack and pinion assembly 113. A wiring harness 115 attaches to electric steering motor 117. Drive control system 30 or 530 may readily be modified to provide output to electric steering motor 117 in accordance with the principles of the present invention.

Figure 42:
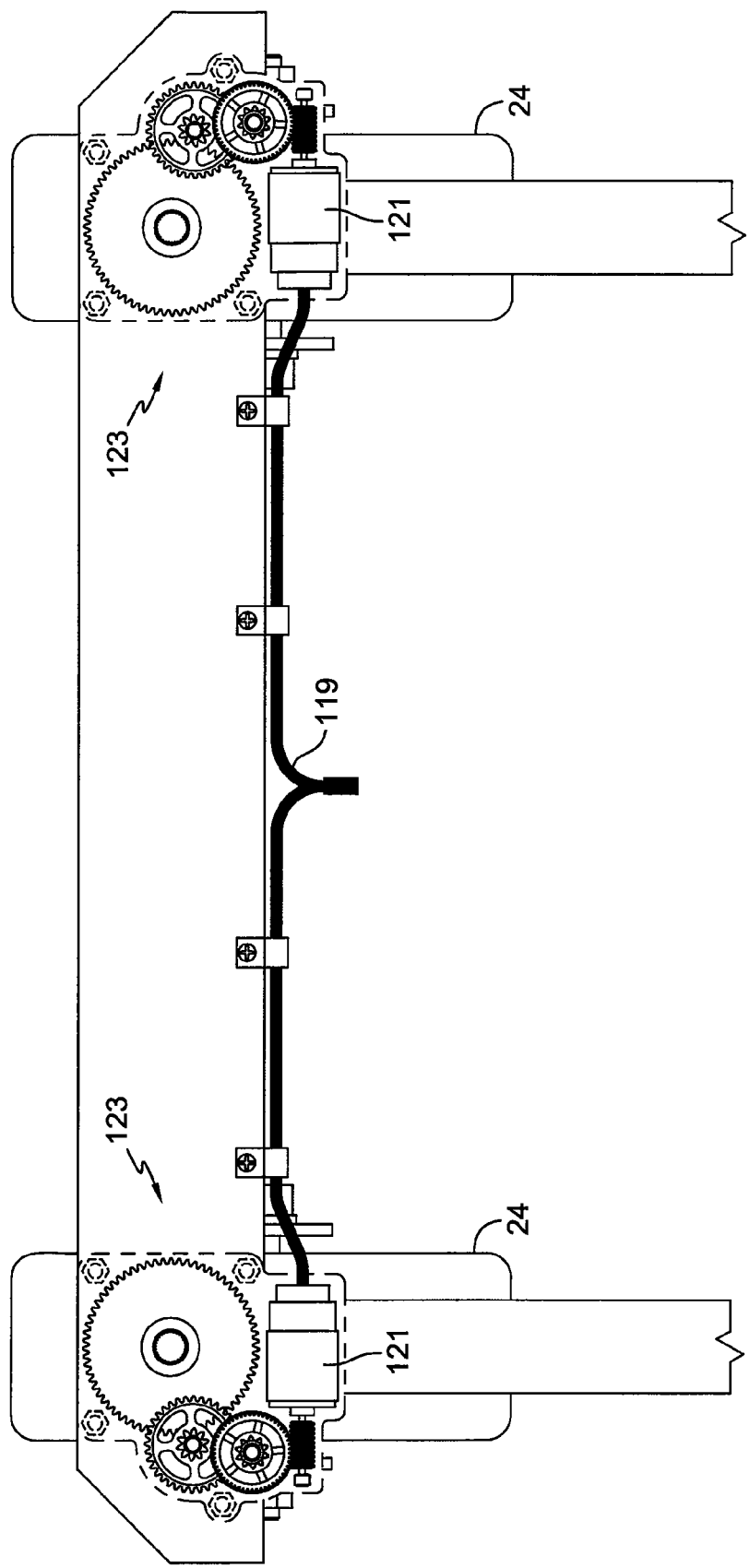
FIG. 42 is a top plan view of a second embodiment of an optional steering mechanism for the front caster wheels of the vehicle shown in FIG. 1.

Casters 24 may be steered by other techniques. FIG. 42 shows an arrangement where electric drive motors 121 steer casters 24 through a plurality of reduction gears 123. Electric drive motors 121 are powered through wiring harness 119.

Figure 43:
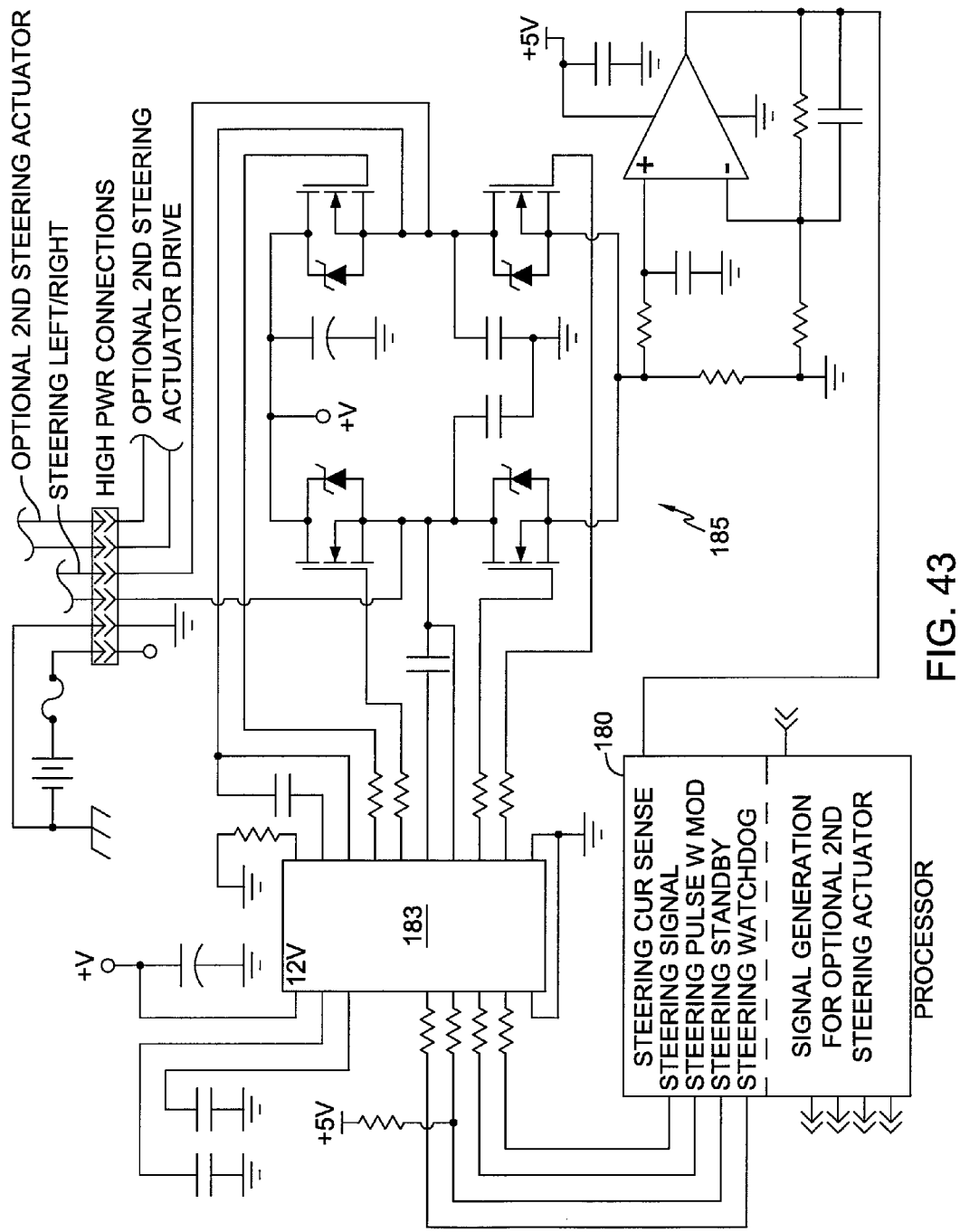
FIG. 43 is a schematic of one portion of the drive control system showing the drive circuits for an optional front caster steering mechanism.

In order to drive electric steering motor 117 or electric drive motors 121, drive control system 30 or 530 may readily be modified to incorporate a circuit similar to that of FIG. 43. A processor 180 is provided, which is similar to processors 80 and 580, except additional outputs have been provided to control a MOSFET driver 183, which then controls a MOSFET H-bridge 185. The function of this circuit would be similar to that of FIG. 8 and FIG. 29, and the control processes would provide a rate of movement proportional to the position of steering wheel 36, similar to the techniques used to position actuators 52L and 52R. In the configuration shown in FIG. 42, the control process would provide a radius of turning that is different for caster 24 at the inside of a turn as compared to caster 24 at the outside of a turn in order to provide a true steering track and improved steering control.

Figure 44:
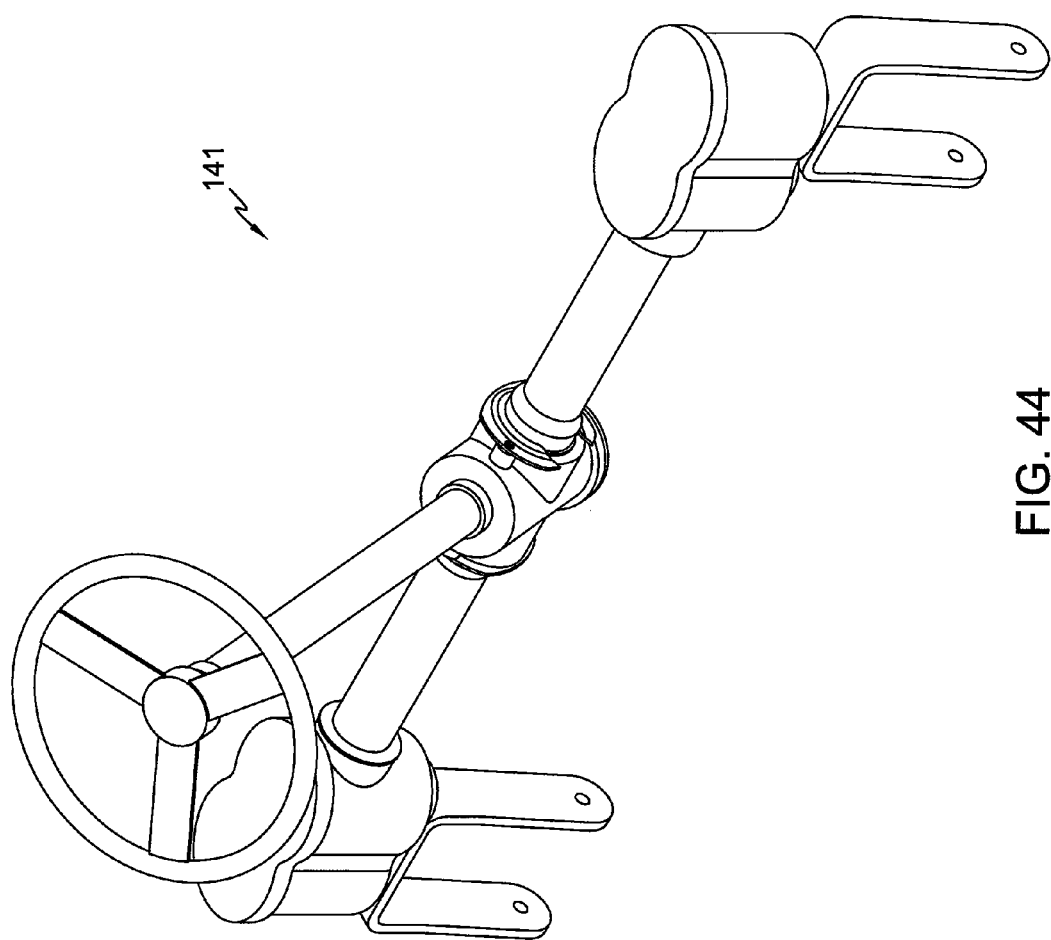
FIG. 44 is a perspective view of a third embodiment of an optional steering mechanism for the front caster wheels of the vehicle shown in FIG. 1.
Figure 45:
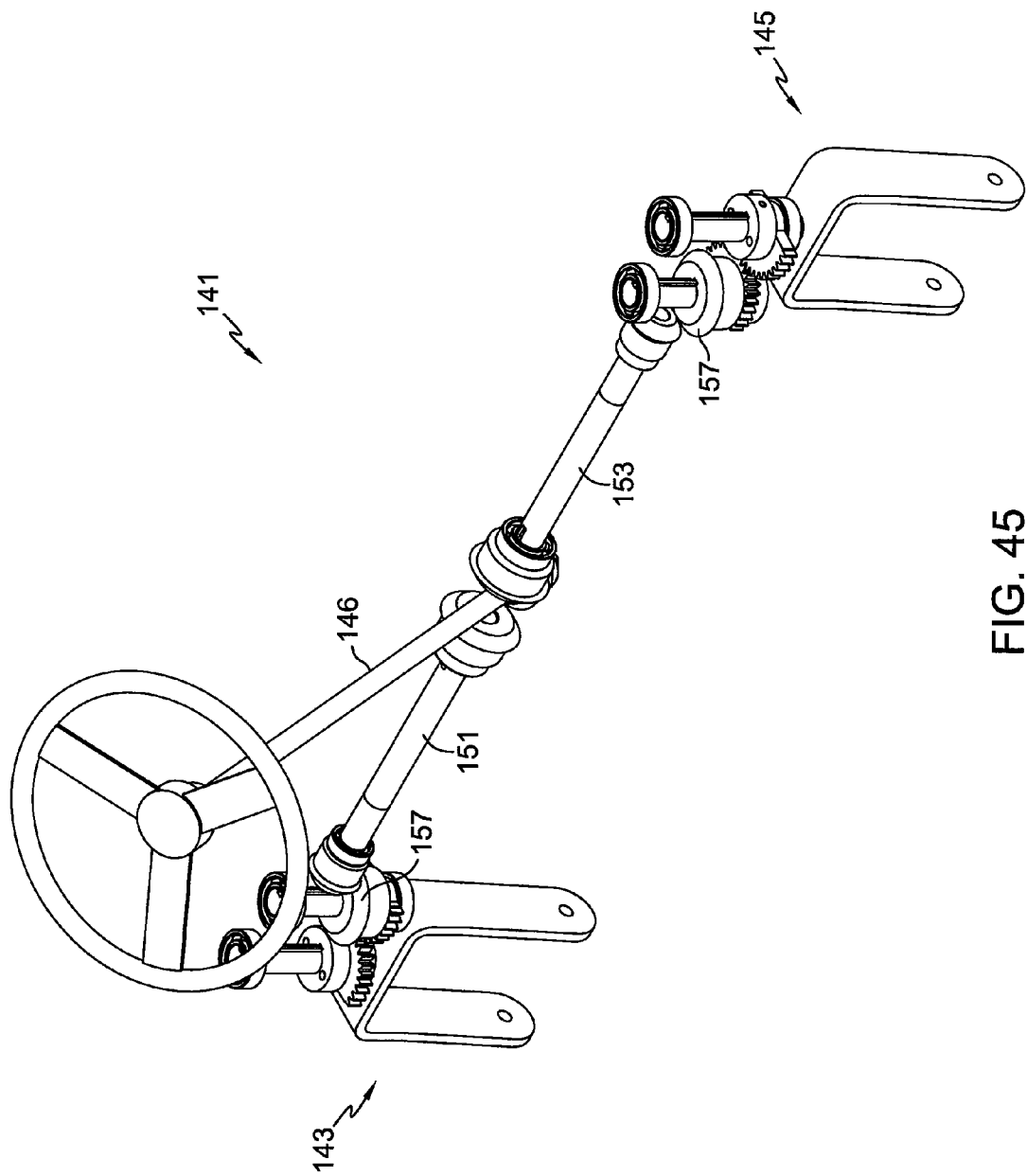
FIG. 45 is a perspective view of the third embodiment optional steering mechanism of FIG. 44 showing the gear mechanisms and linkages exposed.
Figure 46:
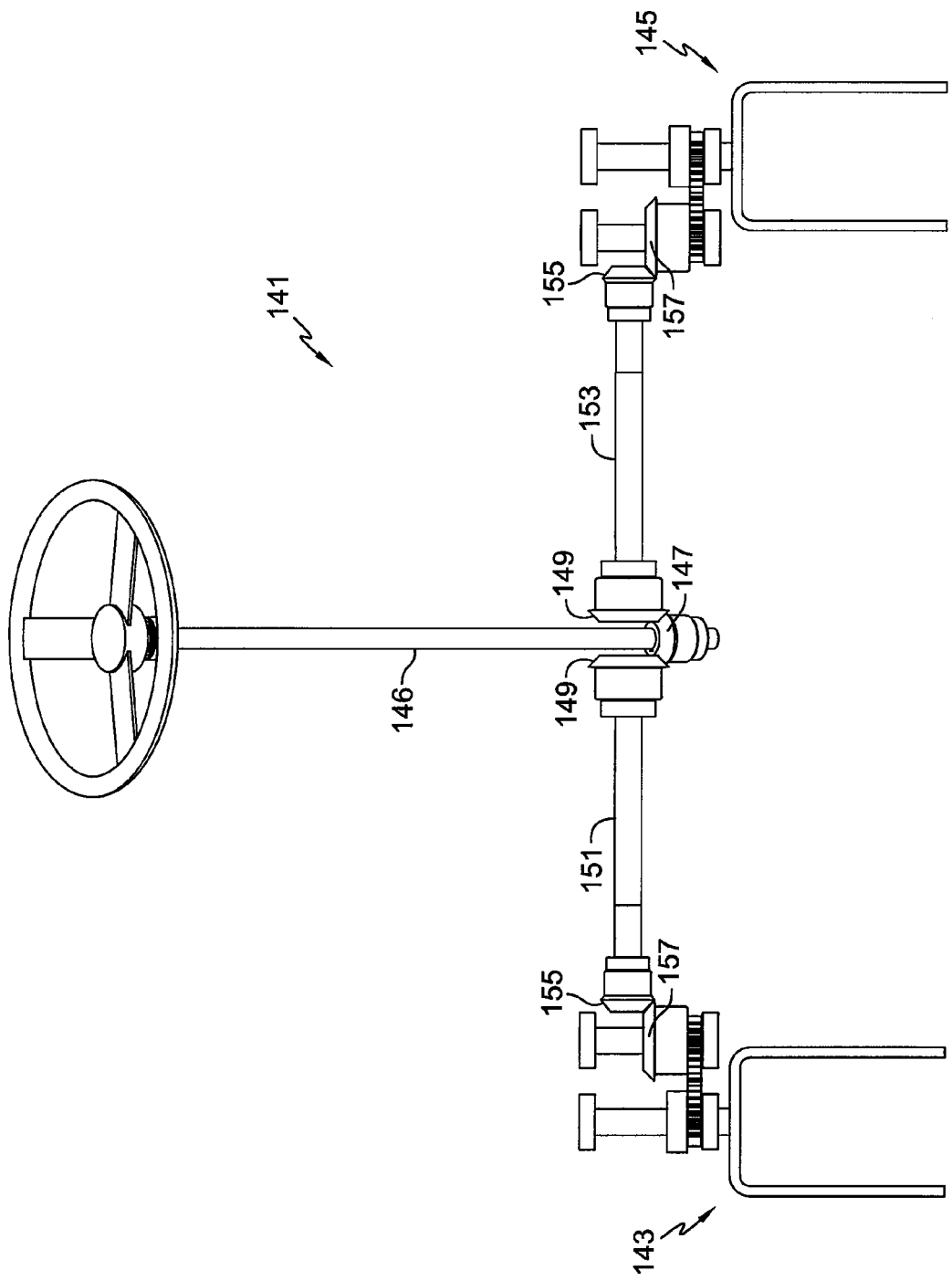
FIG. 46 is a rear elevational view of the third embodiment optional steering mechanism shown in FIG. 45.

FIGS. 44 through 46 illustrate an alternative embodiment of a front steering assembly 145 that can be incorporated either passively (i.e., without electrical integration with drive control system 30 or 530) or actively via integration with drive control system 30 or 530 by addition of circuitry, such as, for example, the circuit shown in FIG. 43. It should be noted that any mechanical front steering arrangement can be mechanically tuned or configured to "mechanically integrate" with drive control system 30 or 530. For example, the relative turning radii at given steering wheel 36 inputs and other control parameters of the drive control system 30 or 530 can be predetermined and the mechanical linkages of the front steering mechanisms can be tuned or configured mechanically to match or closely approximate the turning radii dictated by control of rear drive wheels 16.

As shown in FIGS. 45 and 46, front steering assembly 141 includes steering column shaft 146 having a beveled gear arrangement 147 that engages mating beveled gear arrangements 149 each respectively disposed on one end of a left linkage shaft 151 and a right linkage shaft 153. On the other end of each linkage shaft 151 and 153, a beveled gear arrangement 155 engages a respective intermediate gear arrangement 157, which in turn each links to its respective left caster assembly 143 and right caster assembly 145 (caster wheels not shown in the drawings).

As noted previously, there are circuits equivalent to that shown herein, and thus this description should not be read as limiting. For example, MOSFET H-bridge 185 could be replaced by two half bridges. Also, though processor 80, processor 180, and processor 580 are shown as single processors, multiple processors could readily share the processing tasks described herein. Additionally, one or more programmable logic controllers could be utilized, as well as other logic devices.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An electronic drive control system for a vehicle having a right side actuator engaged to a first control arm of an associated right side variable drive unit, a left side actuator engaged to a second control arm of an associated left side variable drive unit, an accelerator, and a steering mechanism, the control system comprising:
   a right speed sensor in electrical communication with the right side drive unit;
   a left speed sensor in electrical communication with the left side drive unit;
   an accelerator signal device in electrical communication with the accelerator;
   a steering signal device in electrical communication with the steering mechanism;
   a controller in electrical communication with the right speed sensor, the left speed sensor, the accelerator signal device, the steering signal device, and the right and left side actuators;
   wherein the controller:
      receives a signal from the right speed sensor, the left speed sensor, the accelerator signal device, and the steering signal device;
      determines at least one operational output of the right side drive unit and the left side drive unit based on the received signals;
      calculates adjustments to at least one of the right side actuator and the left side actuator; and
      adjusts the at least one of the right side actuator to move the first control arm of the right side drive unit and the left side actuator to move the second control arm of the left side drive unit to effectuate the at least one operational output of the right side drive unit and the left side drive unit.

2. A method of controlling a drive system of a vehicle having a pair of drive units each providing independent output to a respective drive wheel of the vehicle, the method comprising the steps of:
   generating input signals from a steering system and an accelerator system of the vehicle;
   sending the input signals to a processor;
   calculating an adjustment for each of the drive units based on the input signals;
   sending a control signal based on the calculated adjustment from the processor to each of a pair of actuators each linked to a control arm of one of the drive units of the vehicle; and
   controlling the actuators to adjust the respective drive unit in response to the control signal from the processor by moving the control arm of the respective drive unit.

3. A vehicle drive system controller in electrical communication with a right and a left actuator each linked to a control arm of a respective right and left drive unit of a vehicle, the controller programmed to perform the steps of:
   receiving a steering input signal from a steering system of the vehicle;
   receiving an accelerator input signal from an accelerator system of the vehicle;
   calculating a speed adjustment for each of the drive units based on the steering and accelerator input signals;

sending a right actuator control signal to the right actuator to move the control arm of the right drive unit, based on the calculated speed adjustment for the right drive unit; and sending a left actuator control signal to the left actuator to move the control arm of the left drive unit, based on the calculated speed adjustment for the left drive unit.

4. A method of controlling a drive system of a vehicle having two drive units to effectuate a turn, the method comprising the steps of:

generating input signals from one or more components of the drive system;

sending the input signals to a processor in electrical communication with a right and a left actuator each linked to a respective right and left drive unit of the vehicle;

determining whether a brake of the vehicle is actuated;

returning the actuators to a neutral position if the brake is actuated;

determining whether an accelerator is in reverse if the brake is not actuated;

setting an accelerator value equal to an accelerator position multiplied by a maximum accelerator rate of speed if the accelerator is in reverse;

determining whether a steering mechanism of the vehicle is right or left of a neutral steering position;

assigning the right actuator as a master actuator and the left actuator as a slave actuator if the steering mechanism is left of the neutral steering position;

assigning the left actuator as the master actuator and the right actuator as the slave actuator if the steering mechanism is right of the neutral steering position;

setting the master actuator equal to the accelerator position;

setting a new position for the slave actuator according to rules as follows:
if SWP≤NDB, the new position equals MASP;
if (SWP−NDB)≤SE1, the new position equals SE2;
otherwise, the new position equals SE3;
wherein:
SWP=steering wheel position;
NDB=neutral dead band;
MASP=master actuator set point;

SE1=(PSW/100)*(100−NDB)

PSW=percent steering wheel

SE2=MACP−{MACP*[AVCSP−NDB/SE1]}

MACP=master actuator current position
AVCSP=absolute value of current steering wheel position
and

SE3=MACP+{MACP*[1−{[AVCSP−NDB−SE1]/[1−SE1]}]} wherein the slave actuator is moved to the new position at a slave tire steering acceleration rate of change.

5. A method of controlling a drive system of a vehicle having two drive units to effectuate a turn, the method comprising the steps of:

generating input signals from one or more components of the drive system;

sending the input signals to a processor in electrical communication with a right and a left actuator each linked to a respective right and left drive unit of the vehicle;

reading an operating algorithm;

determining whether a brake of the vehicle is actuated;

returning the actuators to a neutral position if the brake is actuated;

determining whether an accelerator of the vehicle is in a neutral accelerator position if the brake is not actuated;

comparing a current position of the accelerator to a previous position of the accelerator;

storing data related to the positions of the accelerator in a memory;

determining a position of a steering mechanism of the vehicle if the position of the accelerator has changed;

denoting the right actuator as a master and the left actuator as a slave if the position of the steering mechanism is left of or at a center position;

denoting the left actuator as the master and the right actuator as the slave if the position of the steering mechanism is right of the center position;

calculating a minimum speed reduction;

comparing the calculated minimum speed reduction to an unreduced accelerator angle of the accelerator;

setting the minimum speed reduction to the calculated minimum speed reduction if the calculated minimum speed reduction is less than the unreduced accelerator angle;

setting the minimum speed reduction to the unreduced accelerator angle if the calculated minimum speed reduction is greater than the unreduced accelerator angle;

calculating a speed difference percent; and reducing a speed of the master actuator with respect to the slave actuator based on the calculated speed difference percent.

6. A method of controlling a drive system of a vehicle at start up, the drive system having two drive units and two associated actuators, the method comprising the steps of:

determining whether a calibration procedure is complete when an ignition of the vehicle is placed in a RUN position;

storing a calibration error message if the calibration procedure is not complete and outputting the calibration error message to an interface of the vehicle;

running diagnostics if the calibration procedure is complete;

determining whether diagnostics are passed;

storing a diagnostics error message if the diagnostics are not passed and outputting the diagnostics error message to the interface;

determining whether the actuators are in a neutral position if the diagnostics are passed; and storing a neutral condition error message if at least one of the actuators is not in the neutral position and outputting the neutral condition error message to the interface.

7. The method of claim 6, further comprising the steps of:
determining whether a brake switch of the vehicle is open;
outputting a first error code if the brake switch is not open;
determining whether a power take-off switch of the vehicle is closed;
outputting a second error code if the power take-off switch is closed;
determining whether an accelerator of the vehicle is in a neutral accelerator position;
outputting a third error code if the accelerator is not in the neutral accelerator position;
correcting all error codes; and
enabling input of a plurality of controls of the vehicle when all error codes have been corrected.

8. A vehicle drive system controller in electrical communication with a right and a left actuator each linked to a respective right and left drive unit of a vehicle, the controller programmed to perform the steps of:
- receiving input signals from one or more components of a drive system of the vehicle;
- determining whether a brake of the vehicle is actuated;
- returning the actuators to a neutral position if the brake is actuated;
- determining whether an accelerator is in reverse if the brake is not actuated;
- setting an accelerator value equal to an accelerator position multiplied by a maximum accelerator rate of speed if the accelerator is in reverse;
- determining whether a steering mechanism of the vehicle is right or left of a neutral steering position;
- assigning the right actuator as a master actuator and the left actuator as a slave actuator if the steering mechanism is left of the neutral steering position;
- assigning the left actuator as the master actuator and the right actuator as the slave actuator if the steering mechanism is right of the neutral steering position;
- setting the master actuator equal to the accelerator position;
- setting a new position for the slave actuator according to the following rules:
  - if SWP≤NDB, the new position equals MASP;
  - if (SWP−NDB)≤SE1, the new position equals SE2;
  - otherwise, the new position equals SE3;
  - wherein:
    - SWP=steering wheel position;
    - NDB=neutral dead band;
    - MASP=master actuator set point;

SE1=(PSW/100)*(100−NDB)

PSW=percent steering wheel

SE2=MACP−{MACP*[AVCSP−NDB/SE1]}

- MACP=master actuator current position
  - AVCSP=absolute value of current steering wheel position
  and

SE3=MACP+{MACP*[1−{[AVCSP−NDB−SE1]/[1−SE1]}]} wherein the slave actuator is moved to the new position at a slave tire steering acceleration rate of change.

9. A vehicle drive system controller in electrical communication with a right and a left actuator each linked to a respective right and left drive unit of a vehicle, the controller programmed to perform the steps of:
- receiving input signals from a steering system and an accelerator system of the vehicle;
- determining a position of an accelerator of the accelerator system;
- determining whether a steering mechanism of the steering system is right or left of a neutral position;
- assigning the right actuator as a master actuator and the left actuator as a slave actuator if the steering mechanism is left of the neutral position;
- assigning the left actuator as the master actuator and the right actuator as the slave actuator if the steering mechanism is right of the neutral position;
- setting the master actuator equal to the accelerator position;
- calculating a new position for the slave actuator based on the input signals from the steering system and the accelerator system of the vehicle; and
- setting the slave actuator at the new position.

10. A variable drive system for a vehicle, the system comprising:
- a first variable drive unit in communication with a first wheel of the vehicle;
- a second variable drive unit in communication with a second wheel disposed on an opposing side of the vehicle with respect to the first wheel;
- a first actuator in communication with a first control arm of the first variable drive unit;
- a second actuator in communication with a second control arm of the second variable drive unit, wherein the actuators move the control arms to facilitate speed adjustment of the respective variable drive units;
- an accelerator of the vehicle;
- a steering device of the vehicle; and
- an electronic drive control system including:
  - a plurality of sensors each in communication with one of the first drive unit, the second drive unit, the first actuator, the second actuator, the accelerator, and the steering device; and
  - a controller in communication with the first and second actuators and the plurality of sensors to facilitate independent adjustment of the variable drive units based on input from at least one of the sensors, wherein the controller is configured to:
    - receive input signals from the plurality of sensors;
    - determine at least one operational output of the first variable drive unit and the second variable drive unit based on the received input signals;
    - calculate adjustments to at least one of the first actuator and the second actuator; and
    - adjust the at least one of the first actuator to move the first control arm of the first variable drive unit and the second actuator to move the second control arm of the second variable drive unit to effectuate the at least one operational output of the first variable drive unit and the second variable drive unit.

* * * * *